US 8,589,696 B2

(12) United States Patent
Atherton

(10) Patent No.: US 8,589,696 B2
(45) Date of Patent: Nov. 19, 2013

(54) BIOMETRIC IDENTIFICATION METHOD

(75) Inventor: Peter Samuel Atherton, Leesburg, VA (US)

(73) Assignee: Mikoh Corporation, McLean, VA (US)

( * ) Notice: Subject to any disclaimer, the term of this patent is extended or adjusted under 35 U.S.C. 154(b) by 0 days.

(21) Appl. No.: 13/321,050

(22) PCT Filed: May 18, 2010

(86) PCT No.: PCT/AU2010/000584
§ 371 (c)(1),
(2), (4) Date: Feb. 3, 2012

(87) PCT Pub. No.: WO2010/132928
PCT Pub. Date: Nov. 25, 2010

(65) Prior Publication Data
US 2012/0131350 A1 May 24, 2012

Related U.S. Application Data

(60) Provisional application No. 61/179,122, filed on May 18, 2009, provisional application No. 61/186,212, filed on Jun. 11, 2009, provisional application No. 61/259,389, filed on Nov. 9, 2009.

(51) Int. Cl.
*G06F 21/00* (2006.01)
*G06F 21/32* (2013.01)
(52) U.S. Cl.
CPC ................................. *G06F 21/32* (2013.01)
USPC ....................................................... 713/186
(58) Field of Classification Search
USPC ....................................................... 713/186
See application file for complete search history.

(56) References Cited

U.S. PATENT DOCUMENTS

| 6,678,821 | B1 | 1/2004 | Waugh et al. |
| 7,310,734 | B2 | 12/2007 | Boate et al. |
| 2003/0101349 | A1 | 5/2003 | Wang |
| 2004/0162981 | A1 | 8/2004 | Wong |
| 2005/0240779 | A1 | 10/2005 | Aull et al. |
| 2005/0246763 | A1 | 11/2005 | Corcoran et al. |
| 2007/0226516 | A1 | 9/2007 | Kubota et al. |
| 2008/0120698 | A1 | 5/2008 | Ramia |

OTHER PUBLICATIONS

International Search Report (PCT/ISA/210) issued on Jun. 30, 2010, by Australian Patent Office as the International Searching Authority for International Application No. PCT/AU2010/000584.

(Continued)

*Primary Examiner* — Peter Shaw
(74) *Attorney, Agent, or Firm* — Buchanan Ingersoll & Rooney PC

(57) ABSTRACT

A biometric and cryptographic processing unit includes a biometric receiver receiving biometric information of a BCU user. A biometric unit of the BCU has a store of biometric information of an authorized BCU user and compares received biometric information with the stored biometric information to determine if the user is an authorized BCU user. A cryptographic unit generates/stores an asymmetric cryptographic public/private key pair associated with each authorized BCU user. An input/output port allows encrypted/unencrypted data to be input to/output from the BCU. The cryptographic unit operates in response to a specific authorized user giving permission to undertake a specific cryptographic operation on data input to the BCU only upon the specific authorized user being determined as an authorized BCU user, whereby a specific private key corresponding to the specific authorized user is enabled for use in the specific cryptographic operation after which the specific private key is disabled.

10 Claims, 19 Drawing Sheets

(56) References Cited

OTHER PUBLICATIONS

J. Dong et al., "Security Enhancement of Biometrics, Cryptography and Data Hiding by Their Combinations", 5th International Conference on Visual Information Engineering, Jul. 29-Aug. 1, 2008, pp. 239-244.

P. Janbandhu et al., "Modified Private Key Generation for Biometric Signatures", Advances in Automation, Multimedia and Video Systems, and Modern Computer Science, 2001 (month unknown), pp. 314-319.

European Supplementary Search Report dated Jun. 5, 2013 issued in the corresponding European Patent Application No. 10777217.0/1957/2433246.

A. Menezes et al., "Chapter 13: Key Management Techniques", Handbook of Applied Cryptography, Oct. 1, 1996, pp. 543-590, XP001525013, ISBN: 978-0/8493-8523-0 CRC Press, Inc., Boca Raton, Florida, US.

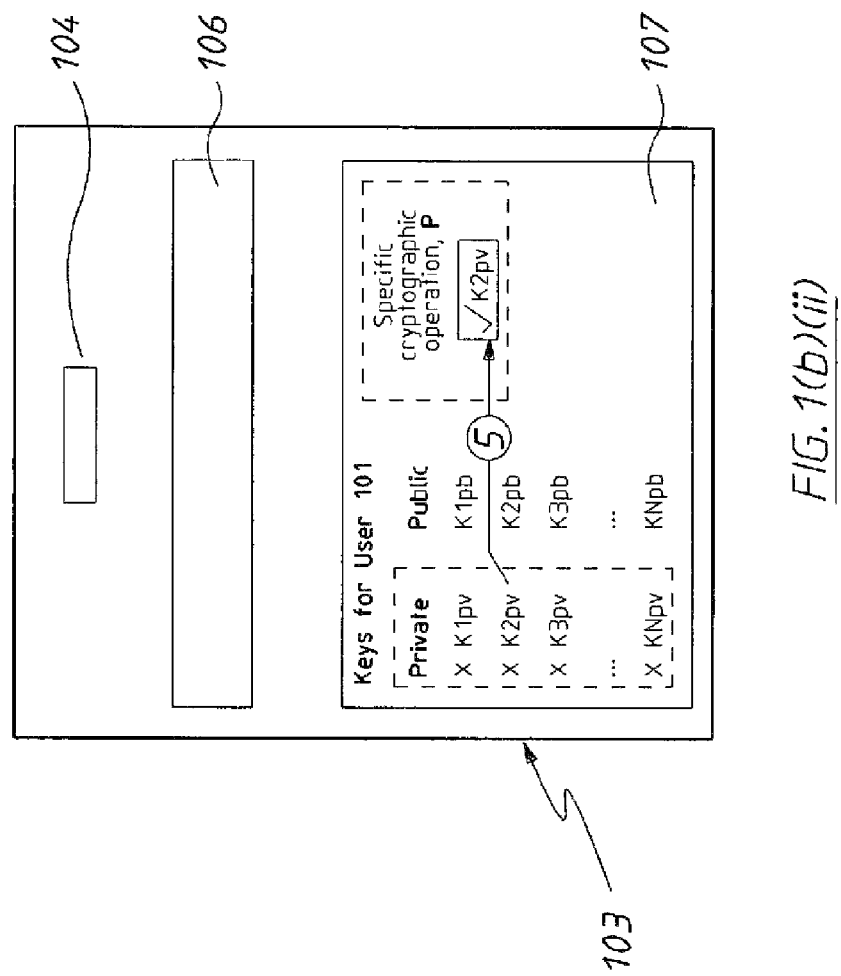
FIG. 1(b)(ii)

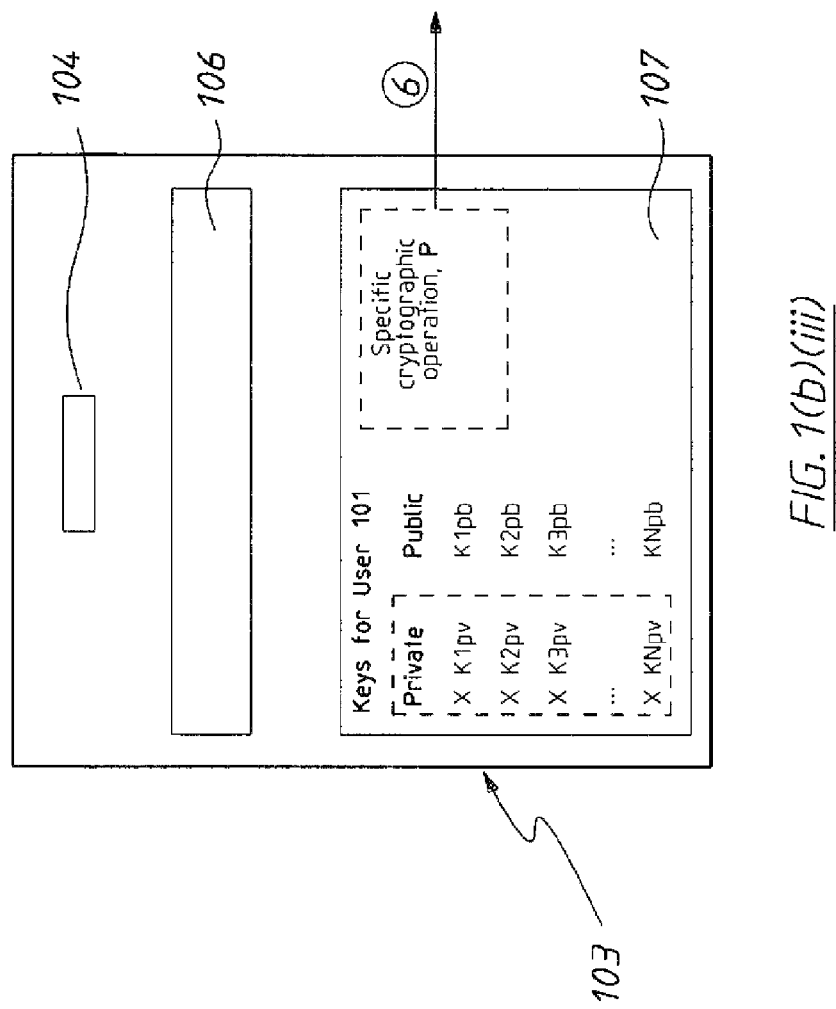
FIG. 1(b)(iii)

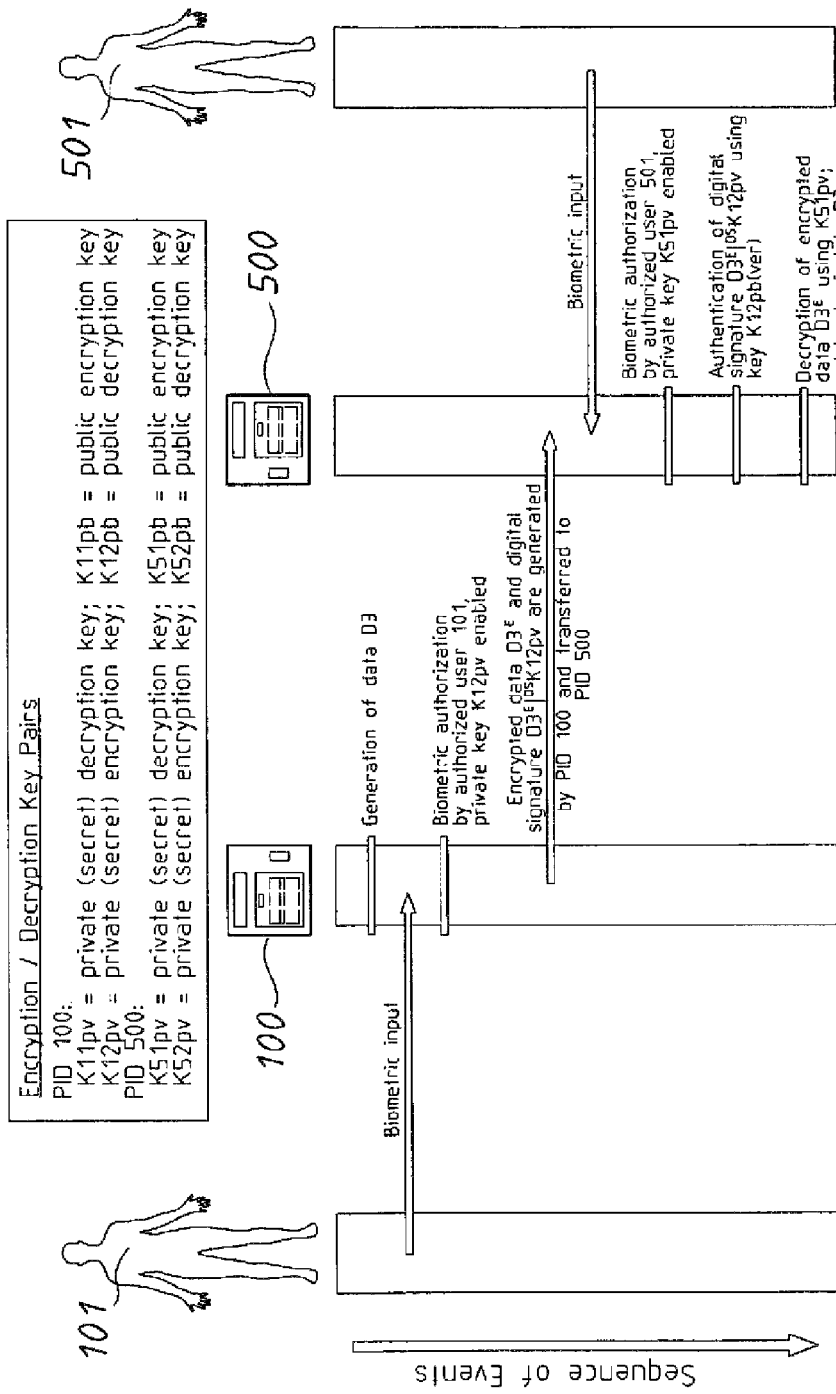

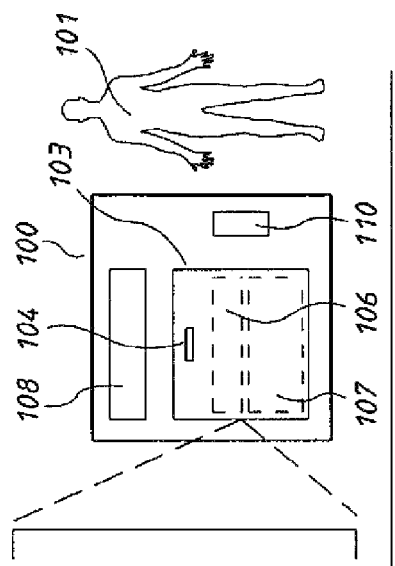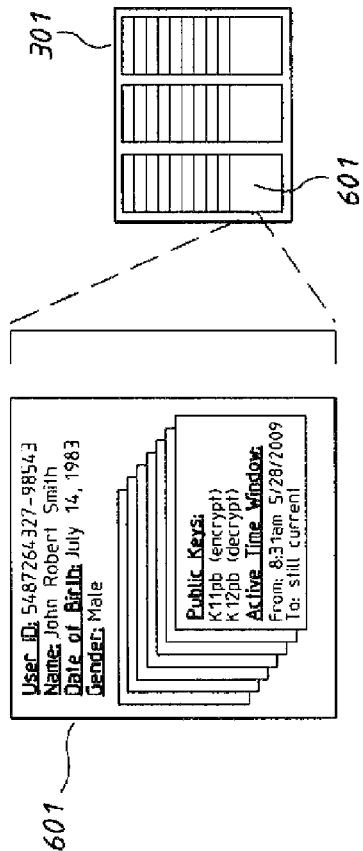
FIG. 6
FIG. 6(a)
FIG. 6(b)

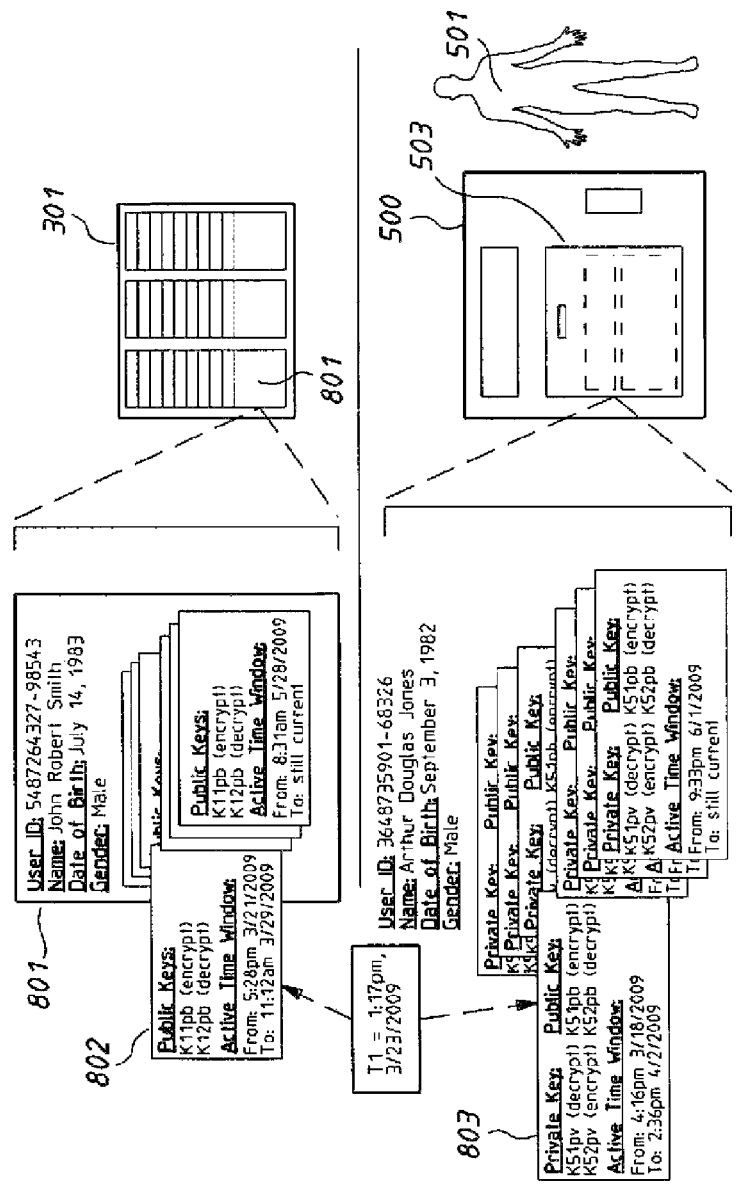

BIOMETRIC IDENTIFICATION METHOD

TECHNICAL FIELD

The present invention relates to methods and apparatus for biometric identification—more specifically, biometric identification over a network such as the internet.

BACKGROUND

There is an increasing need for secure identification of individuals. This is most reliably undertaken by means of biometric recognition methods. A substantial amount of research and development is being undertaken to develop biometric identification technologies that are cost effective, easy to use and with security sufficient for the needs of the intended application. Various biometric techniques have been developed, based on reading different biometric characteristics. These include techniques based on fingerprint recognition, facial recognition, iris recognition, retinal recognition, voice recognition, heartbeat recognition, DNA recognition, and others.

A disadvantage of conventional biometric systems is that they store users' biometric information in a central database, which can result in significant privacy and security risks if the central database is compromised—especially since biometric data cannot be revoked and replaced.

An alternative current approach, aimed at overcoming the above disadvantage of the central database method, is to undertake the biometric identification in a personal device, thereby ensuring that a user's biometric information is retained within said user's personal device. Existing biometric identification systems using such personal devices usually operate by (i) taking a biometric reading to identify the user and, if the user is positively identified, unlocking a memory portion of the personal device; (ii) using information stored in said memory portion to undertake actions, said information including for example cryptographic keys, digital certificates, etc.; (iii) separately establishing a secure communications link between the personal device and other devices with which the personal device needs to communicate and exchange information. This approach, while it does restrict the user's biometric information to the personal device, has significant disadvantages:

usually the personal device, once unlocked, can be used by anyone, at least for a period of time, without a device at the other end of said communications link being able to positively determine who is using the personal device—hence once the personal device is unlocked there is no ongoing assurance that information communicated to or from the personal device is being sent or received by the authorized user of the personal device;

there is no guaranteed correspondence between the information stored in the personal device and the authorized user's biometric identification—this correspondence is inferred since the personal device must be unlocked biometrically to access the information stored in said memory portion, but in fact said stored information does not necessarily correspond to the biometrically identified user.

For these reasons the usual personal device method is generally not suitable for biometrically identifying and securing transactions on a network, where the user to be identified will usually be remote from other persons or devices with which said user is undertaking a transaction.

There has in recent years been a good deal of research and development activity aimed at linking biometric to cryptographic functions in order to be able to (i) reliably remotely identify individuals and (ii) secure information transfers. Citation #1 (see below) describes three categories of technique that are being investigated. These can be summarized as follows.

1. The "key release method", in which cryptographic keys are released for use as a result of a valid biometric reading. This is the type of approach used in current portable biometric devices and suffers from the above-described disadvantages.

2. Biometric key generation, in which cryptographic keys are generated directly from one or more biometric readings. This approach presents significant technical challenges that have not yet been satisfactorily resolved, except possibly for DNA-based biometrics, in that the data obtained from a biometric reading will usually differ from one instance to the next. For example, according to Citation #2 below, 10-15% of pixels in a typical iris scan will vary from scan to scan. A further disadvantage of this approach is that it does not allow maximum flexibility in the selection or derivation of cryptographic keys, which for security reasons should preferably be changed from time to time.

3. The "key binding" method, in which cryptographic keys are bound to biometric data collected at the time of user enrollment.

Citation #3 below describes a network-based biometric identification and information transfer system using the key binding method. In this system the cryptographic keys and biometric data are stored in remote servers and the cryptographic keys are not generated locally to the user. Hence the abovedescribed privacy and security issues associated with conventional biometric systems are not addressed by the system described in citation #3—the biometric data and cryptographic keys can both be compromised if the server security is penetrated. Furthermore, the system described in citation #3 uses static cryptographic keys 7 i.e. the keys are bound to a user's biometric data at the time of enrollment are not subsequently changed. Hence if a user's cryptographic keys are compromised (i.e. made known or worked out) the user must re-enroll in order for a new set of cryptographic keys to be allocated.

Citation #4 below describes a system in which a portable device stores cryptographic keys that are used in communicating with a remote device when a biometric reading is taken by the portable device. The method used in citation #4 is not the key binding method, however, as it involves using the cryptographic keys stored in the portable device regardless of whether there is biometric authentication of the user of the portable device. The cryptographic keys stored in said portable device are used simply to ensure secure communications between said portable device and said remote device. Each time a biometric reading is taken, said portable device cryptographic keys are used to transmit the results of the biometric verification to said remote device, regardless of whether or not the biometric verification indicates the user to be an authorized user. Use of the cryptographic keys stored in said portable device is not bound to biometric data corresponding to an authorized user. In fact, use of the cryptographic keys is not in any way dependant on the outcome of a biometric process, and so the method described in this patent is neither the key release method nor the key binding method.

CITATIONS

Citation #1: Non-Patent Literature
"Security enhancement of biometrics, cryptography and data hiding by their combinations"
Authors: Jing Dong; Tieniu Tan
Source: 5th International Conference on Visual Information Engineering, 2008. VIE 2008.
Jul. 29, 2008—Aug. 1 2008; p 239-244
Citation #2: Non-Patent Literature
"Modified private key generation for Biometric Signatures"
Authors: Janbandhu, Pawan K. 1; Siyal, M. Y. 1
Source: Advances in Automation, Multimedia and Video Systems, and Modern Computer Science, 2001, p 314-319
ISBN-10:9608052440
Publisher: World Scientific and Engineering Academy and Society
Author affiliation: Sch. of Elec. and Electron. Eng., Nanyang Technological University, Info. Systems Research Laboratory, Singapore 639798
Citation #3: Patent Literature
Doc. #: U.S. Pat. No. 6,678,821B1
Title: Method and system for restricting access to the private key of a user in a public key infrastructure
Inventor: Waugh, Donald Craig
Pub. Date: Jan. 13, 2004
Ap. Date: Mar. 23, 2000
Priority Date Mar. 23, 2000
Assignee: E Witness Inc.
Citation #4: Patent Literature
Doc. #: U.S. Pat. No. 7,310,734B2
Title: Method and system for securing a computer network and personal identification device used therein for controlling access to network components
Inventor: Boate, Alan
Pub. Date: Dec. 18, 2007
Ap. Date: Feb. 1, 2001
Priority Date Feb. 1, 2001
Assignee: 3M Innovative Properties Company

OBJECT OF THE INVENTION

An object of the present invention is to substantially overcome or at least ameliorate one or more of the above disadvantages.

Disclosed is a biometric/cryptographic processing unit (BCU) that incorporates biometric/cryptographic processing functions and can be incorporated into a personal information device (PID), thereby enabling secure biometrically identified and authenticated information exchange between a first user of a first BCU and a second user of a second BCU, or between a first user of a first BCU and an external device, without releasing any biometric information of either user from said user's BCU and while also ensuring that the information so exchanged is confidential and cannot be interpreted by a third party intercepting said exchanged information.

More specifically, the presently disclosed arrangements use a variation on the key binding method, with one or more of the following added characteristics:
  in order to provide enhanced security and to ensure privacy, all biometric data (including biometric templates), biometric recognition, cryptographic key generation, and private cryptographic key use corresponding to an authorized user are local to said authorized user in said authorized user's BCU;
  in order to provide enhanced security cryptographic key updating is used, wherein the cryptographic keys generated by an authorized user's BCU, and corresponding to said authorized user, are updated from time to time, with secure handover of the key binding function to the updated cryptographic keys;
  in order to provide enhanced security, all private cryptographic keys that are generated by a BCU and associated with a user of said BCU are disabled in their default state, and a specific private cryptographic key that is generated by an authorized user's BCU and is required for use in a specific cryptographic operation is enabled for use in said cryptographic operation if and only if said authorized user provides biometric authorization for said specific cryptographic operation, where biometric authorization involves said authorized user being positively biometrically identified by said BCU in combination with said authorized user providing permission for said specific cryptographic operation to be undertaken—in other words, an authorized user's private cryptographic keys are biometrically enabled for use by said authorized user's BCU on a operation by operation basis—said keys are not left in an enabled state for future, as yet unspecified, cryptographic operations;
  the incorporation of network operational elements that allow the privacy and security features to be implemented over a network such as the internet.

SUMMARY

There is disclosed herein a biometric identification method and apparatus to enable biometric identification over a network without any biometric information being released to said network, comprising:
  a biometric/cryptographic processing means (BCPM) incorporating, but not being limited to:
    a means to read or receive biometric information from a user of said BCPM;
    a means to determine whether said biometric information derived from said user corresponds to an authorized user of said BCPM and thereby determine whether said user is a said authorized user of said BCPM;
    a means to undertake cryptographic information processing, including a means encrypt and decrypt information according to one or more of a number of specified cryptographic protocols;
    a means to generate and store unique asymmetric private/public cryptographic key pairs corresponding to each authorized user of said BCPM, such that each said key pair is unique and dedicated to, or associated with, a specific authorized user, with said private keys being retained secretly in said BCPM and said public keys being released publicly;
    said means to generate and store unique asymmetric private/public cryptographic key pairs being independent of any biometric information or biometric identification methods;
    said private cryptographic keys being disabled in their default state, meaning that the BCPM is unable to use said private keys in their default state;
    a means to enable use by said BCPM of one or more of said private cryptographic keys (as appropriate) corresponding to an authorized user in a specific cryptographic operation if and only if said authorized user has provided biometric authorization for said specific cryptographic operation, where providing biometric authorization involves said authorized user being positively biometrically identified by said BCPM in combination with, or as an integral part of, said authorized user giving explicit permission for said specific cryptographic operation to be undertaken by said BCPM using private keys corresponding to said authorized user, with said private keys corresponding to said authorized user otherwise remaining in a disabled state;

said BCPM thereby being configured such that use of one or more of said private cryptographic keys corresponding to a specific authorized user is possible only if said authorized user has been positively biometrically identified by said BCPM in the corresponding biometric authorization process, and thereby being configured such that a determination by an external person or device that said BCPM is using any of said private cryptographic keys corresponding to a specific authorized user in a cryptographic operation is equivalent to a determination that said authorized user has been biometrically identified as the originator of said cryptographic operation;

said BCPM preferably being associated with a means to process and store information;

said BCPM preferably being associated with a means to display information stored in or generated by said means to process and store information;

said BCPM preferably being associated with a means for a user to input information by which at least the explicit permission can be given;

said BCPM preferably also being associated with a communications means;

said means to process and store information and said BCPM being connected such that information can be transferred between them;

said BCPM and said communications means being connected such that information can be transferred between them;

said communications means providing a means to transmit information to external devices and a means to receive information from external devices;

said BCPM being configured to accept information from either of said means to process and store information and said communications means, and further being configured to be able to process said information in a specific cryptographic operation using private cryptographic keys corresponding to a specific authorized user of said BCPM only if said authorized user has provided biometric authorization (described above) for said specific cryptographic operation, which biometric authorization involves positive biometric identification of said specific authorized user, and to output said cryptographically processed information to either of said means to process and store information and said communications means;

said BCPM, said means to process and store information, and said communications means together constituting a personal information device;

said personal information device thereby being configured such that a first authorized user of a first personal information device (incorporating a first BCPM) can use said first personal information device to generate and transmit first message information that is intended for a second authorized user of a second personal information device (incorporating a second BCPM), such that said first message information is prepared in said first BCPM using a private key stored in said first BCPM and corresponding to said first authorized user (thereby requiring positive biometric identification of said first authorized user by said first BCPM) and/or using a public key of a public/private key pair generated by said second BCPM and corresponding to said second authorized user;

said personal information device further being configured such that said second BCPM in said second personal information device is able to accept said first message information, process said first message information using a public key corresponding to said first authorized user to determine that said first message information was prepared using a private key corresponding to said first authorized user (thereby requiring positive biometric identification of said first authorized user by said first BCPM), and/or process said first message information using a private key corresponding to said second authorized user (thereby requiring positive biometric identification of said second authorized user by said second BCPM);

said personal information device thereby being configured such that a first authorized user of a first personal information device can use said first personal information device to generate and transmit second message information that is intended for a second cryptographically enabled device, such that said second message information is prepared in said first BCPM using a private key corresponding to said first authorized user (thereby requiring positive biometric identification of said first authorized user by said first BCPM) and/or using a public key corresponding to said second cryptographically enabled device;

said second cryptographically enabled device further being configured such that it is able to accept said second message information, process said second message information using a public key corresponding to said first authorized user to determine that said second message information was prepared using a private key corresponding to said first authorized user (thereby requiring positive biometric identification of said first authorized user by said first BCPM), and/or process said second message information using a private key corresponding to said second cryptographically enabled device;

said personal information device thereby being configured such that a first cryptographically enabled device can generate and transmit third message information that is intended for a second authorized user of a second personal information device, such that said third message information is prepared in said first cryptographically enabled device using a private key corresponding to said first cryptographically enabled device and/or using a public key generated by said second BCPM and corresponding to said second authorized user;

said personal information device further being configured such that said second personal information device is able to accept said third message information, process said third message information using a public key corresponding to said first cryptographically enabled device and/or process said third message information using a private key generated by said second BCPM and corresponding to said second authorized user (thereby requiring positive biometric identification of said second authorized user by said second BCPM).

Preferably said BCPM will incorporate into said first and second message information one or more timestamps indicative of the time or times at which said first or second message information (respectively) was cryptographically processed.

Preferably, but not necessarily, said biometric sensors may include (but not be limited to) one or more of a fingerprint reading device, an iris scanning device, a facial recognition device, a voice recognition device, a handprint scanning device, a blood circulation recognition device, a heartbeat monitor, and DNA reading apparatus. In addition, preferably said biometric sensors may include life-signs detection capabilities to determine whether said biometric sensors are deriving biometric information from a living body.

Preferably said means to determine whether said biometric information corresponds to an authorized user of said BCPM may involve using biometric template information stored in said BCPM, said biometric template information being compared in a specified manner with said biometric information. Preferably said means to determine whether said biometric information corresponds to an authorized user of said BCPM will not require or involve releasing any biometric information from said BCPM.

Preferably said BCPM may update said internally generated private/public key pairs corresponding to an authorized user from time to time by replacing them with new internally generated private/public key pairs, with the new internally generated private keys being retained secretly within said BCPM and the corresponding new public keys being released publicly.

Preferably said BCPM will incorporate tamper detection technology to prevent said BCPM being successfully tampered with or interrogated.

Preferably, but not necessarily, said BCPM may be incorporated into a single application-specific integrated circuit (ASIC).

Preferably, but not necessarily, said BCPM may be implemented in software and/or firmware.

There is further disclosed herein an information network comprising:
- a number of said BCPM or personal information devices able to exchange information with each other and with other devices by means of said information network;
- a public key distribution means, being a means to make available to any device on said network verified public key values for all cryptographically enabled devices (including said BCPM and said personal information devices) on said network;
- each biometrically associated public key that is generated by a BCPM corresponding to a specific authorized user of said BCPM and having associated with it identifying information pertaining to the said corresponding specific authorized user;
- each public key that is generated by a BCPM having a history (known as its public key history) of retired (past) and replacement (future) public keys, and corresponding active time windows, beginning with the first public key for the specific authorized user corresponding to said public key and ending with the last or currently-active public key for the specific authorized user corresponding to said public key;
- each public key that is generated by a cryptographically enabled device that is not a personal information device having a history (known as its public key history) of retired (past) and replacement (future) public keys, and corresponding active time windows, beginning with the first public key for said cryptographically enabled device and ending with the last or currently-active public key for said cryptographically enabled device;
- said public key distribution means retaining a public key history, including corresponding active time windows, for each public key used on said information network;
- each said BCPM on said information network preferably being configured such that for each authorized user of said BCPM it will retain a history of private/public key pairs (known as the authorized user's key pair history) that it generates, along with the active time window for each said key pair;
- each said cryptographically enabled device on said information network that is not a personal information device preferably being configured such that it will retain a history of private/public key pairs that it generates, along with the active time window for each said key pair;
- each said second BCPM on said information network preferably being configured such that it is able to authenticate and process received first message information with the correct cryptographic keys (after positively biometrically identifying said second authorized user) by using said timestamp(s) in said first message information to identify the key pairs corresponding to said timestamp(s) within said second BCPM, and by retrieving from said public key distribution means the public key(s) corresponding to said timestamp(s) for said first authorized user of said first BCPM from which said first message information originated;
- each said second cryptographically enabled device on said information network preferably being configured such that it is able to authenticate and process received second message information with the correct cryptographic keys by using said timestamp(s) in said second message information to identify its own key pairs corresponding to said timestamp(s) and by retrieving from said public key distribution means the public key(s) corresponding to said timestamp(s) for said first authorized user of said first BCPM from which said second message information originated;
- each said second BCPM on said information network preferably being configured such that it is able to authenticate and process received third message information with the correct cryptographic keys (after positively biometrically identifying said second authorized user) by using said timestamp(s) in said third message information to identify the key pairs corresponding to said timestamp(s) within said second BCPM and by retrieving from said public key distribution means the public key(s) corresponding to said timestamp(s) for said first cryptographically enabled device from which said third message information originated.

There is further disclosed a variation on the said BCPM and said information network, in which variation the biometrically associated cryptographic key pairs generated by a BCPM are one-time key pairs such that the private key of a said one-time key pair is used only once, after which it is retired, wherein:
- public keys corresponding to one-time biometrically associated key pairs generated by said second BCPM are prepositioned in said public key distribution means, and downloaded on a use-once as-needed basis to said first BCPM for use by said first BCPM in preparing message information;
- for each information transfer from said first BCPM to said second BCPM, one-time public keys associated with said information transfer that are generated by said first BCPM and said prepositioned one-time public keys associated with said information transfer that are generated by said second BCPM are associated with each other and made available via said public key distribution means, thereby enabling said second BCPM to use the correct keys in processing information received by said second BCPM from said first BCPM in said information transfer.

There is further disclosed herein a method and apparatus for enrolling a user (the enrollment system) in a said BCPM such that said user is thereby able to use said information network as described herein, said method and apparatus comprising:
- a said BCPM being prepared in an initial configuration, wherein said BCPM generates and retains a set-up asymmetric cryptographic key pair, comprising a private setup key and corresponding public setup key, said setup keys not corresponding to a particular user (i.e. not being biometrically associated), said private setup key being retained secretly within said BCPM, and said corresponding public setup key being provided securely to a network enrollment device that is part of said information network;
- said BCPM and said network enrollment device communicating with the aid of said setup key pair in order that said network enrollment device can securely establish both the identity and authenticity of said BCPM and the authenticity of information sent from said BCPM to said network enrollment device;
- said user providing to said enrollment system identifying information, along with required evidence in support of said identifying information (said evidence preferably being other than or in addition to biometric evidence);
- said BCPM taking biometric readings from said user and establishing within said BCPM one or more biometric templates or other biometrically based data corresponding to said user so as to enable subsequent biometric identification of said user by said BCPM;
- said BCPM preferably not releasing any of said user's biometric information;
- said BCPM then independently (i.e. without reference to any of said user's biometric information) generating one or more initial asymmetric cryptographic key pairs, each said initial key pair comprising an initial private key and an initial public key, said initial key pairs being associated in said BCPM with biometric identification of said user;
- said initial private keys being retained secretly in said BCPM;
- said BCPM then securely transmitting, via said communications means, said initial public key values and said identifying information for said user to said network enrollment device, said transmission preferably being authenticated by means of said private setup key;
- said network enrollment device preferably adding a unique identification code for said user to said initial public key values and said identifying information for said user, and then securely transmitting or making available to said public key distribution means said unique identification code and said initial public key values and said identifying information;
- said public key distribution means thereby establishing a record file for said user, who is at this point an authorized user, said record file initially including said identifying information for said user, said unique identification code for said user and said initial public key values.

In some preferred embodiments said network enrollment device may be said public key distribution means.

In one preferred embodiment said active time window for a public key and for the corresponding private/public key pair will be the time period commencing when said public key is first uploaded to said public key distribution means (the start time) and ending when said public key is retired by the uploading of a replacement public key to said public key distribution means.

In another preferred embodiment said active time window for a public key and for the corresponding private/public key pair will be the time period commencing at a predetermined time (the start time) after said public key is first uploaded to said public key distribution means and ending at the start time for the replacement public key, which may similarly be a predetermined time after said replacement public key is uploaded to said public key distribution means.

Preferably said identifying information for an authorized user of a BCPM will include personal information such as (but not limited to) name, date of birth, and gender of said authorized user.

In one embodiment said public key distribution means may preferably, but not necessarily, comprise the use of digital certificates in combination with one or more certificate authorities on said information network.

In another embodiment said public key distribution means may preferably, but not necessarily, comprise or include one or more public key repositories on said information network:
- said public key repositories providing a means to store and make available to any device on said network verified public key values and associated record file information for all BCPM on said network, as well as verified public key values for all other cryptographically enabled devices on said network, with said public key repositories being able to exchange information with BCPM and other devices on said network;
- said BCPM and other cryptographically enabled devices on said network being able to upload new verified public key values to said public key repositories in order to retire and replace corresponding current verified public key values retained in said public key repositories, with each public key (and corresponding private/public key pair) having an active time window being the time period between (i) the start time for use of said public key and (ii) the start time for use of the superseding public key (or, if said public key has not been superseded, the present time).

Preferably said public key distribution means will be configured such that a user or device on said information network is able to search said public key distribution means for a specific authorized user on said information network by using said identifying information and/or said unique identification code as search parameters, and thereby retrieve current or historical public key values corresponding to said specific authorized user, thereby enabling the preparation and transmission of biometrically identified message information, and further enabling the retrieval, authentication, decryption and reading of received biometrically identified message information.

According to another aspect of the present disclosure, there is provided a biometric and cryptographic processing unit (BCU) including:
- a biometric receiver to at least receive biometric information of a user of said BCU;
- a biometric unit comprising a store of biometric information of at least one authorized user of said BCU and at least one processing function to compare received biometric information from said biometric receiver with said stored biometric information to determine if the user is an authorized user of said BCU;
- a cryptographic unit for generating and storing at least one asymmetric cryptographic public/private key pair associated with each authorized user of the BCU, said private keys being retained within the cryptographic unit and disabled in a default state, and said public keys being communicable from the BCU for public use in communicating with the BCU; and at least one input/output port by which encrypted or unencrypted data is input to said BCU and from which the unencrypted or encrypted data (respectively) is output from the BCU;

the cryptographic unit being operative in response to a specific authorized user giving permission to undertake a specific cryptographic operation on data input to the BCU only upon the specific authorized user being determined as an authorized user of the BCU by the biometric unit whereby a specific private key corresponding to the specific authorized user is enabled for use in said specific cryptographic operation after which, and other than which, said specific private key is disabled.

BRIEF DESCRIPTION OF THE DRAWINGS

Preferred embodiments of the present invention will now be described by way of non-limiting example with reference to the schematic illustrations of FIGS. 1 to 9, wherein:

FIG. 6—comprising FIGS. 6(a) and 6(b)—is a schematic illustration of a preferred scheme for storing user information in the biometric/cryptographic processing means within a personal information device and in a public key repository (defined below), wherein both the personal information device and public key repository are part of the same information network;

FIG. 8—comprising FIGS. 8(a) and 8(b)—is a schematic illustration of a preferred method for a biometric/cryptographic processing unit in a personal information device that is part of an information network to find and retrieve cryptographic keys in order to cryptographically process biometrically associated information received from another personal information device that is also part of the same information network;

TERMS, DEFINITIONS AND SYMBOLS

Figure 1:
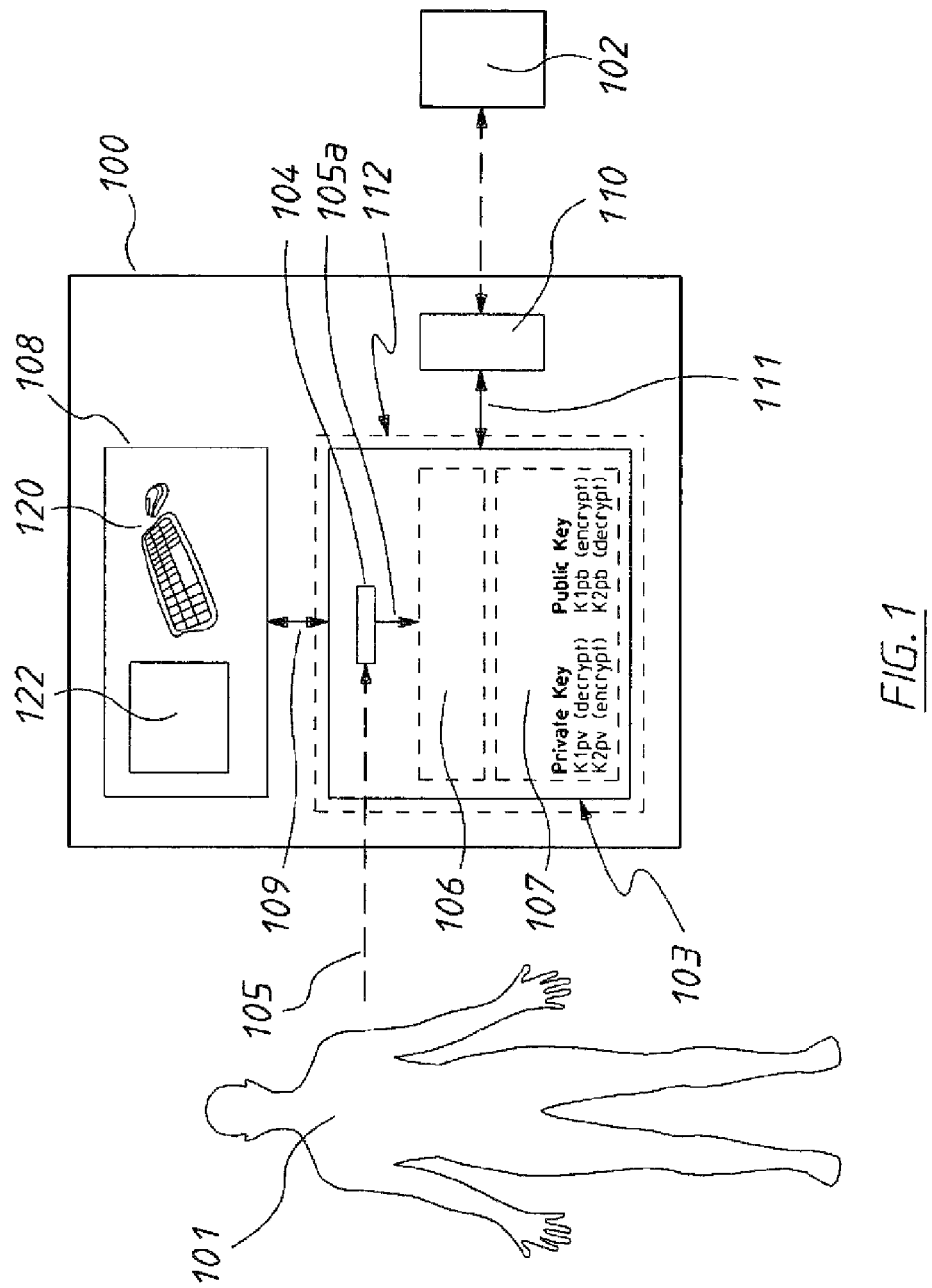
FIG. 1 is a schematic illustration of a personal information device incorporating a biometric/cryptographic processing means.

Asymmetric Encryption: In the present document the term asymmetric encryption (which is a well-known term) refers to an encryption protocol that uses a pair of cryptographic keys, Kpv and Kpb—one for encryption and the other for the corresponding decryption process. One of the keys—known as the private key, Kpv—is kept secret and the other key—the public key, Kpb—is made public (or at least it is to be assumed that it may be known publicly).

Cryptographic Keys: For asymmetric cryptographic systems the general term Kpv will be used to represent a private cryptographic key (which is retained secretly), while the general term Kpb will be used to represent the corresponding public cryptographic key. A private key Kpv can be either an encryption or a decryption key, with the corresponding public key Kpb being of the opposite type.

Verified Public Keys: The suffix (ver) will be used herein to denote a verified value of a public key that is obtained from a repository of verified public key values, such as the public key repository described herein. Hence, for example, Kpb(ver) is a verified value of the public key Kpb that has been obtained from said public key repository.

Information and Data: In the following descriptions the terms information and data will be used interchangeably.

BCU: In the following descriptions the acronym BCU is an abbreviation for "biometric/cryptographic processing unit", which is defined below.

PID: In the following descriptions the acronym PID is an abbreviation for "personal information device", which is a general term referring to a device that stores and processes information and into which a BCU is integrated or to which a BCU is connected, as described below. Non-limiting generic examples of forms that a PID may take include: cell phones, PDA's, laptop computers, and access control devices to gain access to buildings, locations, vehicles, bank accounts, etc.

Authorized User: An authorized user of a BCU (or a PID incorporating a BCU) is a user who has been enrolled to use said BCU and therefore who can be positively biometrically identified by said BCU, thereby enabling the use by said BCU in a specific authorized cryptographic operation of one or more private keys, Kpv, corresponding to unique key pairs, Kpv/Kpb, that are generated by said BCU and that correspond to and are dedicated to said authorized user.

Biometrically Identified and Biometrically Authenticated Information: In the following descriptions the terms "biometrically identified information" and "biometrically authenticated information" refer to information that is cryptographically processed in such a manner that the identity of either the sender or the recipient of said information, or both, can be biometrically verified, as described herein.

Connection to an Information Network: In the descriptions herein reference is made to devices that are "part of" an information network. It should be appreciated that this term implies said devices are capable of connecting to said information network and exchanging information with other devices on said network. This term do not imply that said devices are constantly or continuously connected to said information network—for example, a PID that is part of an information network may be switched off at times, but will still be "part of" said information network in that it retains the capability to connect to said information network and exchange information with other devices on said information network.

Encryption Nomenclature: In the descriptions below an expression of the form [D]K represents data D that has been encrypted using the cryptographic key K; while an expression of the form $D|^{DS}Kpv$ represents a digital signature derived from data D using private key Kpv.

DETAILED DESCRIPTION OF THE PREFERRED EMBODIMENTS

The present invention relates generally to the design, configuration and operation of a biometric/cryptographic processing unit (BCU)—described in detail below—and of personal information devices (PID's) that incorporate said biometric/cryptographic processing unit.

The purposes of said BCU's and associated techniques include:
  enabling a first person to be biometrically identified to a second person (or persons) or to another device over a network such as the internet;
  enabling secure, biometrically authenticated person-to-person or person-to-device communications over a network;
  enabling a first person to identify and send a biometrically authenticated message to a second person over a network, such that said first person is biometrically identified to said second person and only said second person (after biometric identification) can read said message;
all of the above being enabled without biometric information corresponding to said first person or said second person being released into said network.

FIG. 1 is a schematic illustration of a preferred embodiment of a biometric/cryptographic processing unit (BCU) 103, and a personal information device (PID) 100 incorporating the BCU 103. In the embodiment of FIG. 1 the BCU 103 is used to biometrically identify an authorized user 101 to an external device 102 and to enable biometrically-identified information exchange between the PID 100 and external device 102. The external device 102 could in some embodiments be another PID operated by a second user.

As should be obvious, the illustration of FIG. 1 is not to scale. Normally the PID 100 would be small compared with the size of a human being—for example it may be in the form of a cell phone; PDA; laptop computer; or access control device to gain access to a building, location, vehicle, bank account, etc. Each BCU 103 (and therefore each PID 100) may have one or more authorized users, each of whom is identified to the BCU 103 by biometric means.

The PID 100 incorporates, but is not limited to:
  the biometric/cryptographic processing unit (BCU) 103;
  information processing and information storage functions 108; and
  a communications unit 110.

The BCU 103 includes a capability to biometrically identify an authorized user 101 and directly associates said authorized user 101 with specific cryptographic keys that are known only to the BCU 103 and that are preferably generated by the BCU 103. The BCU 103 also enables information generated by the information processing and information storage functions 108 to be biometrically associated with authorized user 101.

The BCU 103 incorporates, but is not limited to, the following apparatus and/or capabilities:
  one or more biometric sensors 104 to at least receive and preferably read input biometric information 105 from a user and to output corresponding biometric data 105a;
  internal biometric processing functions 106;
  internal cryptographic processing functions 107;
  information input/output ports, such as the ports 109 and 111 in the embodiment of FIG. 1.

The biometric sensor 104 reads biometric information 105 from a user 101. In one specific embodiment the biometric sensor 104 may be a fingerprint scanner, but it should be appreciated that other biometric sensing techniques and apparatus may be used instead, and that multiple types of biometric information 105 may be gathered from a user 101 to generate the output biometric data 105a. It should be appreciated that the process of gathering biometric information should preferably involve as little disruption as possible to a user operating the PID 100. In an alternative embodiment, the sensor 104 may be configured as a receiver to receive the biometric data 105a from an external input, to which at least one appropriate biometric sensor is operatively coupled. Such can permit remote input of biometric information, for example via specific biometric sensor(s) coupled to the BCU 103 or PID 100.

In one embodiment the biometric processing function unit 106 may include or comprise the means to undertake optical recognition of all or part of a user's face, and the BCU 103 or PID 100 may incorporate a user-facing camera that captures an image of all or the relevant part of the face of the user, and processes said image so as to enable biometric recognition of the user. One specific example of this embodiment may use facial recognition, while another example may use iris recognition, while yet another example may use a combination of facial and iris recognition.

In another embodiment the biometric processing functions 106 may include or comprise voice recognition, and the PID 100 may incorporate a microphone that captures the voice of the user, and processes said user's voice so as to enable biometric recognition of the user.

In another embodiment the biometric processing functions 106 may include or comprise a combination of the above-described optical recognition of all or part of a user's face and the abovedescribed voice recognition, and the PID 100 may incorporate both a user-facing camera that captures an image of all or the relevant part of the face of the user and a microphone that captures the voice of the user.

In yet another embodiment the biometric processing functions 106 may include or comprise fingerprint recognition—either alone or in combination with any of the abovedescribed biometric recognition techniques—and the PID 100 may incorporate a fingerprint reading device with a reading surface situated on the PID 100 such that one or more of a user's fingers rests naturally on said reading surface, so that reading of a user's fingerprint(s) can be carried out with minimal disruption or inconvenience to the user.

The biometric data 105a output from the biometric sensor 104 is input to, and processed by, the biometric processing functions 106 in order to biometrically identify the user 101—i.e. to determine whether the biometric data 105a corresponds to an authorized user of the BCU 103. Said biometric identification may be carried out using any of a number of known techniques. In one preferred approach biometric identification may be carried out by comparing the biometric data 105a with a template generated and stored within the BCU 103. In one preferred embodiment said template may be a matching template, in which features of the biometric data 105a are matched directly with equivalent features in said matching template—for example, the inflection point characteristics of a measured fingerprint may be compared directly with stored template inflection point characteristics. In another preferred embodiment said template may be a so-called "biometric encryption" template, and a known technology called biometric encryption may be used to process the biometric data 105a to determine whether said biometric data 105a corresponds to an authorized user of the BCU 103. An advantage of using said biometric encryption technology is that the biometric encryption template is not a direct match with the corresponding user's biometric data and hence poses a lower privacy risk to the user if it becomes known.

For each authorized user 101 of BCU 103, the cryptographic processing functions 107 in the BCU 103 generate and retain one or more asymmetric cryptographic key pairs, Kpv/Kpb, that are associated with said authorized user 101, where Kpv represents a "private" cryptographic key and the Kpb represents the corresponding "public" cryptographic key of the key pair Kpv/Kpb. Preferably, but not necessarily, each different key pair, Kpv/Kpb, retained in BCU 103 and associated with authorized user 101 will be used for a different type of cryptographic operation. Each of the key pairs Kpv/Kpb corresponding to an authorized user 101 of the BCU 103 is preferably generated within the cryptographic processing functions 107 and stored within the BCU 103. Each private key Kpv is retained secretly and securely within the BCU 103 and is preferably never released by the BCU 103, while each corresponding public key Kpb is made publicly available. Preferably each of said cryptographic key pairs Kpv/Kpb generated by the cryptographic processing functions 107 is unique and uniquely associated with an authorized user 101 of BCU 103.

It is important to appreciate that each biometrically associated cryptographic key pair Kpv/Kpb is generated independently within the cryptographic processing functions 107 and is not derived in any way from biometric data for the authorized user 101 with which said key pair Kpv/Kpb is associated. The association between key pair Kpv/Kpb and biometric identification of the corresponding authorized user 101 is established independently of the process of generating the key pair Kpv/Kpb. Key generation within the cryptographic processing functions 107 is separate from the biometric identification process, thereby providing complete flexibility in the selection of cryptographic keys corresponding to an authorized user.

In its default state, the BCU 103 is configured such that the private keys, Kpv, corresponding to an authorized user 101 of BCU 103 are disabled—i.e. are not available for use, and in particular are not available for use by the cryptographic processing functions 107 in BCU 103. As described above, the corresponding public keys, Kpb, are released publicly for access and use by anyone.

Preferably one or more private cryptographic keys, Kpv, corresponding to an authorized user 101 of BCU 103 that are required for use in a specific cryptographic operation will be enabled for use by the internal cryptographic processing functions 107 in said specific cryptographic operation if and only if authorized user 101 has provided biometric authorization for said specific cryptographic operation, where said biometric authorization for said specific cryptographic operation is a process that includes (i) said authorized user 101 being positively biometrically identified by the biometric processing functions 106 at the time said biometric authorization is provided, and (ii) said positive biometric identification forming an integral part of, or being associated with, the process of said authorized user 101 providing explicit permission for said specific cryptographic operation to be undertaken. In this way said specific cryptographic operation is unambiguously biometrically identified with said authorized user 101. Said biometric authorization is indicated to the cryptographic processing functions 107, thereby enabling the required private keys, Kpv, to be used by the cryptographic processing functions 107 in said specific cryptographic operation but not in any other operation. Expressed another way, each specific cryptographic operation to be undertaken by the cryptographic processing functions 107 that requires the use of one or more private keys, Kpv, corresponding to authorized user 101 will require specific corresponding biometric authorization by authorized user 101 for said specific cryptographic operation. Said private keys, Kpv, corresponding to authorized user 101 are not thereby enabled for use in any operation other than said specific cryptographic operation—i.e. other than for said biometrically authorized specific cryptographic operation, said private keys, Kpv, remain in their default disabled state.

It is important to appreciate that the private keys, Kpv, are only ever enabled for specific biometrically authorized cryptographic operations, and otherwise remain disabled (which is their default state).

It should be appreciated that a single positive biometric identification of authorized user 101 may be used as the basis for providing biometric authorization for one or more specific cryptographic operations that require use of private keys, Kpv, corresponding to authorized user 101.

In a non-limiting example, authorized user 101 of BCU 103 may wish to digitally sign a document. In this example the BCU 103 or PID 100 may present to authorized user 101 an option to generate a biometrically associated digital signature—i.e. a digital signature that a third party can verify was generated by (biometrically identified) authorized user 101. Authorized user 101 may then carry out an action indicating permission to generate a biometrically associated digital signature, while at the same time providing biometric data to facilitate biometric identification. For example, authorized user 101 may tap a screen icon indicating permission to generate a biometrically associated digital signature while at the same time the BCU 103 or PID 100 takes an image of authorized user 101's face or iris to enable biometric identification of authorized user 101; or authorized user 101 may press a screen icon indicating permission to generate a biometrically associated digital signature while at the same time the area of the screen on which said icon appears may act as a fingerprint imaging device, taking an image of authorized user 101's fingerprint to enable biometric identification of authorized user 101. A private encryption key, Kpv, stored in BCU 103 and corresponding to authorized user 101, is then enabled in order to generate said biometrically associated digital signature, but for no other operation—otherwise said private encryption key, Kpv, remains disabled.

In general, a cryptographic operation requiring the use (by the cryptographic processing operations 107) of private keys, Kpv, corresponding to authorized user 101 may be either (i) biometrically authorized for immediate execution (real time biometric authorization), or (ii) biometrically pre-authorized for future execution. Biometric authorization by authorized user 101 for immediate execution (real time biometric authentication) involves enabling the required private keys, Kpv, for use in undertaking said specific cryptographic operation immediately. Biometric pre-authorization by authorized user 101 involves enabling the required private keys, Kpv, for use in executing said specific cryptographic operation on one or more occasions in the future according to rules that are also authorized by authorized user 101.

Real time biometric authorization is preferred or required for most biometrically associated cryptographic operations, in order for the biometric association to carry the appropriate security and identification implications. In some situations, however, biometric pre-authorization may be appropriate—for example, authorized user 101 may provide biometric pre-authorization for future key updating operations. For simplicity, in the descriptions and preferred embodiments that follow it is assumed (unless otherwise stated) that all biometric authorization processes are real time, but it should be appreciated that in alternative embodiments biometric pre-authorization may instead be employed.

It is important to appreciate that the private keys, Kpv, corresponding to authorized user 101 are disabled for any and all operations that are not biometrically authorized by authorized user 101. In the default state—i.e. when their use is not biometrically authorized—said private keys, Kpv, are disabled. This is in contrast to the usual implementation of the abovedescribed "key release" method, in which biometric identification releases stored information, including cryptographic keys, for use over a period of time such as a user session.

It should also be noted that only the secretly-retained private keys, Kpv, corresponding to authorized user 101 need to be enabled for biometrically authorized cryptographic operations—the corresponding public keys, Kpb, are made public for anyone to access and use.

If the biometric processing functions 106 in BCU 103 are unable to determine that the biometric data 105*a* obtained from a user corresponds to an authorized user of the BCU 103, then all biometrically associated private keys, Kpv, that are secretly retained in the BCU 103—corresponding to authorized users of the BCU 103—will remain disabled (which, as described above, is the default state for said private keys). In other words, said BCU 103 will not be able to use any of the internally-generated private keys that correspond to authorized users of the BCU 103. The default state for the BCU 103 is that the internally generated private keys corresponding to authorized users of the BCU 103 are disabled.

In one embodiment the BCU 103 may associate one unique "active" key pair Kpv/Kpb with an authorized user 101 of the PID 100, which key pair Kpv/Kpb may be updated by the BCU 103 from time to time, thereby replacing the previous key pair. In another embodiment the BCU 103 may associate two or more unique "active" key pairs—K1*pv*/K1*pb*, K2*pv*/K2*pb*, etc.—with an authorized user 101 of the PID 100, which key pairs—K1*pv*/K1*pb*, K2*pv*/K2*pb*, etc—may be updated by the BCU 103 from time to time, thereby replacing the previous key pairs.

As described above, the BCU 103 will enable the secretly-retained private keys, Kpv, that are associated with a specific authorized user 101 to be used by the internal cryptographic processing functions 107 in a specific cryptographic operation only if the biometric processing functions 106 in BCU 103 have positively biometrically identified authorized user 101 in the associated biometric authorization procedure. Hence use by the internal cryptographic processing functions 107 of one or more of the private keys, Kpv, that are associated with authorized user 101 is equivalent to positive biometric identification of the authorized user 101. This equivalence is assured by the fact that, as described above, biometric authorization by authorized user 101 is for a specific cryptographic operation and the private keys, Kpv, are not enabled for use in any operation other than said specific cryptographic operation. Consequently if it can be established that a private cryptographic key, Kpv, corresponding to authorized user 101 has been used in a cryptographic process, it can reliably be concluded that said corresponding authorized user 101 was present at the time said cryptographic operation was authorized, and in the case of real time biometric authorization this means that authorized user 101 was present at the time said cryptographic operation was carried out. Hence if an external device 102 (see FIG. 1) can determine that the BCU 103 in PID 100 has used one or more private keys, Kpv, associated with authorized user 101 for a specific cryptographic operation, then said external device 102 can conclude that said authorized user 101 was positively biometrically identified by the BCU 103 at the time said specific cryptographic operation was authorized, which in the case of real time biometric authorization is the time said specific cryptographic operation was carried out. It should be appreciated that positive biometric identification of said authorized user 101 to said external device 102 occurs without any of said authorized user 101's biometric information being released from the BCU 103.

Biometric authorization is therefore a process that allows an authorized user of a BCU to be unambiguously biometrically identified by another person or device as the originator of a specific cryptographic operation carried out by the cryptographic processing functions within said BCU, without any of said authorized user's biometric information being released from said BCU. Private keys generated and stored in a BCU and corresponding to an authorized user of said BCU (biometrically associated private keys) are disabled in their default state—i.e. said private keys in their default state cannot be used by said BCU. A biometrically associated private key is only enabled for use in a specific cryptographic operation if the authorized user corresponding to said private key provides biometric authorization for said specific cryptographic operation, where providing biometric authorization involves said authorized user being positively biometrically identified by the biometric processing functions in said BCU in combination with, or as an integral part of, said authorized user giving permission for said specific cryptographic operation to be undertaken by said BCU using an appropriate private key corresponding to said authorized user. Said specific cryptographic operation will generate output data. If another person or device can determine that one of said authorized user's biometrically associated private keys was used to generate said output data, then said other person or device can reliably conclude that said authorized user has been biometrically identified as the originator of said specific cryptographic operation. Said other person or device can confirm that one of said authorized user's private keys has been used to generate said output data by processing said output data using said authorized user's corresponding public key, to which said other person or device has access (since said public keys are made generally available). Biometric identification of said authorized user by said other person or device is thereby undertaken without any of said authorized user's biometric information being released from said BCU.

In one specific preferred embodiment, illustrated in FIG. 1, the internal cryptographic processing functions 107 may generate two unique "active" key pairs, K1*pv*/K1*pb* and K2*pv*/K2*pb*, and associate said two key pairs with authorized user 101 of the BCU 103. Preferably, but not necessarily, one key pair, K1*pv*/K1*pb*, may be used for encryption of information sent from a remote device 102 to the PID 100, in which case the private decryption key, K1*pv*, will be used to decrypt received information that was encrypted by a remote device 102 using the corresponding public encryption key K1*pb*.

Preferably, but not necessarily, the other key pair, K2pv/K2pb, may be used by the BCU 103 to generate digital signatures using the private encryption key K2pv, with said digital signatures being transmitted to a remote device 102 for decryption and verification using the corresponding public decryption key K2pb.

In a variation on the embodiments described above and elsewhere in this document, a BCU 103 may generate key pairs corresponding to an authorized user 101, including multiple unique key pairs Kpv/Kpb of the same type corresponding to authorized user 101—for example, multiple unique key pairs Kpv/Kpb where in each case the key Kpv is a private encryption key and the key Kpb is the corresponding public decryption key; or multiple unique key pairs Kpv/Kpb where in each case the key Kpv is a private decryption key and the key Kpb is the corresponding public encryption key—with each of said key pairs Kpv/Kpb of the same type corresponding to a different set of characteristics, or a different user profile, for said authorized user 101. For example, one specific key pair may represent a first user profile for authorized user 101, while another specific key pair of the same type may represent a second user profile for authorized user 101. When authorized user 101 is required to provide biometric authorization for a specific cryptographic operation, the BCU 103 may present to authorized user 101 a choice of said user profiles, each said user profile being associated with a different unique private key, Kpv, corresponding to authorized user 101, and with each of the private keys corresponding to said user profiles being of the correct type to undertake said specific cryptographic operation. By selecting a user profile, authorized user 101 is in effect selecting the private key, Kpv, that will be used to undertake said specific cryptographic operation. For example, when authorized user 101 is required to provide biometric authorization for a specific cryptographic operation (such as digitally signing a document), the BCU 103 may present a choice of user profiles—perhaps one or more professional profiles and one or more private profiles—for authorized user 101 to select from in carrying out said specific cryptographic operation. The private key, Kpv, corresponding to the selected user profile will then be used to undertake the specific cryptographic operation. Suppose that in such a process authorized user 101 selects user profile 1, for which the corresponding unique key pair is $Kpv^{prof1}/Kpb^{prof1}$. Then the private key $Kpv^{prof1}$ will be used to carry out said specific cryptographic operation, which will generate output data. A recipient of said output data can then use public key $Kpb^{prof1}$ to biometrically identify authorized user 101 as the originator of said output data (as described elsewhere in this document), where in this example authorized user 101 will be defined to said recipient by user profile 1.

In addition to the capability to generate and store cryptographic key pairs, Kpv/Kpb, corresponding to authorized users of the BCU 103, the internal cryptographic processing functions 107 will preferably include the capability to encrypt and decrypt information by means of one or more of a number of cryptographic methods or algorithms.

In some embodiments the BCU 103 may generate and store "non-biometric" cryptographic keys that are not associated with authorized users of the BCU 103 and that the BCU 103 can use without requiring biometric identification of an authorized user. Such non-biometric cryptographic keys may be used for general cryptographic operations, such as securing communications between the PID 100 and another device, but will not provide any biometric identification capability. The use of such non-biometric cryptographic keys may or may not be restricted in some way.

Figure 1A:
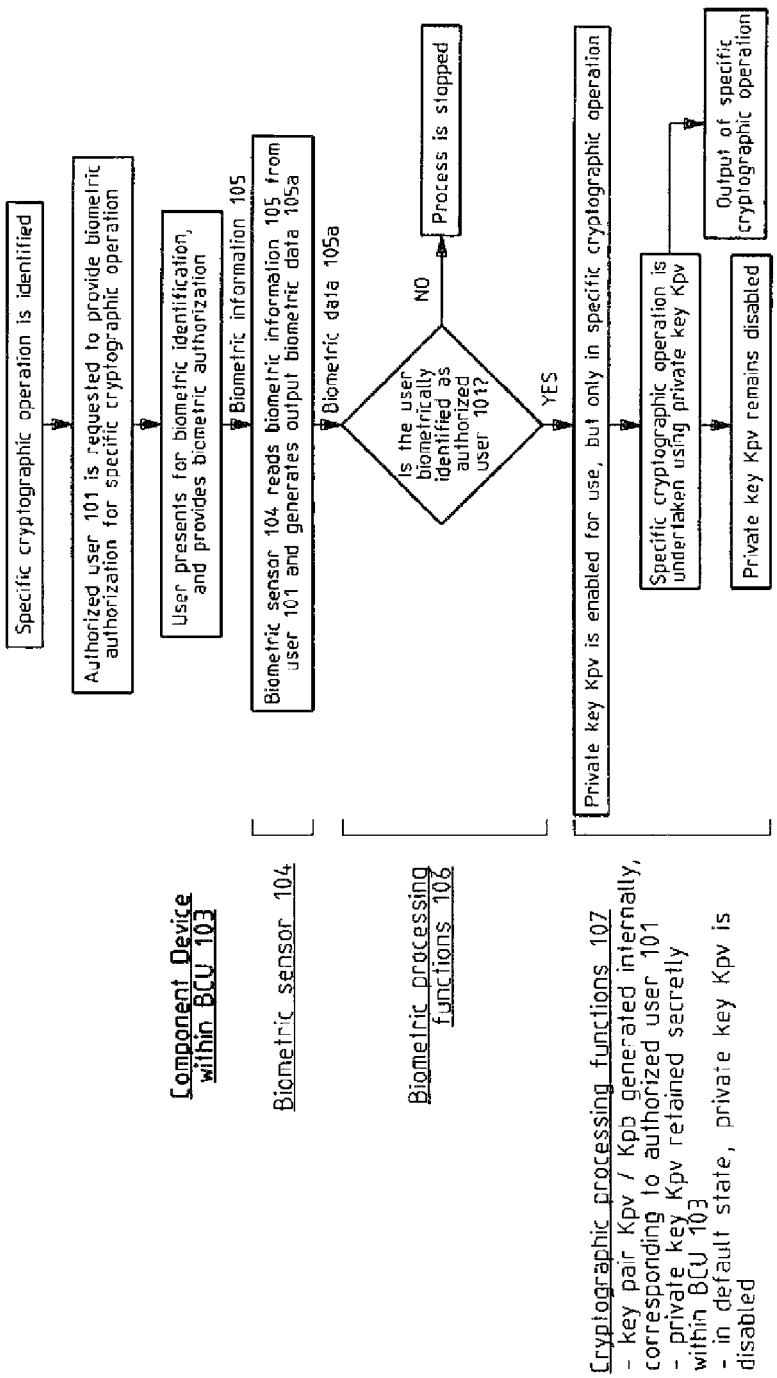
FIG. 1(a) is a schematic illustration of a preferred method of operation of the biometric/cryptographic processing means in the personal information device of FIG. 1.
Figure 1B:
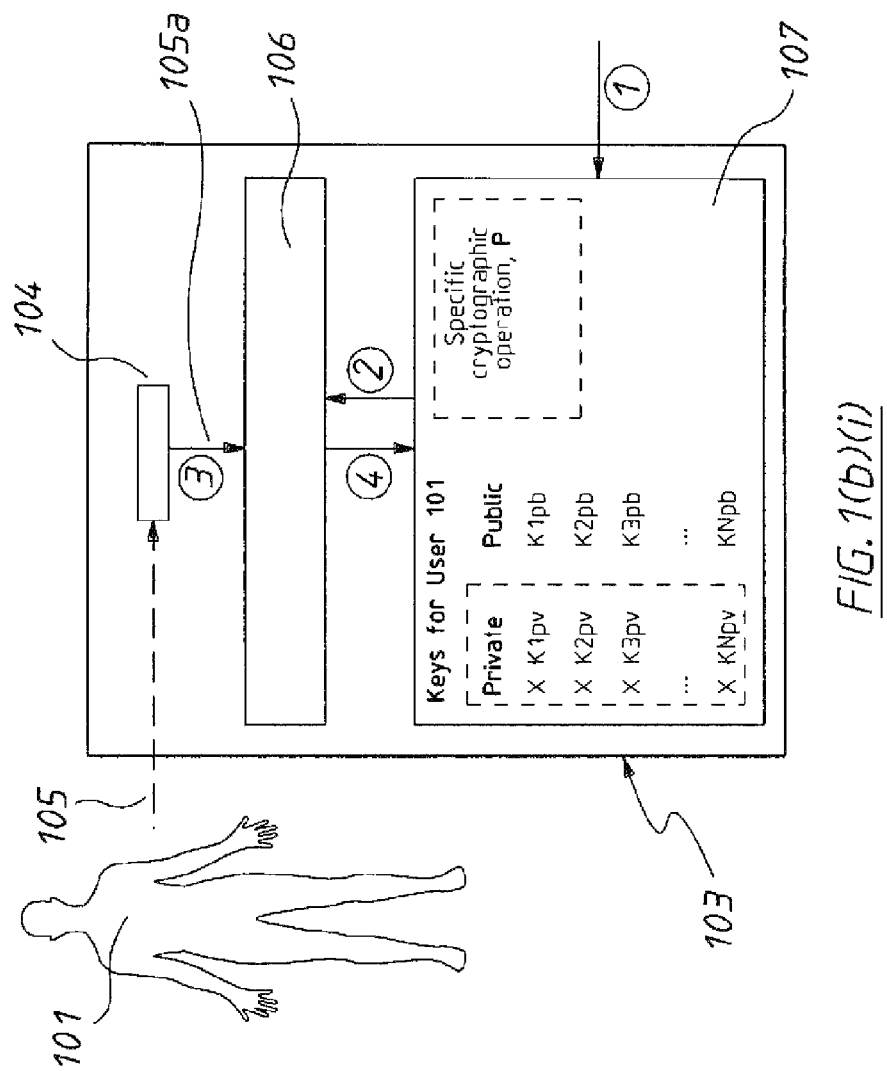
FIG. 1(b)—comprising FIGS. 1(b)(i), 1(b)(ii) and 1(b)(iii)—is a second schematic illustration showing a preferred method of operation of the biometric/cryptographic processing means in the personal information device of FIG. 1.

FIG. 1(a) is a schematic illustration of a typical sequence of events in a non-limiting preferred embodiment of the BCU 103. For simplicity, only a single key pair, Kpv/Kpb, corresponding to authorized user 101 of BCU 103 is used in the embodiment of FIG. 1(a), although it should be appreciated that the embodiment of FIG. 1(a) can be extended to the use of multiple key pairs corresponding to authorized user 101. In the illustration of FIG. 1(a) the BCU 103 is required to undertake in real time a biometrically authenticated specific cryptographic operation that requires the use of a (secret) private cryptographic key, Kpv, corresponding to authorized user 101 of BCU 103, thereby associating positive biometric identification of authorized user 101 with said specific cryptographic process. As described above, the private key Kpv is enabled for use by the cryptographic processing functions 107 for said specific cryptographic operation only if authorized user 101 is positively biometrically identified by the biometric processing functions 106 as part of biometric authorization by authorized user 101 for said specific cryptographic operation to be undertaken. The sequence of events in the example of FIG. 1(a) is as follows:

1. A specific cryptographic operation to be undertaken by the cryptographic processing functions 107 in BCU 103, and requiring the use of private key Kpv corresponding to authorized user 101, is identified.
2. Authorized user 101 is requested to biometrically authorize said specific cryptographic operation.
3. User 101 presents for biometric identification as part of the biometric authorization process. In the case of fingerprint biometrics, this would involve user 101 presenting a finger to the biometric sensor 104 (in this example a fingerprint scanner). In this preferred embodiment providing biometric information also indicates authorization (conditional on positive biometric identification of authorized user 101) for said specific cryptographic operation (but no other operation) to be undertaken and to be biometrically associated with authorized user 101 (i.e. for said specific cryptographic operation to use the private key, Kpv, corresponding to authorized user 101).
4. The biometric sensor 104 reads biometric information 105 from user 101 and generates from it biometric data 105a. The biometric data 105a is transferred to the biometric processing functions 106.
5. The biometric processing functions 106 determine whether the biometric data 105a corresponds to authorized user 101. If YES (i.e. the biometric data 105a does correspond to authorized user 101), then steps 6 and following are undertaken. If NO (i.e. authorized user 101 has not been biometrically identified), then the process is stopped.
6. An indication of positive biometric identification of authorized user 101 is transferred to the cryptographic processing functions 107, along with permission to use private key Kpv in said specific cryptographic operation—in other words, authorized user 101's biometric authorization to undertake said specific cryptographic operation is communicated to the cryptographic processing functions 107. The cryptographic processing functions 107 have previously generated the key pair Kpv/Kpb and associated said key pair with biometric identification of authorized user 101. As described above, the private key, Kpv, is retained secretly within the BCU 103, while the corresponding public key, Kpb, is released publicly. With the cryptographic processing functions 107 in their default state, the key Kpv is disabled—i.e. the cryptographic processing functions 107 are unable to use the key Kpv. Biometric authorization by authorized user 101 to undertake said specific cryptographic operation, including positive biometric identification of authorized user 101 by biometric processing functions 106, enables the private key Kpv for use by the cryptographic processing functions 107 to carry out said specific cryptographic operation, but for no other process or function—i.e. other than for said specific cryptographic operation said private key, Kpv, remains disabled.

7. Said specific cryptographic operation is carried out by the cryptographic processing functions 107 using the private key Kpv.

8. The private key Kpv then returns to (or remains in) its default disabled state.

9. The results of said specific cryptographic operation are output from the BCU 103.

As described above, the cryptographic key pair Kpv/Kpb is generated by the cryptographic processing functions 107 and is associated with authorized user 101. However, both the cryptographic key pair Kpv/Kpb and the process for generating the cryptographic key pair Kpv/Kpb are unrelated to the biometric data 105a or biometric template(s) corresponding to authorized user 101. The cryptographic key pair (or pairs, in other embodiments) corresponding to authorized user 101 are generated independently by the cryptographic processing functions 107 and subsequently associated with biometric identification of authorized user 101.

Separating the generation of the cryptographic keys Kpv/Kpb from any biometrically-derived values allows the greatest possible flexibility in determining said cryptographic key values, and also means that no biometrically-related information leaks out of the BCU 103 via the values of the publicly-released public keys Kpb.

As described in relation to the embodiment of FIG. 1(*a*), biometric authorization of said specific cryptographic operation by authorized user 101, including positive biometric identification of authorized user 101 by the biometric processing functions 106, in essence acts as a switch that enables use by the cryptographic processing functions 107 in said specific cryptographic operation (but in no other operation) of the private key, Kpv, corresponding to authorized user 101.

FIG. 1(*b*) is a schematic illustration of another non-limiting preferred method of operation of the BCU 103. In the embodiment of FIG. 1(*b*) authorized user 101 is enrolled to use the BCU 103. In this example the cryptographic processing functions 107 have generated a number of cryptographic key pairs, K1$pv$/K1$pb$, K2$pv$/K2$pb$, K3$pv$/K3$pb$, . . . KN$pv$/KN$pb$, and associated said key pairs with biometric identification of authorized user 101: As described above, the secret keys, K1$pv$, K2$pv$, K3$pv$, . . . KN$pv$, are retained secretly and securely in the cryptographic processing functions 107 and in their default state are disabled, as indicated by the cross next to each private key value in FIG. 1(*b*). In the preferred embodiment of FIG. 1(*b*) the cryptographic processing functions 107 are requested to perform a specific cryptographic operation, P. The cryptographic processing functions 107 determine that undertaking the specific cryptographic operation P requires use of the private key K2$pv$ corresponding to authorized user 101, and therefore authorized user 101 must provide biometric authorization for the operation P, which in turn requires that authorized user 101 be positively biometrically identified by the biometric processing functions 106. The cryptographic processing functions 107 may be able to determine that the key K2$pv$ is required to perform the specific cryptographic operation P as a result of the request to perform the operation P incorporating the corresponding public key K2$pb$—for example the operation P may involve decrypting information that was encrypted with the public encryption key K2$pb$. A preferred sequence of events involved in undertaking the specific cryptographic operation, P, is as follows. (Numbers in circles in FIG. 1(*b*) correspond to the sub-paragraph numbers below.)

1. FIG. 1(*b*)(*i*): The cryptographic processing functions 107 receive a request to undertake a specific cryptographic operation P. Undertaking the operation P requires use of the private key K2$pv$ corresponding to authorized user 101, and therefore requires biometric authorization by authorized user 101 (which in turn requires positive biometric identification of authorized user 101 by the biometric processing functions 106).

2. FIG. 1(*b*)(*i*): The cryptographic processing functions 107 present a request to the biometric processing functions 106 for biometric authorization by authorized user 101 of the specific cryptographic operation P (which operation P requires use of the private key, K2$pv$, corresponding to authorized user 101).

3. FIG. 1(*b*)(*i*): Authorized user 101 provides biometric authorization for the specific cryptographic operation P. This includes authorized user 101 providing biometric information 105 to the biometric sensor 104, which outputs biometric data 105a to the biometric processing functions 106. The biometric processing functions 106 determine whether the biometric data 105a corresponds to authorized user 101. If YES, the specific cryptographic operation P is biometrically authorized, and steps 4 (below) and following are undertaken. If NO, no the process is stopped and the specific cryptographic operation P is not undertaken.

4. FIG. 1(*b*)(*i*): The biometric processing functions 106 confirm to the cryptographic processing functions 107 biometric authorization by authorized user 101 of the specific cryptographic operation P by confirming that (i) authorized user 101 has been positively biometrically identified and (ii) in facilitating said positive biometric identification, authorized user 101 authorized that the specific cryptographic operation P be carried out (requiring use of private key K2$pv$).

5. FIG. 1(*b*)(*ii*): Biometric authorization by authorized user 101 of the specific cryptographic operation P enables the private key K2$pv$ for the specific cryptographic operation P—the enabled key K2$pv$ is indicated by a check mark next to the key value in FIG. 1(*b*). The key K2$pv$ is enabled only for the specific cryptographic operation P, and otherwise remains in its default disabled state. All other private keys corresponding to authorized user 101 remain in their default disabled state.

6. FIG. 1(*b*)(*iii*): The specific cryptographic operation P is undertaken and the results are output from the cryptographic processing functions 107. The private key K2$pv$ returns to (or remains in) its disabled state. It is important to appreciate that throughout the above process the private key K2$pv$ remains disabled for all operations other than the specific cryptographic operation P.

The BCU 103 may be a separate stand-alone device that connects to other information processing devices or functions. In one embodiment it may be a module that plugs into another device. For example, the BCU 103 may be a card or module that can be plugged in to a cell phone, PDA or laptop computer. Typically (but not necessarily) the BCU 103 will be incorporated into a larger information processing device, as illustrated in the preferred embodiment of FIG. 1, in which the BCU 103 is incorporated into the PID 100. This configuration is advantageous because while the BCU 103 provides biometric/cryptographic functions that can be biometrically associated with an authorized user 101, thereby enabling biometric identification of authorized user 101 to a remote device 102 without any of authorized user 101's biometric data being released from the BCU 103, generally this biometric identification will be of greatest value when it is associated with other information. Said other information, when prepared within the PID 100, will typically be processed in functions external to the BCU 103. In the embodiment of FIG. 1 said external functions are incorporated into the information processing and information storage functions 108. Associating the BCU 103 with said information processing and information storage functions 108 allows biometric identification of an authorized user to be associated with the information generated by the information processing and information storage functions 108. The information processing and information storage functions 108 could in principle include any type of information processing function. Typical non-limiting examples include the types of information processing and storage functions commonly found in cell phones, PDA's, iPhones, and laptop computers, but it should be appreciated that any type of information processing function could be included in the information processing and information storage functions 108. The information processing and information storage functions 108 may also include a display screen 122 to display information to a user of the PID 100, and an information input means 120. Examples of said information input means 120 include a manual information input interface such as (but not limited to) a keyboard, mouse pointer or touchscreen, or a non-manual information input means such as (but not limited to) a barcode scanner, radio frequency receiver, or radio frequency identification (RFID) reading device. The information input means 120 is used by the authorized user 101 to carry out an action indicating permission, as discussed above, to implement a biometrically associated cryptographic operation, thereby necessitating the providing at the same time of biometric data to facilitate biometric identification or re-identification of the authorized user. Information exchange between the information processing and information storage functions 108 and the BCU 103 is via a two-way information channel 109.

In another preferred embodiment the information processing functions of the BCU 103—specifically the biometric processing functions 106 and cryptographic processing functions 107—may be implemented in the form of software and/or firmware in the BCU 103 (if the BCU is a separate device) or in the PID 100. Software or firmware implementations are in general more convenient to deploy and can be less expensive to develop, but have the disadvantage that they are usually less secure than hardware implementations.

The PID 100 also includes a communications unit 110 to transmit information to remote devices 102 and receive information from remote devices 102. Information is transferred between the BCU 103 and the communications unit 110 via a two-way information channel 111. In one preferred embodiment the communications unit 110 may provide a wired means to send information to, and receive information from, remote devices 102, while in another preferred embodiment the communications unit 110 may provide a wireless means to send information to, and receive information from, remote devices 102.

Preferably the BCU 103 may include tamper indicating features—indicated by the dashed line 112 in FIG. 1—to protect against physical or electronic interrogation of, or tampering with, the BCU 103.

In one preferred embodiment the BCU 103 may be incorporated into a single application-specific integrated circuit (ASIC), thereby allowing a high degree of security against tampering or interrogation of the functions or data associated with the BCU 103.

In some preferred embodiments the BCU 103 may have only one authorized user. In other preferred embodiments the BCU 103 may have more than one authorized user, each of which can be separately and independently biometrically identified to a network or external device, as described herein in relation to the particular authorized user 101. In such embodiments the biometric processing functions 106 in BCU 103 will preferably store biometric template information for each authorized user, allowing the BCU 103 to biometrically identify each authorized user. Similarly, the cryptographic processing functions 107 in BCU 103 will generate and store unique cryptographic key pairs Kpv/Kpb corresponding to each authorized user of the BCU 103, with the private keys Kpv corresponding to a specific authorized user being enabled for use by the cryptographic processing functions 107 in specific cryptographic operations only if said specific authorized user has provided biometric authorization for said specific cryptographic operations, which biometric authorization includes said specific authorized user being positively biometrically identified by the biometric processing functions 106 in BCU 103, as described herein.

Example of Operation of the BCU 103

A typical (although non-limiting) example of operation of the BCU 103 by an authorized user 101 is now described briefly—more detailed descriptions are provided below. It should be appreciated that there are many variations of the ways in which the BCU 103 may be used, based on the general principles described herein.

As discussed above, the purposes of the BCU 103 include (but are not limited to):

- allowing a first person to be biometrically identified to a second person (or persons) or to another device;
- allowing secure, biometrically identified person-to-person or person-to-device information exchange;
- allowing a first person to identify and send a biometrically identified message to a second person such that the first person is biometrically identified to the second person and only the second person (after biometric identification) can read said message.

In this example an authorized user 101 may use the BCU 103 (in PID 100) to send biometrically identified information to a second authorized user of a second BCU. To do this authorized user 101 obtains the second user's biometrically-associated public cryptographic keys. Authorized user 101 then prepares the message information to be sent to the second user and encrypts it using the second user's public encryption key. Authorized user 101 then biometrically identifies himself or herself to BCU 103 as part of the biometric authorization for the use of his/her private (secret) encryption key for use in digitally signing the encrypted message information. (Digitally signing a message is a common and well-known procedure that will not be described in detail here.) The encrypted message information plus digital signature are then sent to the second PID. The second user uses the public decryption key of authorized user 101 to verify the digital signature and thereby biometrically identify authorized user 101 as the sender of the encrypted message information (since the digital signing process required use of authorized user 101's private encryption key, thereby requiring positive biometric identification of authorized user 101). The second user then positively biometrically identifies himself or herself to the BCU in the second PID, and provides biometric authorization for said second BCU to use said second user's (secret) private decryption key to decrypt the encrypted message information. Hence only the second user, after positive biometric identification, can read the message information sent by authorized user 101. Consequently both authorized user 101 and the second user have been biometrically identified in the course of the message transfer, and the message information has been secured (encrypted) in transit. However, it should be noted that no biometric information has left either user's BCU.

This scenario is discussed in more detail below. It should be appreciated that variations on this scenario are possible. For example, the above describes an "encrypt then sign" methodology, while it should be obvious that an equivalent "sign then encrypt" methodology could have been used instead, and would have been equally effective.

Example Application

In one non-limiting example application the PID 100 may be a cell phone incorporating the BCU 103. The cell phone (PID 100) may be used to facilitate product purchases—either in-store product purchases or purchases via the internet.

In this example application an authorized user of the cell phone (PID 100) selects the products that he or she wishes to purchase. In the case of an in-store purchase product selection may be carried out for example by using a barcode or RFID reader in the cell phone to read labeling on the products, or by a store employee identifying the products at a checkout and transmitting the product information to the user's cell phone by known means such as a Bluetooth wireless connection or SMS message or some other suitable means. In the case of an internet purchase product selection may be carried out by the user browsing the internet using the cell phone (PID 100) and selecting the products to be purchased at the appropriate web site.

Once the products that are to be purchased have been selected, the user provides biometric authorization in order for the product purchases to be completed. As described herein, the process of providing biometric authorization includes the BCU 103 in the cell phone (PID 100) biometrically identifying the user as the (or an) authorized user of the cell phone (PID 100). Biometric identification may be carried out using a method such as described herein—for example, an iris or facial recognition process may be employed, with image capture by means of a user-facing camera in the cell phone (PID 100), or voice recognition may be used, or other biometric identification methodologies may be used, or a combination of biometric methodologies may be used. Once the user has provided biometric authorization for the purchases, the BCU 103 in the cell phone (PID 100) uses one or more private cryptographic keys stored in said BCU 103 and corresponding to the user, to identify said user and said purchases to a remote banking or financial server, where the user's account is debited accordingly. As described in detail herein, it should be appreciated that in this example application the user has been biometrically identified to said banking or financial server without said user's biometric data being released into the communications network. By this means the actual person making the purchases is biometrically identified, which is a substantially more secure and reliable purchase authorization method than is employed currently for credit cards, where in most instances the purchasing process only verifies the card information, but not the actual user of the card.

The same methodology as described in this example application could be employed in the case where the PID 100 is a computer such as a laptop computer.

In this manner the methods described herein may be used to replace credit cards with a more secure and reliable biometric purchase authorization process, with each user's biometric information being protected since it is never released into the communications network.

It should be appreciated that numerous other implementations are possible for the biometric identification technology described herein. In addition to acting as a replacement for identification cards in network-based financial transaction systems (as described above in relation to credit cards), the biometric identification technology described herein can be used as a basis for:

biometrically authenticated access control to buildings and other locations, equipment and vehicles;

biometrically authenticated access control to online records, and in particular online personal records such as medical records;

biometric identification of participants in online social networking sites and other interactive online sites;

any other application in which it is advantageous to securely and reliably identify a person rather than a device being used by said person.

In all cases an advantage of the biometric technology described herein is that it allows biometric identification of a user over a network without said user's biometric information every being released into the network, thereby protecting and ensuring the privacy of each user's biometric information.

Biometrically Tagged Information

In the present document biometric tagging of information is defined as follows. Information is biometrically tagged for a specific user if said specific user uses a biometrically associated private key, Kpv, corresponding to said specific user in processing said biometrically tagged information—where the private key, Kpv, is generated and stored in said specific user's BCU, as described above. In the above example of operation of the PID 100 the information is biometrically tagged for both the sender and the recipient:

the sender (authorized user 101) used a biometrically associated (secret) private key to generate a digital signature—hence the transmitted information is biometrically tagged for the sender (authorized user 101);

the recipient (the second user) must use a biometrically associated (secret) private key to decrypt the received message information—hence the transmitted information is also biometrically tagged for the recipient (the second user).

The BCU—Functions and Information Flow

In the preferred embodiment of FIG. 1 all information that is transferred from the information processing and information storage functions 108 to the communications unit 110, or from the communications unit 110 to the information processing and information storage functions 108, passes through the BCU 103. This is not necessarily always the case. In some preferred embodiments some information being transferred between the information processing and information storage functions 108 and the communications unit 110 may bypass the BCU 103. This may be true, for example, of certain types of information—such as communications "overhead" data—that are not subjected to cryptographic processing or that are inherently not appropriate for biometric tagging. In general, however, message contents will pass through the BCU 103 for cryptographic processing. In addition, the BCU 103 will be used to biometrically identify an authorized user 101 of the BCU 103 to a remote device 102 or to a person using said remote device 102.

The BCU 103 is able to use internally generated, secretly retained private cryptographic keys, Kpv, that correspond to an authorized user 101 to process information in a specific cryptographic operation only when said specific cryptographic operation is biometrically authorized by said authorized user 101.

Preferably the PID 100 will also be usable for information processing that is not biometrically authorized. Without biometric authorization the BCU 103 will be unable to perform any functions that require the use of secret internally generated private cryptographic keys, Kpv, that correspond to and biometrically identify an authorized user of the BCU 103. In some preferred embodiments the BCU 103 may be able to perform cryptographic functions that are not biometrically authorized, using cryptographic keys that do not correspond to an authorized user of the BCU 103, with said cryptographic keys in some embodiments being internally generated within the BCU 103 and in some embodiments being supplied externally. Obviously, when the BCU 103 is not biometrically authorized to undertake cryptographic operations it will not be able to generate biometrically tagged information corresponding to an authorized user of the BCU 103 and will not be able to read incoming information that is biometrically tagged for an authorized user of the BCU 103, since either operation requires the use of internally generated private cryptographic keys, Kpv, corresponding to said authorized user, which in turn requires biometric authorization by said authorized user.

Preferably, but not necessarily, biometric authorization by an authorized user of the BCU 103 for biometric tagging and other biometrically associated cryptographic processes may be optional or selectively triggered in the BCU 103. Non-limiting examples of the selective use of biometric authorization of the BCU 103 are now provided.

Biometric authorization of the BCU 103 may be at an authorized user's discretion, depending on whether said authorized user wishes to biometrically tag information or read incoming biometrically tagged information.

A request for biometric authorization by a specific authorized user of the BCU 103 may be automatically triggered by the BCU 103, thereby generating a request for biometric input from said authorized user, depending on characteristics of the information being input to the BCU 103—for example:

biometrically tagged incoming information may automatically trigger the BCU 103 to request biometric authorization by the intended recipient in order that the incoming information can be cryptographically processed and read;

some types of information input to the BCU 103 from the information processing and information storage functions 108 may be configured to require biometric authorization by a specific authorized user of the BCU 103 for a specific cryptographic operation, in turn requiring positive biometric identification of said specific authorized user, prior to said information being transferred to the communications unit 110 for transfer to an external device.

Managing the Public Keys Kpb

As described above, the public keys Kpb generated by the cryptographic processing functions 107 in BCU 103 and corresponding to authorized users of the BCU 103 are released publicly for use by external devices and other people in communicating with authorized users of the BCU 103. However, an issue that is common to all systems using public/private key cryptography is that the public key values must be verifiable by an external device or other person. In other words, for a first device and a second device to exchange encrypted information in a manner that requires the public key of the second device to be used, the first device must be able to obtain a verified public key value for the second device. There are various established methods that can be employed for public key verification. For example, a certificate authority methodology could be used, in a manner similar to that for verification of public keys in commercial internet transactions. Another approach is to use a trusted ring, as is used in the PGP system of cryptography. Yet another method is to use secure, trusted point-to-point communications links to transfer the public key values between sender and recipient. It should be appreciated that a public key verification methodology of some type must be employed. Public key distribution and management is discussed in more detail below, and a preferred method is described, based on the use of one or more so-called public key repositories.

In some preferred embodiments of the present invention the key pairs Kpv/Kpb may be updated from time to time. This is usually done for security reasons, to minimize the chance of the private keys Kpv being determined and used fraudulently. In some embodiments each key pair Kpv/Kpb may be used only once and then replaced (so-called one-time keys). As discussed herein, the key pairs Kpv/Kpb associated with an authorized user of the BCU 103 are preferably generated by the cryptographic processing functions 107 within the BCU 103, with the private keys Kpv retained secretly within the BCU 103 and the public keys Kpb released publicly. Whatever methodology is used for verifying public keys, it must be able to keep track of updated public key values. When a new key pair Kpv/Kpb$^{new}$ is generated, the new public key Kpb$^{new}$ will be released and registered with the key verification methodology. Registration of a new public key must link the new public key securely with the public key that it replaces. This can be done using techniques described below.

Biometric Identification of a User to an External Device

Preferred methods by which the BCU 103 may be used to biometrically identify an authorized user 101 of BCU 103 to an external device 102 that is part of a network 300—known herein as a network device 102—are illustrated schematically in FIG. 2. It should be appreciated that the embodiments of FIG. 2 are non-limiting examples, and that other methods may be employed to achieve the same objective, all based on the biometric-to-cryptographic techniques described herein in relation to the BCU 103. In the preferred embodiment of FIG. 2 the asymmetric cryptographic key pairs generated by the BCU 103 and dedicated to the authorized user 101 are the key pairs K1*pv*/K1*pb* and K2*pv*/K2*pb*, as described in relation to the preferred embodiment of FIG. 1.

In the preferred embodiments of FIG. 2, and in general in the other preferred embodiments described herein, the PID 100 and the network device 102 are assumed to be part of a larger network 300. The network 300 may, for example, be the internet. In this configuration the verified public key values are assumed to be made available to any device on the network 300 via a public key repository 301 that is also part of the network 300. The public key repository 301 stores verified public key values and keeps track of public key values as they are updated. Biometrically associated public keys correspond to authorized users of BCU's that are part of the network 300, so the public key repository 301 may also store other personal information corresponding to each public key value—i.e. corresponding to each authorized user of each BCU that is part of the network 300. The public key repository 301 may be a single repository on the network 300 or may be made up of a number of interconnected repositories on the network 300. In FIG. 2 and in other preferred embodiments described herein the public key repository 301 is illustrated as a single repository. In some respects this public key repository approach is similar to the certificate authority methodology used to validate public key values on the internet, although it differs from the certificate authority methodology in that to obtain a verified public key value a user on the network 300 must go to the public key repository 301. In some of the preferred embodiments described herein the public key values, Kpb, may be updated at random or unscheduled times that are not known at the time the public key Kpb is made public, and in such embodiments it is not feasible to provide public key values by means of digital certificates circulating on the network 300, since a digital certificate usually includes a revocation or expiration date/time for the public key that it represents.

Figure 2A:
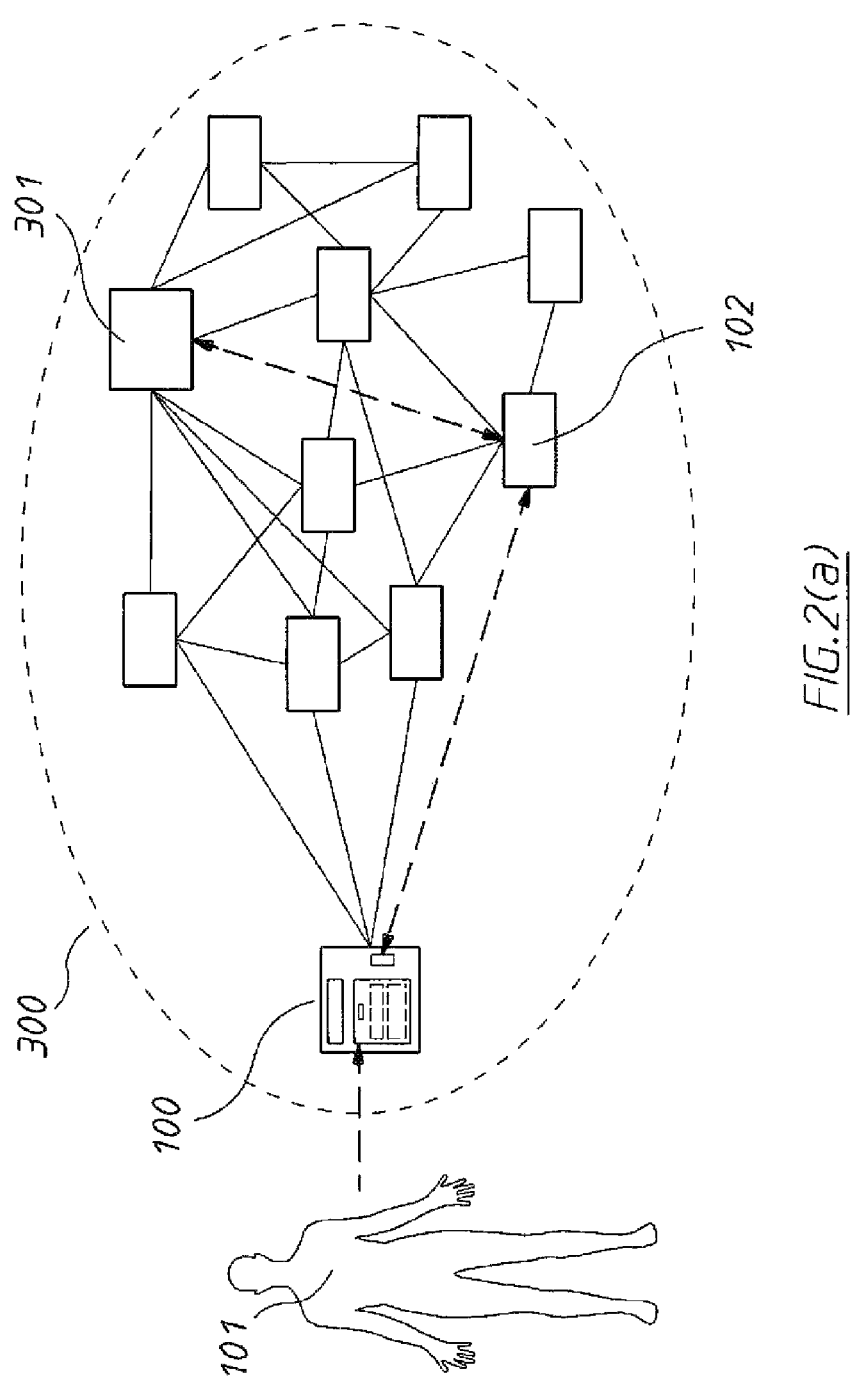
FIG. 2—comprising FIGS. 2(a), 2(b) and 2(c)—is a schematic illustration of preferred means by which a personal information device can provide biometric identification to another device in a network environment.

The objective of the techniques illustrated and described in relation to FIG. 2 is to use the BCU 103 to biometrically identify an authorized user 101 of BCU 103 to a network device 102 without the BCU 103 releasing any of the biometric information, of the authorized user 101. In the embodiment of FIG. 2 the network device 102 is part of the network 300 of which the BCU 103 (in PID 100) is also a part. The general configuration is illustrated schematically in FIG. 2(a), which shows a user 101 using a PID 100 that is part of the network 300. The public key repository 301 is also part of the network 300 to which the PID 100 and network device 102 are connected. As described above, in this embodiment the public key repository 301 is a source of verified public key values, Kpb(ver), for devices on the network 300. The public key repository 301 keeps track of public key values as they are updated.

Figure 2B:
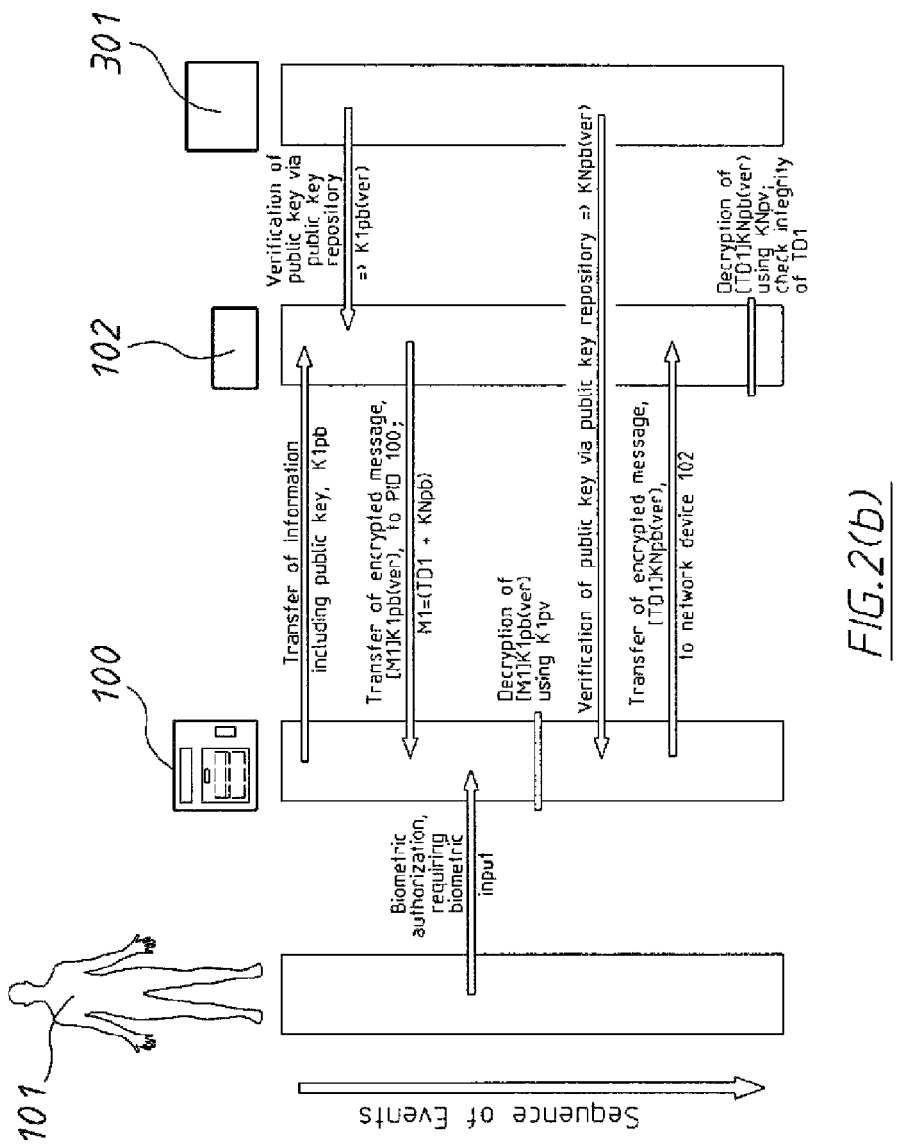
Figure 2C:
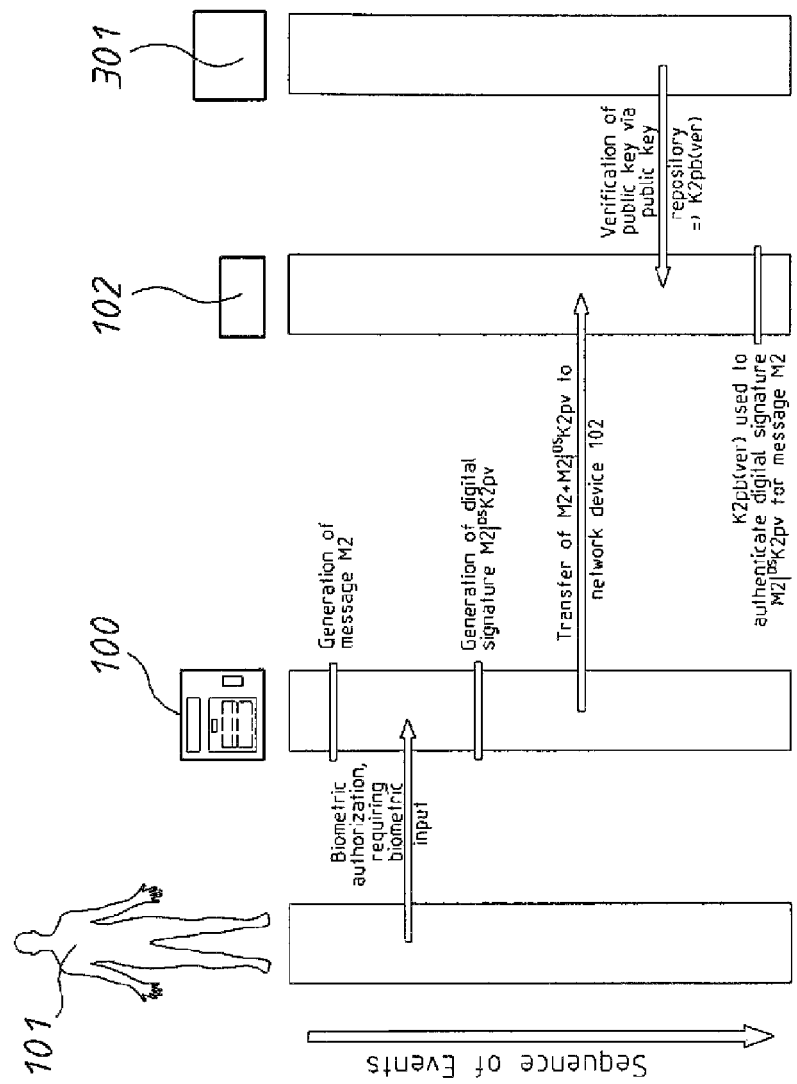

Non-limiting embodiments of methods for providing secure biometric identification of an authorized user 101 to a network device 102 by means of the BCU 103 in PID 100 are now described in relation to the schematic illustrations of FIGS. 2(b) and 2(c). In particular, two different scenarios are described.

In the preferred embodiment of FIG. 2(b) the BCU 103 in PID 100 uses a key pair K1pb/K1pv that is internally generated within the BCU 103 and that corresponds to an authorized user 101, where K1pb is a public encryption key and K1pv is the corresponding private decryption key retained secretly within the BCU 103. It should be noted that the important aspects of the biometrically associated information exchanges relating to the biometric identification process are described below and illustrated schematically in FIG. 2(b), but that not all of the information exchanges or information processing functions are necessarily described or illustrated. The key steps involved are now described.

1. The BCU 103 in PID 100 sends to the network device 102 identifying information pertaining to the PID 100 and authorized user 101, which information may include the public key K1pb dedicated to the authorized user 101 and/or other information identifying the authorized user 101. This amounts to the PID 100 indicating to the network device 102 its identity and that the authorized user 101 is requesting to initiate an action. Before taking any action the network device 102 must first confirm that the PID 100 is legitimate and the authorized user 101 is actually using the BCU 103 in PID 100.
2. The network device 102 accepts said identifying information (which may include the public key K1pb) but does not use it directly, since it must first verify that the key value K1pb is genuine. The network device 102 verifies the public key value K1pb by obtaining a verified key value, K1pb(ver), for authorized user 101 from the public key repository 301. The verified key value K1pb(ver) should be the same as the key value K1pb provided by the PID 100. Verification of the public key K1pb establishes that the key corresponds to a legitimate BCU 103 and more specifically that the key corresponds to authorized user 101. Other information regarding the BCU 103 or PID 100 or authorized user 101 may also be confirmed or retrieved from the public key repository 301 in the process of verifying the key K1pb, depending on the details of the key verification process. If the public key value K1pb received by the network device 102 from the PID 100 cannot be verified then the process stops. The network device 102 next verifies that the PID 100 from which it received the public key K1pb is actually the device that it claims to be and that it is being used by authorized user 101. It does this by testing whether the BCU 103 in PID 100 is able to use the (secret) private decryption key K1pv corresponding to the verified public key K1pb(ver), thereby also determining whether authorized user 101 is using the BCU 103.
3. The network device 102 generates a message M1 that incorporates test data TD1 and a public encryption key KNpb corresponding to the network device 102—i.e. M1=(TD1+KNpb). The public encryption key KNpb corresponds to a unique key pair KNpb/KNpv dedicated to the network device 102. The key KNpv is a private decryption key retained secretly by the network device 102, while the public encryption key KNpb is released publicly. The network device 102 encrypts the message M1 using the verified public key K1pb(ver) to generate encrypted data [M1]K1pb(ver). The network device 102 then transmits the encrypted message [M1]K1pb(ver) to the PID 100.
4. The PID 100 receives the encrypted data [M1]K1pb(ver), but cannot decrypt it without obtaining biometric authorization for the decryption process from authorized user 101, which biometric authorization includes positively biometrically identifying authorized user 101 to whom the private decryption key K1pv corresponds. The BCU 103 in PID 100 gathers biometric information 105 from the user 101 and, based on said biometric information 105, determines whether the user 101 is authorized user 101 of the BCU 103. If the user 101 is determined to be authorized user 101 of the BCU 103, then steps 5 and following (below) are undertaken. If the BCU 103 is unable to determine that the user 101 is an authorized user, then the BCU 103 takes no further action and the process is stopped.
5. Positive biometric identification of authorized user 101 by the biometric processing functions 106 in BCU 103 is undertaken as an integral part of authorized user 101 biometrically authorizing the specific cryptographic operation of decrypting of the encrypted message [M1]K1pb(ver) by using the (secret) private decryption key K1pv. The BCU 103 decrypts the encrypted data [M1]K1pb(ver) using the (secret) private key K1pv, thereby retrieving the test data TD1 and public key value KNpb. After decryption of the data [M1]K1pb(ver) the private key K1pv returns to its default disabled state. The BCU 103 obtains the verified public key, KNpb(ver), for the network device 102 from the public key repository 301 and confirms that it is the same as the received public key value, KNpb. This confirms that the public key KNpb(ver) corresponds to a legitimate network device 102. The BCU 103 then encrypts the test data TD1 using the public key KNpb(ver); generating the encrypted data [TD1]KNpb(ver), which is transmitted to the network device 102.
6. The network device 102 receives the encrypted message [TD1]KNpb(ver) and decrypts it using the private key KNpv to retrieve test data TD1. The retrieved test data TD1 is compared with the original test data TD1 generated by the network device 102. If the decrypted data TD1 matches the original data TD1, then the network device 102 knows it is in communication with the PID 100 being used by authorized user 101. This can be concluded because the BCU 103 in PID 100 can only use the private decryption key K1$pv$ if the BCU 103 has positively biometrically identified authorized user 101.

In the preferred embodiment of FIG. 2(c) the BCU 103 in PID 100 uses a key pair K2$pv$/K2$pb$ that is internally generated within the BCU 103 and that corresponds to an authorized user 101, where K2$pv$ is a private encryption key that is retained secretly within the BCU 103 and K2$pb$ is the corresponding public decryption key. It should be noted that the important aspects of the biometrically associated information exchanges relating to the biometric identification process are described below and illustrated schematically in FIG. 2(c), but that not all of the information exchanges or information processing functions are necessarily described or illustrated. The key steps involved are now described.

1. The PID 100 generates a message M2 that includes information identifying authorized user 101, said information preferably (but not necessarily) including the public decryption key K2$pb$ that is dedicated to authorized user 101.
2. The BCU 103 needs biometric authorization from authorized user 101 to undertake the specific cryptographic operation of using the private encryption key K2$pv$ to generate a digital signature, M2|$^{DS}$K2$pv$, corresponding to the message M2. Biometric authorization by authorized user 101 includes positive biometric identification of authorized user 101. For this the BCU 103 in PID 100 gathers biometric information 105 from authorized user 101, from which the biometric data 105a is derived. The biometric data 105a is used by the biometric processing functions 106 in BCU 103 to positively biometrically identify authorized user 101. If authorized user 101 is not positively biometrically identified by the biometric processing functions 106, then the process is stopped.
3. Positive biometric identification of authorized user 101 is undertaken as an integral part of authorized user 101 biometrically authorizing the specific cryptographic operation of using the private encryption key K2$pv$ to generate a digital signature, M2|$^{DS}$K2$pv$, corresponding to the message M2. As described above, the private key K2$pv$ corresponds to a unique cryptographic key pair K2$pv$/K2$pb$ that is dedicated to authorized user 101 of BCU 103. Generation of the digital signature is a well-known process that will not be described in detail here. A typical method for generating a digital signature corresponding to the message M2 involves using a hash function to generate a hash value for the message M2, which hash value is then encrypted using the private encryption key K2$pv$. After generation of the digital signature M2|$^{DS}$K2$pv$ the private encryption key K2$pv$ returns to its default disabled state.
4. The message M2 and digital signature M2|$^{DS}$K2$pv$ are then transmitted to the network device 102. For additional security, in some embodiments the message M2 and digital signature M2|$^{DS}$K2$pv$ may be encrypted prior to transmission using a public encryption key corresponding to the network device 102, and subsequently decrypted (after reception by the network device 102) using the corresponding private decryption key held secretly by the network device 102.
5. The network device 102 accepts the message M2 plus digital signature M2|$^{DS}$K2$pv$, and extracts from the message M2 the (unverified) public decryption key K2$pb$ and other information identifying authorized user 101. The network device 102 verifies the public key value K2$pb$ by obtaining a verified key value, K2$pb$(ver), from the public key repository 301. The verified key value K2$pb$(ver) should be the same as the key value K2$pb$ supplied by authorized user 101 as part of the message M2. Verification of the public decryption key K2$pb$ establishes that the key corresponds to a legitimate BCU 103 and specifically identifies the authorized user 101 to whom the public key corresponds, but does not confirm that this is the BCU 103 or PID 100 from which the message M2 and digital signature M2|$^{DS}$K2$pv$ were received. If the public key value K2$pb$ received by the network device 102 cannot be verified then the user 101 cannot be biometrically identified and the process is stopped.
6. If the public key K2$pb$ is verified, the network device 102 then uses the verified public key value, K2$pb$(ver), to authenticate the digital signature M2|$^{DS}$K2$pv$. Authentication of a digital signature M2|$^{DS}$K2$pv$ is a well-known process that will not be described in detail here. One preferred method is to decrypt the digital signature M2|$^{DS}$K2$pv$ using the verified public decryption key, K2$pb$(ver), and compare the decrypted digital signature with a hash value derived from the received message M2—if there is a match then the digital signature M2|$^{DS}$K2$pv$ is authenticated for the message M2. Authenticating the digital signature M2|$^{DS}$K2$pv$ confirms that (i) the message M2 has not been modified during transmission from the PID 100 to the network device 102, and (ii) the digital signature M2|$^{DS}$K2$pv$ (and therefore also the message M2) was prepared in BCU 103 being used by authorized user 101. The second conclusion follows since the (secret) private encryption key K2$pv$ was used to generate the digital signature M2|$^{DS}$K2$pv$, and the private encryption key K2$pv$ can be used by the cryptographic processing functions 107 in BCU 103 only if the BCU 103 has positively biometrically identified authorized user 101 as part of the biometric authorization by authorized user 101 of the specific cryptographic operation of generating the digital signature M2|$^{DS}$K2$pv$—hence authenticating the digital signature M2|$^{DS}$K2$pv$ for the message M2 amounts to securely biometrically identifying authorized user 101 as the sender of the message M2 via the BCU 103 (in PID 100). If the digital signature M2|$^{DS}$K2$pv$ cannot be authenticated then it cannot be concluded that the message M2 originated in PID 100 being used by authorized user 101.

It should be noted that in the preferred embodiments of FIGS. 2(b) and 2(c) authorized user 101 has been securely biometrically identified to the network device 102 without the user 101's biometric information ever being released from the BCU 103 in PID 100. The underlying principle is that the network device 102 establishes that the BCU 103 is able to use a (secret) private key—either K1$pv$ or K2$pv$—which private key can be used only if the BCU 103 in the PID 100 positively biometrically identifies authorized user 101 to which the private key—K1$pv$ or K2$pv$—is dedicated. It should be noted that these two preferred embodiments are examples only, and that other methods may be used, based on the same underlying principles, to achieve biometric identification of an authorized user 101 to a network device 102.

In the embodiments of FIG. 2 both the PID 100 and the network device 102 are part of a network 300. In these embodiments verification of the public keys, Kpb, is carried out by means of a public key directory 301, which is also part of the network 300 and which can therefore be accessed by both the PID 100 and the network device 102. The public key directory 301 is a repository of verified public key values that can be accessed by any device that is part of the network 300.

It should be appreciated that there may also be a need for the PID 100 to securely identify the network device 102 before information exchange between the PID 100 and network device 102 takes place. If so, this can be done using techniques that are in essence the reciprocal of the techniques described above in relation to FIG. 2, involving use by the network device 102 of public/private cryptographic key pairs dedicated to said network device 102, with the private keys retained secretly by the network device 102 and the public keys released publicly and available to the BCU 103 in PID 100 via the public key repository 301. Preferred embodiments are described below in which information is exchanged between the PID 100 and the network device 102 while at the same time biometrically identifying authorized user 101 and securely identifying the network device 102.

Updating Key Pairs and Uploading New Public Key Values to the Public Key Repository 301

As discussed above, the BCU 103 in PID 100 may generate new key pairs Kpv/Kpb for an authorized user 101 of BCU 103 from time to time, with each new key pair biometrically associated with authorized user 101 and replacing a corresponding currently used key pair. Key pairs for authorized user 101 of BCU 103 may be updated by the cryptographic processing functions 107 in the BCU 103 from time to time—randomly, or according to a schedule or formula, or even after each use. The (secret) private key, Kpv, corresponding to each of the new key pairs is retained secretly and securely within the BCU 103, and the corresponding new public key, Kpb, is released publicly. In particular new public keys, Kpb, must be uploaded to the public key repository 301 in order that they can be verified by other devices that form part of the network 300.

In uploading a new public key, Kpb, to the public key repository 301, the public key repository 301 must validate that the new public key is a legitimate replacement for the corresponding current public key, and therefore must validate that the new public key was generated by the cryptographic processing functions 107 in BCU 103 as a replacement for the current public key. This in turn requires that the cryptographic processing functions 107 in BCU 103 use a current private key that is biometrically associated with authorized user 101 in a cryptographic operation as part of the public key uploading process, thereby verifying that (i) the new public key was generated by the cryptographic processing functions 107 in BCU 103, (ii) the key updating and public key uploading processes are biometrically authorized by authorized user 101 with whom the new key pair is biometrically associated, and (iii) the new public key has the same biometric association with authorized user 101 as the current public key that it replaces. In short, use of a current private key corresponding to authorized user 101 during the public key uploading process confirms that the new public key for authorized user 101 is a genuine replacement for the current public key. Biometric authorization by authorized user 101 of the key uploading process may be either real time biometric authorization—i.e. biometric authorization in real time as and when the key uploading is carried out—or biometric pre-authorization. In the description below the public key uploading process is biometrically authorized in real time.

A non-limiting preferred method for (i) updating a key pair Kpv/Kpb that is biometrically associated with authorized user 101 of the BCU 103, (ii) uploading the new public key, Kpb, to the public key repository 301, and (iii) updating the public key Kpb in the record file for authorized user 101 in the public key repository 301, is now described. The key pair Kpv/Kpb may be either (i) Kpv=private decryption key; Kpb=public encryption key, or (ii) Kpv=private encryption key; Kpb=public decryption key.

To facilitate the key uploading process, the key pair K2pv/K2pb is used, where (as elsewhere in this document) K2pv=private encryption key and K2pb=public decryption key corresponding to authorized user 101. More specifically, the current key values, $K2pv^{current}$ and $K2pb^{current}$, are used to facilitate the key uploading, as these key values are already biometrically associated with authorized user 101 at the time of the public key uploading operation, and the public key $K2pb^{current}$ is already retained in the record file for authorized user 101 in the public key repository 301.

The key pair being updated in the following description may be any key pair corresponding to authorized user 101 of BCU 103, including the key pair K2pv/K2pb (i.e. the key pair being used to facilitate the public key uploading process). Key updating may be a separate stand-alone process, as in the description that follows, or may be carried out as an extension of other biometrically authorized cryptographic operations being undertaken by BCU 103.

1. The cryptographic processing functions 107 in BCU 103 generate a new key pair $Kpb/Kpv^{new}$ corresponding to authorized user 101, which new key pair $Kpb/Kpv^{new}$ will replace the current key pair $Kpb/Kpv^{current}$ corresponding to authorized user 101. The BCU 103 determines that the new public key, $Kpb^{new}$, should be uploaded to the public key repository 301.

2. The BCU 103 requests biometric authorization of the key uploading process from authorized user 101, which requires positive biometric identification of authorized user 101.

3. Authorized user 101 provides biometric information 105 and is positively biometrically identified by the biometric processing functions 106 in BCU 103. As described above, this enables use of the current private key, $K2pv^{current}$, corresponding to authorized user 101 for the specific cryptographic operation of uploading the new public key $Kpb^{new}$ to the public key repository 301, following which said private key $K2pv^{current}$ will return to its default disabled state.

4. The cryptographic processing functions 107 in BCU 103 generate a message, $M^{UL}$, that includes (i) the new public key, $Kpb^{new}$, and (ii) instructions to the public key repository 301 to replace the old public key, $Kpb^{current}$, with the new public key, $Kpb^{new}$ in the record file of authorized user 101. The cryptographic processing functions 107 also use the current private key, $K2pv^{current}$, to generate a digital signature, $M^{UL}|^{DS}K2pv^{current}$ for the message $M^{UL}$. Generation of a digital signature is a well-known process and will not be described in detail here.

5. The message $M^{UL}$ and digital signature, $M^{UL}|^{DS}K2pv^{current}$, are sent to the public key repository 301.

6. The public key repository 301 uses the current public key, $K2pb^{current}$, which it already holds in the record file of authorized user 101 as being biometrically associated with authorized user 101, to authenticate the digital signature $M^{UL}|^{DS}K2pv^{current}$. Authentication of the digital signature $M^{UL}|^{DS}K2pv^{current}$ verifies that:

the message $M^{UL}$ came from BCU 103, since the (secret) private key $K2pv^{current}$ was used to generate the digital signature, and this key was generated and is retained secretly in BCU 103;

the key uploading operation was biometrically authorized by authorized user 101, since the private key $K2pv^{current}$ was used to generate the digital signature $M^{UL}|^{DS}K2pv^{current}$, and use of the private key $K2pv^{current}$ requires biometric authorization by authorized user 101 (which in turn requires positive biometric identification by BCU 103 of authorized user 101); and the message $M^{UL}$ was not modified in transit between BCU 103 and the public key repository 301.

7. The public key repository 301 then updates the public key $Kpb^{current}$ by replacing it with the public key $Kpb^{new}$ in the record file of authorized user 101, and from the designated start time for the new public key $Kpb^{new}$ onwards (until the new public key value $Kpb^{new}$ is updated) uses $Kpb^{new}$ to biometrically identify authorized user 101 of BCU 103. In this preferred embodiment the new public key $Kpb^{new}$, and in fact the new key pair $Kpb/Kpv^{new}$, becomes "active" once the public key repository 301 replaces the current public key $Kpb^{current}$ with the new public key $Kpb^{new}$. (The term "active" in relation to keys is referred to again below in terms of management and distribution of public keys.)

It can be seen that the abovedescribed process is analogous to the embodiment of FIG. 2(c), in which the private encryption key $K2pv$ is used to identify authorized user 101 of BCU 103 to an external device 102.

If necessary, to ensure confidentiality a public encryption key corresponding to the public key repository 301 may be used to encrypt either (i) the message $M^{UL}$ prior to generation of the digital signature $M^{UL}|^{DS}K2pv^{current}$ (the "encrypt then sign" method), or (ii) the message $M^{UL}$ and digital signature $M^{UL}|^{DS}K2pv^{current}$ (the "sign then encrypt" method) before transmission from the PID 100 to the public key repository 301, with the corresponding decryption process being carried out at the public key repository 301 using the (secret) private decryption key held by the public key repository 301.

It should be appreciated that other methods may be used for securely uploading new public key values corresponding to authorized user 101 of BCU 103, but in general uploading to the public key repository 301 of a new public key Kpb corresponding to authorized user 101 can only be carried out securely by using a current (secret) private key corresponding to authorized user 101 in the uploading process, which in turn requires biometric authorization by authorized user 101. Use of a private key corresponding to authorized user 101 verifies to the public key repository 301 that (i) the new public key originates in the BCU 103, (ii) the new public key is biometrically associated with authorized user 101 and (iii) the key uploading process (and updating of the public key in the public key repository) is biometrically authorized by authorized user 101.

It should be appreciated that in some preferred embodiments a new key pair $Kpb/Kpv^{new}$ may be generated with a pre-specified expiration or revocation date/time, in which case the corresponding public key $Kpb^{new}$ that is uploaded to the public key repository 301 will have said pre-specified expiration or revocation date/time.

It should also be appreciated that in some preferred embodiments a new key pair $Kpb/Kpv^{new}$ may be generated with a pre-specified (future) start date/time, in which case the corresponding public key $Kpb^{new}$ that is uploaded to the public key repository 301 will have said pre-specified (future) start date/time, at which start date/time the public key repository 301 will begin using the new public key $Kpb^{new}$ (rather than the old or replaced public key $Kpb^{current}$) to identify authorized user 101, and the cryptographic processing functions 107 in BCU 103 will begin biometrically associating the new private key $Kpv^{new}$ (instead of the old, or replaced, private key $Kpv^{current}$) with authorized user 101.

The public key repository 301 in the embodiment of FIG. 2 therefore maintains up to date public key values that can be accessed by other people or devices, such as the network device 102, on the network 300.

For one-time key pairs (discussed below) the general principles are the same as described above, but the process is different since a dedicated sequence of one-time keys is required simply to enable a secure uploading process.

Verification of the Public Key Values—Use of a Public Key Repository, Digital Certificates and Certificate Authorities The techniques described herein rely on public key values generated by BCU's and other devices that are part of the network 300 being made available to all devices on the network 300. In the preferred embodiments described herein this is achieved through the use of a public key repository 301, which is a repository of verified public key values for all people or devices that are part of the network 300. It should be appreciated, however, that any of a number of methods may be used to make public keys available. Three preferred non-limiting methods for making public keys available are as follows.

1. The originating device for a public key may upload the public key to a public key repository, which stores verified public key values and which can be accessed by all users or devices on the network. This is the preferred method described herein.

2. The originating device for a public key may release a self-signed digital certificate, which is essentially a self-signed public key value along with other identifying information. On its own the certificate simply confirms that that the originating device holds the private key corresponding to the public key on the certificate, but does not verify the public key as corresponding to an "authorized" or "certified" device or person. Hence as in 1 above the public key value must be verified by reference to a repository of verified public key values (i.e. a public key repository), which is in essence equivalent to the preferred method referred to in point 1 above and described in detail herein.

3. The originating device may release a digital certificate digitally signed by a certificate authority (CA)—the certificate will specify the device public key(s) as certified by the CA. (The CA methodology is the methodology used for most secured internet transactions.) However, to be certain of the digital certificate's authenticity a receiving device would need to verify the CA's public key value, which may require reference to the CA or some other repository of verified public key values. Once again, this is analogous to the public key repository method described herein, in that verification of the originating device public key(s) requires reference to a source of verified public keys. In this case the CA is interposed in the process, which in theory makes the process simpler but in practice to be properly secured the process is little different than the public key repository method described herein. Furthermore, this method does not readily allow for random or unscheduled updating of public key values, such as is described in the preferred embodiments herein, in which the BCU 103 may update key pairs $Kpv/Kpb$ corresponding to an authorized user of the BCU 103 at times that are not scheduled beforehand—or at least not known outside the BCU 103 beforehand. To be useful to a recipient, a digital certificate should include an expiration or revocation date/time, so the recipient knows whether the digital certificate is still current. If the key pairs Kpv/Kpb are updated at future times that are not known at the time the keys are generated, it will not be possible to include an expiration or revocation date/time on the digital certificate. Therefore, the CA methodology is generally not the preferred public key verification method for preferred embodiments in which key-pairs are issued without a revocation or expiration date/time.

Hence it can be seen that while all three of the above techniques are conceptually equivalent, they differ in terms of their merits in the context of the embodiments described herein. The preferred embodiments described herein will be in terms of method 1—the use of a public key repository 301 from which verified public key values can be obtained.

It should be appreciated, however, that the certificate authority (CA) methodology referred to in point 3 above is feasible for public key verification in the context of the present invention for any key pair Kpv/Kpb generated by a BCU that has a known expiration or revocation date/time at the time the public key Kpb is made public. Hence in some preferred embodiments the network 300 may include a CA (and the use of CA-signed digital certificates) for those key pairs Kpv/Kpb that have known expiration or revocation dates/times, and/or a public key repository 301 for those key pairs Kpv/Kpb that do not have known expiration or revocation dates/times (i.e. key pairs Kpv/Kpb that are updated at random or at times that are not known beforehand outside the BCU that generates the key pairs).

Enrollment of a BCU/PID and Authorized User

As discussed above, the key pairs Kpv/Kpb generated by the cryptographic processing functions 107 within BCU 103 corresponding to a specific authorized user 101 may be updated from time to time, for security reasons. The changes in public keys Kpb will need to be tracked by whatever method is used to make public keys publicly available. In the context of the embodiment of FIG. 2 this means that, as described above, the public key repository 301 will need to keep track of public key values as they change over time.

The issue that will now be discussed is the enrollment of a new BCU 103 (and PID 100) and corresponding authorized user 101.

There are numerous methods by which the enrollment process may be carried out. One preferred method is described below, but it should be appreciated that other methods may be employed instead.

The general principle underlying the enrollment process is that a new user 101 must initially identify himself or herself to the system at the time of enrollment, using means other than, or in addition to, the biometric means that will be used from that point on to biometrically identify said user. Subsequent biometric identification simply ensures continuity of identity from one identification event to the next—the initial identification process establishes the actual, or absolute, identity. Once the initial identification of a new user 101 has been established, the BCU 103 in PID 100 will be used to take biometric readings from said new user 101 and generate a biometric template (or templates) for said new user 101, which biometric template (or templates) will be securely stored in the biometric processing functions 106 in BCU 103.

The cryptographic processing functions 107 in said BCU 103 will then generate one or more initial cryptographic key pairs Kpb/Kpv for said user. These initial key pairs Kpb/Kpv are generated independently of any biometric information corresponding to said user. The initial key pairs are then associated with user 101—now authorized user 101—in that positive biometric identification by the cryptographic processing functions 106 in BCU 103 will be a requirement for enabling use by the cryptographic processing functions 107 of the initial private keys Kpv in a specific cryptographic operation. In the default state—i.e. without positive biometric identification of the associated authorized user 101 in order to authorize use of a private key Kpv in a specific cryptographic operation—the private keys Kpv are disabled and cannot be used by the cryptographic processing functions 107.

The public keys, Kpb, of said initial key pairs will be securely transmitted to the public key repository 301, along with personal information for authorized user 101. The public key repository 301 will from that time on keep track of changes to said public key values Kpb, as described herein.

An important aspect of the present invention is that enrollment of a PID 100 (or BCU 103) and authorized user 101 does not involve any of authorized user 101's biometric information being released from the BCU 103.

Figure 3A:
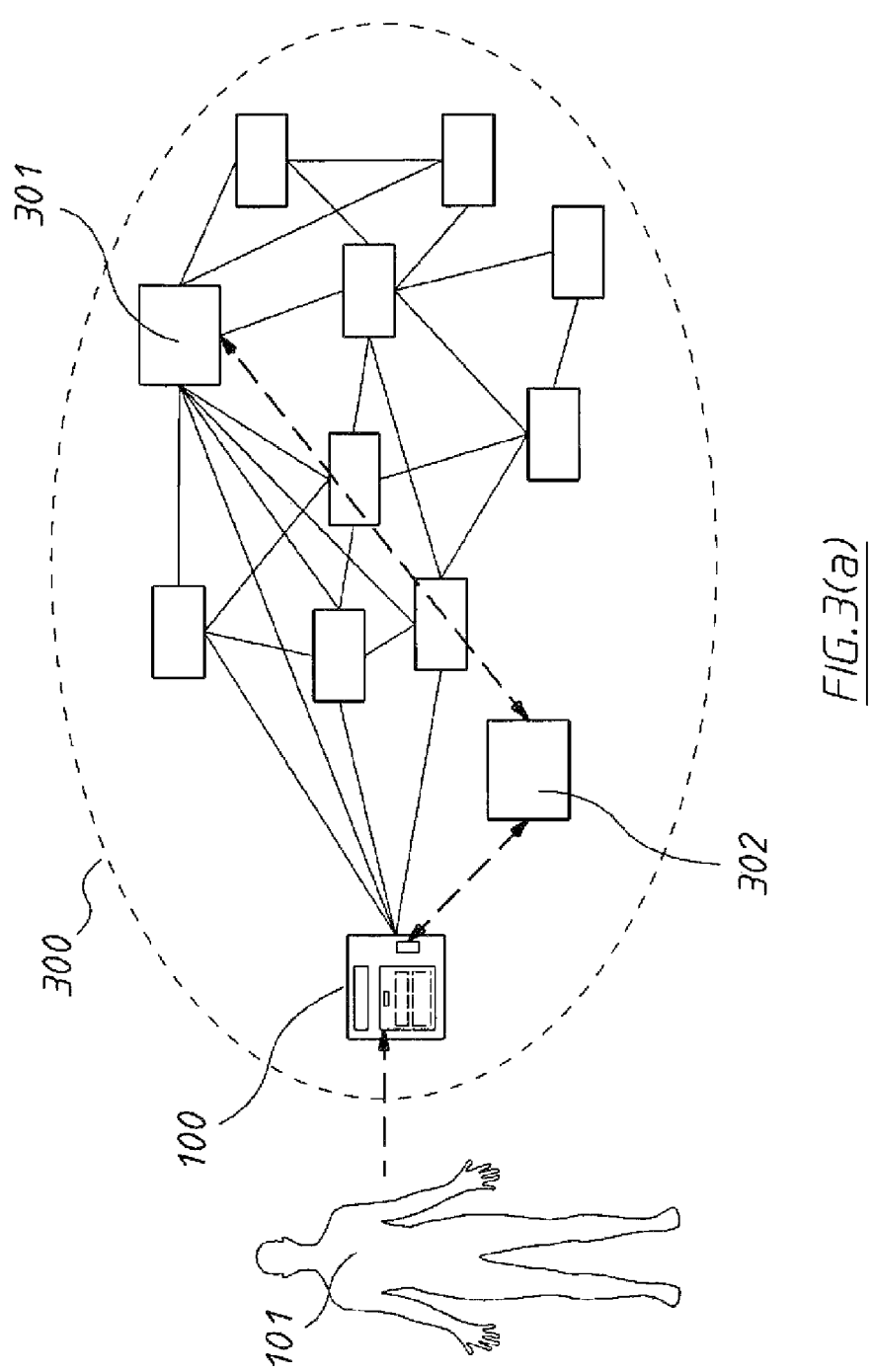
FIG. 3—comprising FIGS. 3(a) and 3(b)—is a schematic illustration of a preferred technique for enrolling an authorized user and a personal information device.
Figure 3B:
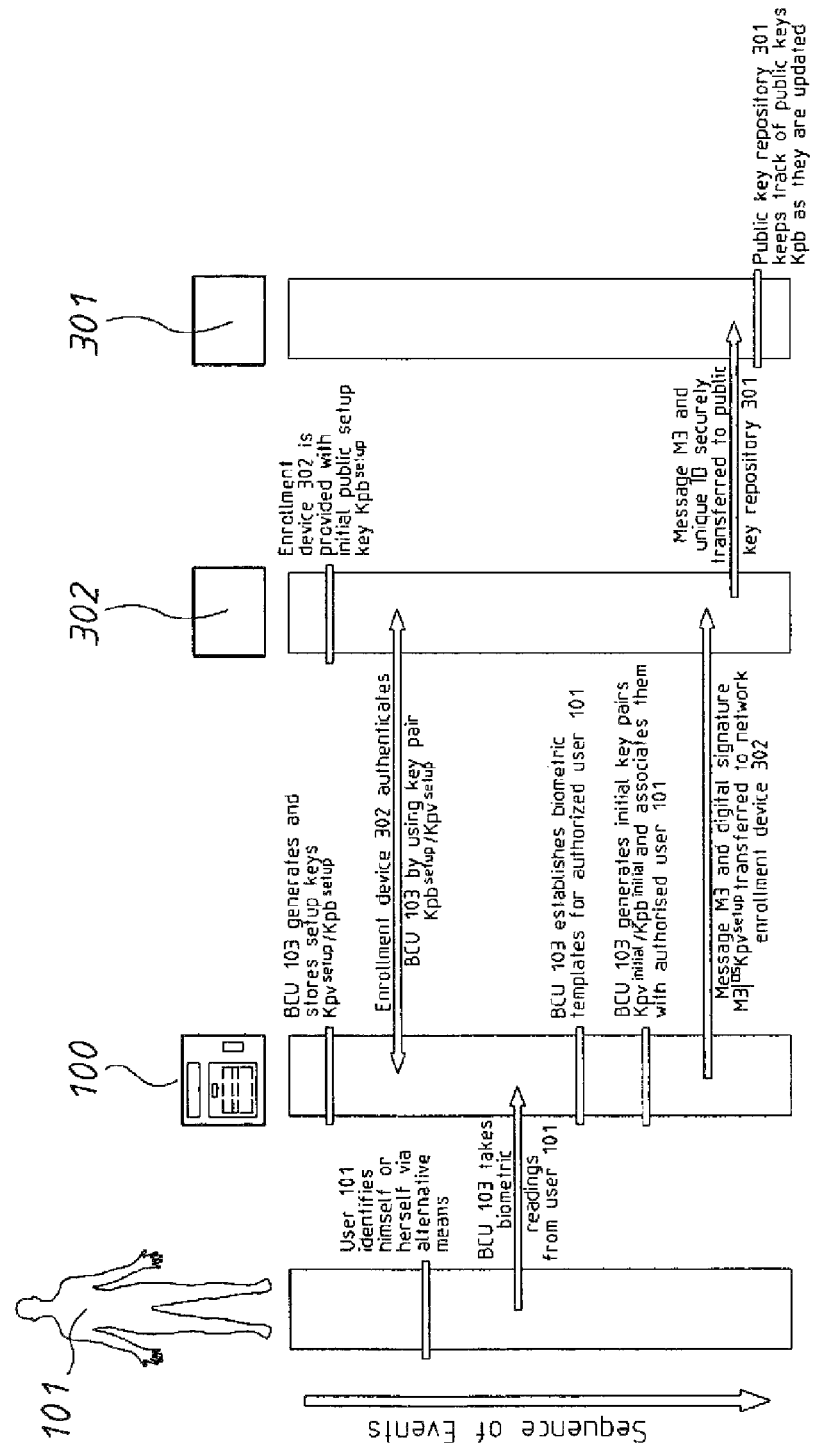

A preferred enrollment method will now be described in more detail in conjunction with the schematic illustrations of FIGS. 3(a) and 3(b). FIG. 3(a) is a schematic illustration of the various components involved in a preferred enrollment process, while the important aspects of the biometrically associated information exchanges relating to the enrollment process are described below and illustrated schematically in FIG. 3(b). It should be appreciated that not all of the information exchanges or information processing functions are necessarily described or illustrated.

In the embodiment of FIG. 3 a PID 100 (incorporating BCU 103) is provided in its initial state. In its initial state the BCU 103 within PID 100 retains a pair of "set-up" cryptographic keys $Kpv^{setup}/Kpb^{setup}$, which keys are generated by the cryptographic processing functions 107 within the BCU 103 but do not correspond to a particular user. Preferably, but not necessarily, the private key, $Kpv^{setup}$, is an encryption key (used to create digital signatures) while the corresponding public key, $Kpb^{setup}$, is a decryption key. During enrollment the BCU 103 within PID 100 communicates with a network enrollment device 302 to establish the identity of BCU 103. This is done by using the setup keys $Kpv^{setup}/Kpb^{setup}$. The network enrollment device 302 has previously been provided with the public key value $Kpb^{setup}$ via a trusted key delivery method, while the private key $Kpv^{setup}$ is maintained secretly within the BCU 103. The network enrollment device 302 may in some embodiments be the public key repository 301. The network enrollment device 302 establishes the identity of the PID 100 by using the public key $Kpb^{setup}$ to validate that the BCU 103 in PID 100 retains the private key $Kpv^{setup}$, using methods such as those described herein.

As described above, a new user 101 must initially identify himself or herself to the system at the time of enrollment, using means other than, or in addition to, the biometric means that will be used from that point on to biometrically identify said user. The initial identification information—which may include (for example) name, gender, date of birth, photograph, etc.—is verified and then recorded. In this preferred embodiment said initial identification information is recorded in PID 100, to be combined with other information during the enrollment process, as described below. Once said initial identification information is recorded, the biometric sensor 104 in the BCU 103 is used to take biometric readings from the new user 101, which biometric readings are used by the biometric processing functions 106 in BCU 103 to derive one or more biometric templates that are stored within the biometric processing functions 106 in BCU 103 and used for subsequent biometric identification of user 101—now authorized user 101. At no time during this process does any biometric information corresponding to authorized user 101 leave the BCU 103.

The cryptographic processing functions 107 in BCU 103 then generate one or more initial key pairs $Kpv^{initial}/Kpb^{initial}$ that are biometrically associated with the biometric templates for authorized user 101, in the manner described above and in relation to the embodiment of FIG. 1. The initial key pairs $Kpv^{initial}/Kpb^{initial}$ are the first key pairs that can be used to enable remote biometric identification of authorized user 101, as described herein. As described herein, the initial key values, $Kpv^{initial}$ and $Kpb^{initial}$, and all subsequent key pairs that are biometrically associated with authorized user 101, are not in any way related to or derived from any biometric information obtained from authorized user 101—rather the initial key values $Kpv^{initial}$ and $Kpb^{initial}$ are generated independently by a key generation function within the cryptographic processing functions 107 and then associated with biometric identification of authorized user 101.

The BCU 103 transmits the initial public key values, $Kpb^{initial}$, along with said initial identification information (i.e. personal information) for the authorized user 101—for example the user's name, date of birth, gender, photograph, etc.—to the network enrollment device 302, using a method that allows the enrollment device 302 to verify that the initial public key values $Kpb^{initial}$ are being sent by the legitimate BCU 103. For example, if the setup key pair is configured such that $Kpv^{setup}$ is a private encryption key and $Kpb^{setup}$ is the corresponding public decryption key, then the cryptographic processing functions 107 in BCU 103 may use the private setup key $Kpv^{setup}$ to digitally sign the initial public key values, $Kpb^{initial}$, and personal information for authorized user 101 prior to sending this information to the network enrollment device 302. Expressed more precisely, the BCU 103 may generate a message M3 comprising (i) the initial public key values, $Kpb^{initial}$, for authorized user 101, (ii) initial identification information (i.e. personal information) regarding authorized user 101, and (iii) instructions to associate the initial public key values, $Kpb^{initial}$, and said initial identification information with the public setup key, $Kpb^{setup}$, for BCU 103, thereby compiling an enrollment file for authorized user 101 that will be transferred to the network enrollment device 302. The BCU 103 then uses the private setup key, $Kpv^{setup}$, to generate a digital signature, $M3|^{DS}Kpv^{setup}$, corresponding to the message M3, and transmits both the message M3 and digital signature $M3|^{DS}Kpv^{setup}$ to the network enrollment device 302. (If necessary, for confidentiality the information transmitted to the network enrollment device 302 may be encrypted in the BCU 103 using a public encryption key corresponding to the network enrollment device, to be decrypted by the network enrollment device 302 using the corresponding private decryption key.) The network enrollment device 302 is able to authenticate the digital signature $M3|^{DS}Kpv^{setup}$ by using the public setup key, $Kpb^{setup}$, which it already holds. Authentication of the digital signature verifies that the message M3 originated in BCU 103 and has not been modified in transit between BCU 103 and the network enrollment device 302. The setup key pair $Kpb^{setup}/Kpv^{setup}$ is then retired (i.e. not used again), but is retained in the BCU 103 as a unique identifier for BCU 103. The network enrollment device 302 may preferably assign a unique identification (ID) number to authorized user 101, in which case said unique ID number is simply a means to unambiguously specify an authorized user, but does not provide a means of secure identification. For example, two authorized users may share the same name, but each can be unambiguously specified by said unique ID number. Secure identification of an authorized user 101 requires the authorized user 101 to use his or her BCU 103, as described herein. The network enrollment device 302 then compiles an initial record file for authorized user 101, comprising message M3 and the unique ID number for authorized user 101. The network enrollment device 302 then securely communicates the initial record file for authorized user 101 to the public key repository 301, thereby establishing a record file for authorized user 101 in the public key repository 301.

The types of personal information stored in the record file for authorized user 101 in the public key repository 301 may vary from user to user or from system to system, and in some systems may be at least partly specified by the authorized user.

After receiving from the network enrollment device 302 one or more initial public key values, $Kpb^{initial}$, for authorized user 101, the public key repository 301 then keeps track of changes to said public key values as the BCU 103 updates the key pairs Kpb/Kpv associated with authorized user 101 and uploads the new public key values, Kpb, to the public key repository 301, as described herein. For each authorized user 101 the public key repository 301 therefore retains a record file that includes personal information, a unique ID number, and current and historical public key values, Kpb, corresponding to said authorized user 101.

It should be appreciated that during the enrollment process authorized user 101 provides biometric information only to the BCU 103 in his or her own PID 100 (by means of the biometric sensor 104 in BCU 103), which BCU 103 generates biometric template(s) that are stored within the BCU 103. At no stage does any of authorized user 101's biometric information leave the BCU 103. Specifically, biometric information for authorized user 101 is not at any stage conveyed to the enrollment device 302 or the public key repository 301.

Lost or Stolen PID's

Loss or theft of a PID 100 or BCU 103 (for example, if the BCU 103 is a separate removable module) can be reported to the administrating authority for the network 300. The public key repository 301 can then revoke all public key values associated with the lost or stolen BCU 103. If the lost or stolen PID (or BCU) connects to the network 300 again, the public key repository 301 or some other device on the network 300 may be configured to send instructions to the BCU 103 in the lost or stolen PID 100 causing the BCU 103 to be erased or otherwise disabled. Authorized users of a lost or stolen PID 100 (or BCU 103) can re-enroll and be issued with a new PID (or BCU). It should be noted that use of a lost or stolen PID (or BCU) to biometrically tag information will be virtually impossible, since the BCU in the lost or stolen PID must positively biometrically identify an authorized user in order for any biometrically associated private keys to be enabled to biometrically tag information.

Securely Transferring Information to and from a PID or BCU

A description of preferred means by which authorized user 101 of BCU 103 can be securely biometrically identified to a network device 102 is provided above in relation to the embodiment of FIG. 2.

A description of preferred means by which information can be securely transferred between a PID 100 (incorporating BCU 103) and a network device 102, while also securely biometrically identifying authorized user 101 of BCU 103 and associating said biometric identification with said information, is now provided.

Two scenarios are considered. The first is transfer of information D1 from the PID 100 to the network device 102, while the second is transfer of information D2 from the network device 102 to the PID 100. In both scenarios the information transfer requires positive biometric identification of authorized user 101 by BCU 103.

In the descriptions that follow it is assumed that the network configuration is as described in the embodiments of FIGS. 2 and 3. In particular, it is assumed that both the PID 100 and the network device 102 have access to the public key repository 301 in order to obtain verified public key values.

An objective of the present embodiment is to ensure that information transferred between the PID 100 and network device 102 is secure and that the information transfer includes authorized user 101 of the BCU 103 being positively biometrically identified. This requires that the (secret) private key, Kpv, of a key pair Kpv/Kpb generated within the BCU 103 of PID 100 and corresponding to authorized user 101 is used in the information transfer, thereby ensuring that authorized user 101 is positively biometrically identified by BCU 103. As for other embodiments described herein, positive biometric identification of authorized user 101 to an external-device 102 is achieved without any of user 101's biometric information being released from BCU 103.

For the information transfers it is assumed that cryptographic key pairs are generated and used as follows.

PID 100:
 Key pair K1$pv$/K1$pb$ generated within the BCU 103 and corresponding to the authorized user 101;
  K1$pv$—private decryption key retained secretly within the BCU 103;
  K1$pb$—public encryption key—released publicly, available via key source 301.
 Key pair K2$pv$/K2$pb$ generated within the BCU 103 and corresponding to the authorized user 101;
  K2$pv$—private encryption key retained secretly within the BCU 103;
  K2$pb$—public decryption key—released publicly, available via key source 301.

Network Device 102:
 Key pair KN1$pv$/KN1$pb$;
  KN1$pv$—private decryption key retained secretly by the network device 102;
  KN1$pb$—public encryption key—released publicly, available via key source 301.
 Key pair KN2$pv$/KN2$pb$;
  KN2$pv$—private encryption key retained secretly by the network device 102;
  KN2$pb$—public decryption key—released publicly, available via key source 301.

All public keys are assumed to be available via the public key repository 301. As elsewhere in this document, the suffix (ver) applied to any public key indicates a verified public key value obtained from the public key repository 301.

Figure 4A:
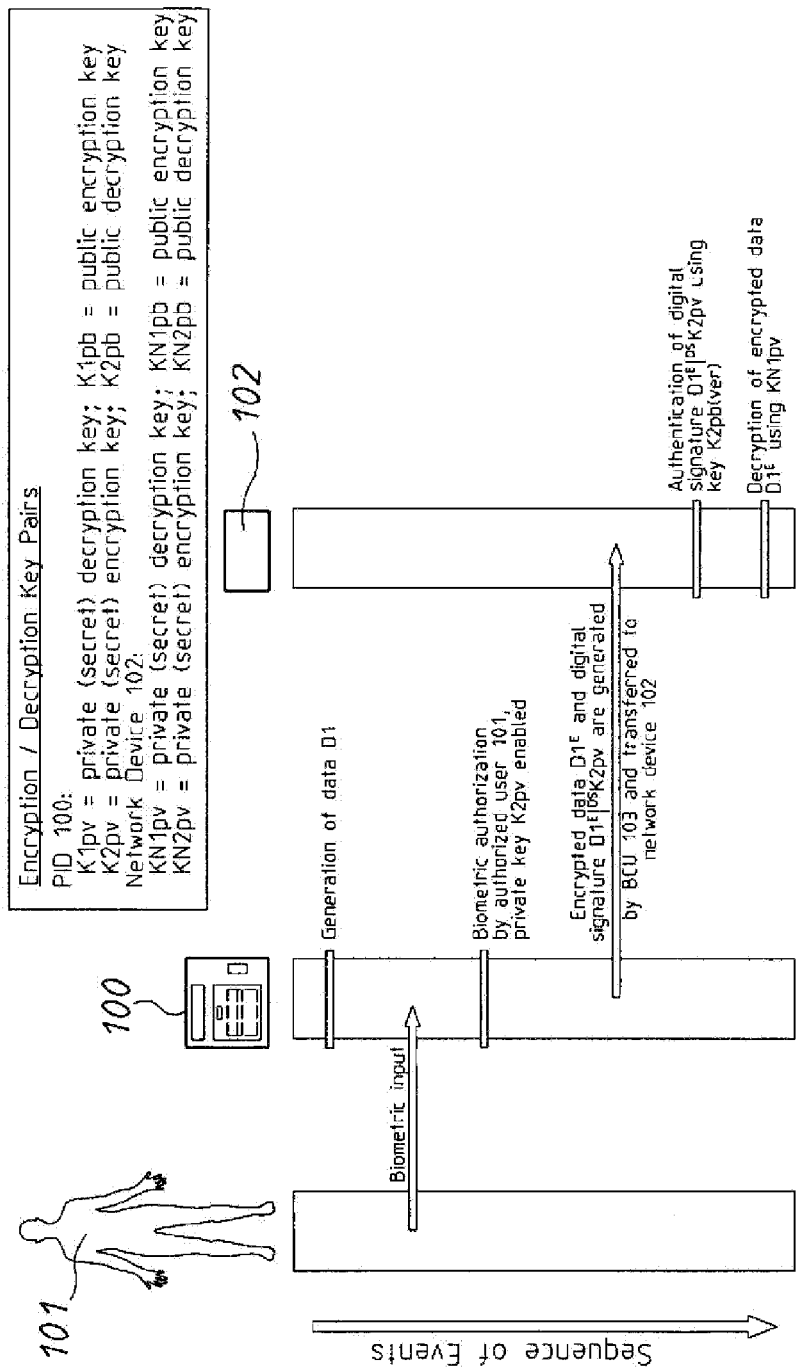
FIG. 4—comprising FIGS. 4(a) and 4(b)—is a schematic illustration of preferred methods by which a personal information device may send or receive encrypted information while also providing biometric identification of the authorized user of said personal information device.
Figure 4B:
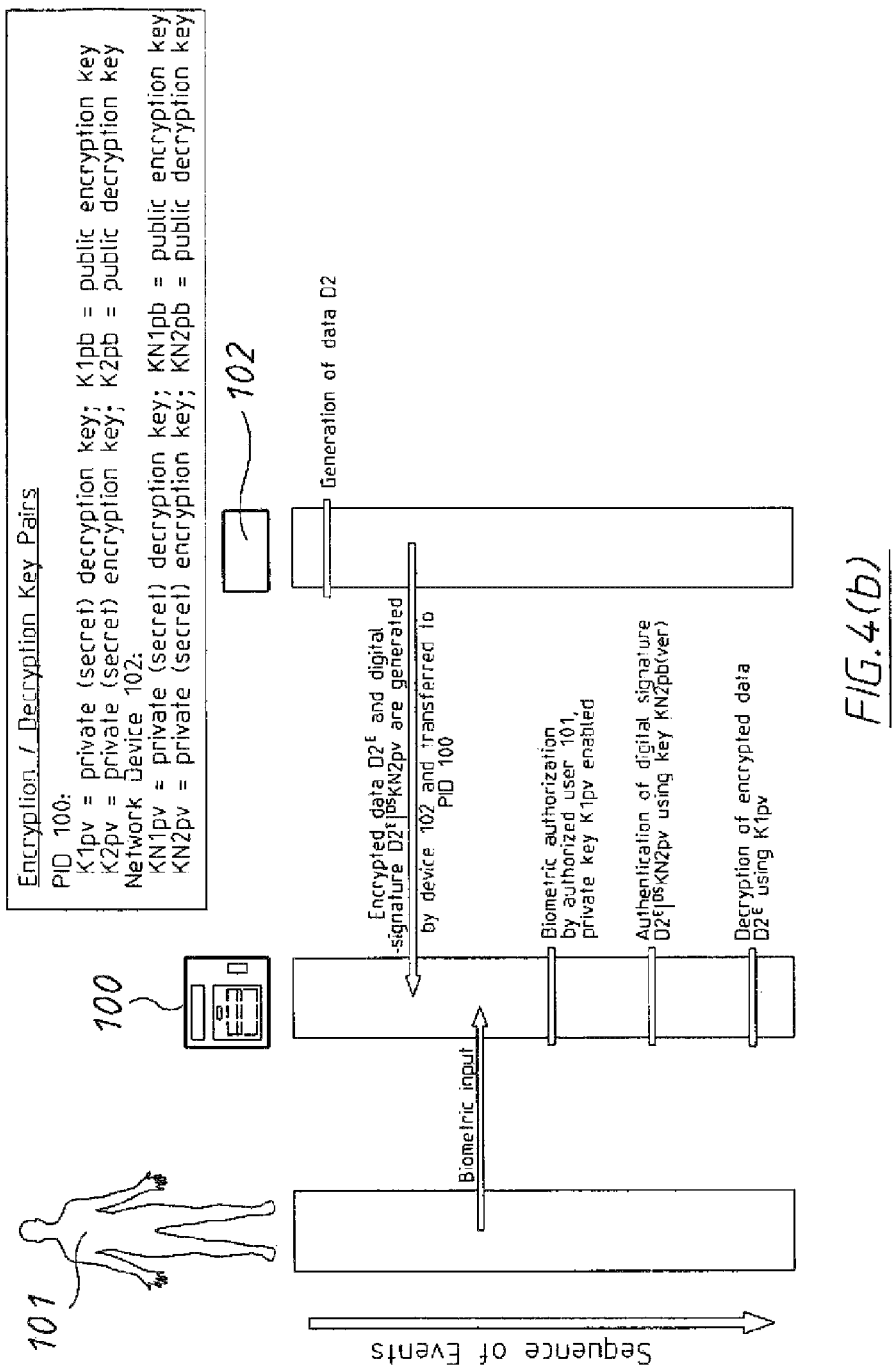

Non-limiting preferred embodiments of the processes involved in the two information transfer scenarios are now described and illustrated schematically in FIGS. 4($a$) and 4($b$). It should be noted that only the important aspects of the biometrically associated information exchanges relating to the information transfers are described below and illustrated schematically in FIGS. 4($a$) and 4($b$), and that not all of the information exchanges or information processing functions are necessarily described or illustrated. For example, in some embodiments each of the information exchanges described below may carry overhead data that identifies the source and intended recipient of the information exchange.

It should also be appreciated that in the following description of the preferred methods of FIGS. 4($a$) and 4($b$) the term "authorized user 101" has a meaning different from the meaning of the term "user 101". The term "user 101" refers to a generic user of PID 100, while the term "authorized user 101" refers to a specific authorized user who has previously been enrolled in the BCU 103 in PID 100. A function of the BCU 103 in the preferred methods of FIGS. 4($a$) and 4($b$) is to determine biometrically whether a generic "user 101" is in fact specific "authorized user 101", and if so to enable use by the BCU 103 for specific cryptographic operations of private keys generated and stored in the BCU 103 of PID 100 and corresponding to authorized user 101. If user 101 is not determined to be an authorized user of the BCU 103 in PID 100, then the private keys stored in BCU 103 corresponding to authorized users of the PID 100 will remain in their default disabled state—i.e. will not be enabled for use by the BCU 103.

Scenario 1 (FIG. 4($a$))—transfer of information D1 from the PID 100 (being used by authorized user 101) to the network device 102.

1. The information processing and information storage functions 108 within the PID 100 generate data D1 that is to be transferred to the network device 102, and said data D1 is transferred to the BCU 103 to be cryptographically processed for transmission to network device 102.

2. To undertake biometrically associated cryptographic processing of the data D1, BCU 103 must obtain biometric authorization from authorized user 101 for the specific cryptographic operations set out below (which cryptographic operations use private keys associated with authorized user 101). To do this BCU 103 gathers biometric information 105 from the user 101 and, based on said biometric information 105, determines whether the user 101 is an authorized user of the BCU 103. If, as part of authorized user 101 providing the required biometric authorization for said specific cryptographic operations, the user 101 is determined to be authorized user 101 of the BCU 103, then steps 3 and following (below) are undertaken. If the BCU 103 is unable to determine that the user 101 is an authorized user of the BCU 103, then the BCU 103 takes no further action and the process is stopped.

3. If the user 101 is determined to be authorized user 101 of the BCU 103, then the private key K2$pv$ (see above) corresponding to authorized user 101 is enabled for use by the cryptographic processing function 107 in BCU 103 for the specific cryptographic operation of generating a digital signature, as described below. Following this specific cryptographic operation the private key K2$pv$ will return to its default disabled state.

4. The data D1 is encrypted using the key KN1$pb$(ver), generating encrypted data [D1]KN1$pb$(ver)=D1$^E$. (The key KN1$pb$(ver) is obtained from the public key repository 301—not shown in FIG. 4($a$) or 4($b$).) The BCU 103 also uses the private key K2$pv$ to generate a digital signature, D1$^{E|DS}$K2$pv$, corresponding to the encrypted data D1$^E$. (Generation of a digital signature is a well-known process that will not be described in detail here.) Following this the private key K2$pv$ returns to its default disabled state. The encrypted data D1$^E$ and digital signature D1$^{E|DS}$K2$pv$ are then transmitted to the network device 102.

5. The network device 102 accepts the encrypted data D1$^E$ and digital signature D1$^{E|DS}$K2$pv$. Using the verified public key K2$pb$(ver), obtained from the public key repository 301, the network device 102 authenticates the digital signature D1$^{E|DS}$K2$pv$ corresponding to the encrypted data D1$^E$. Authentication of the digital signature $D1^E|^{DS}K2pv$ confirms that the digital signature was generated by BCU 103 using private key K2*pv*, and therefore amounts to securely biometrically identifying authorized user 101 as the sender of the encrypted data $D1^E$. Authentication of the digital signature $D1^E|^{DS}K2pv$ also verifies that the encrypted data $D1^E$ has not been modified since it was generated by the BCU 103. The encrypted data DIE is then decrypted by the network device 102 using the private decryption key KN1*pv*, which is retained in the network device 102, to retrieve the data D1.

Scenario 2 (FIG. 4(*b*))—Transfer of Information D2 from the Network Device 102 to Authorized User 101 of the PID 100.

1. The network device 102 generates or accepts data D2 to be transferred to authorized user 101 of the PID 100. The data D2 is encrypted using the public encryption key K1*pb*(ver), generating encrypted data [D2]K1*pb*(ver)= $D2^E$. (The public encryption key K1*pb*(ver) is obtained from the public key repository 301.) The network device 102 also uses the private encryption key KN2*pv* to generate a digital signature, $D2^E|^{DS}KN2pv$, corresponding to the encrypted data $D2^E$. (Generation of a digital signature is a well-known process that will not be described in detail here.) The encrypted data $D2^E$ and digital signature $D2^E|^{DS}KN2pv$ are then transmitted to the PID 100.

2. The BCU 103 in PID 100 receives the encrypted data $D2^E$ and digital signature $D2^E|^{DS}KN2pv$. Processing of the received information by the BCU 103 requires biometric authorization by authorized user 101 (which in turn requires positive biometric identification of authorized user 101) to enable the private key K1*pv* for the specific cryptographic operation of decrypting the encrypted data $D2^E$, following which the private key K1*pv* returns to its default disabled state.

3. The BCU 103 in PID 100 gathers biometric information 105 from the user 101 and, based on said biometric information 105, determines whether the user 101 is authorized user 101 of the BCU 103. If, as part of authorized user 101 providing biometric authorization for the specific cryptographic operation of decrypting the encrypted data $D2^E$, the user 101 is determined to be authorized user 101 of the PID 100, then steps 4 and following (below) are undertaken. If the BCU 103 is unable to determine that the user 101 is authorized user 101 of the BCU 103, then the PID 100 takes no further action and the received information is not processed.

4. If the user 101 is determined to be authorized user 101 of the BCU 103, then the private key K1*pv* (see above), corresponding to authorized user 101 of the BCU 103, is enabled for use by the cryptographic processing functions 107 for the specific cryptographic operation of decrypting the encrypted data $D2^E$, following which the private key K1*pv* returns to its default disabled state.

5. Using the verified public key, KN2*pb*(ver), obtained from public key repository 301, the cryptographic processing functions 107 in BCU 103 authenticate the digital signature $D2^E|^{DS}KN2pv$ corresponding to the encrypted data $D2^E$. Authentication of the digital signature $D2^E|^{DS}KN2pv$ confirms that the digital signature was generated by network device 102 using private key KN2*pv*, and that the encrypted data $D2^E$ has not been modified since it was generated by the network device 102. The encrypted data $D2^E$ is then decrypted by the cryptographic processing functions 107 in BCU 103, using the private decryption key K1*pv*, to retrieve the data D2, following which the private key K1*pv* returns to its default disabled state. Thus the information D2 cannot be read by the BCU 103 unless the private key K1*pv* is enabled, which requires positive biometric identification by the biometric processing functions 106 in BCU 103 of authorized user 101.

In both scenarios 1 and 2 above it can be seen that a (secret) private cryptographic key, K1*pv* or K2*pv*, corresponding to authorized user 101 of the BCU 103 is required to complete the information transfer, thereby requiring positive biometric identification by the BCU 103 of authorized user 101. Also, both data D1 and data D2 are encrypted while in transit, thereby ensuring in both scenarios 1 and 2 that the message data is confidential—i.e. it cannot be interpreted if intercepted by a third party.

It should be appreciated that the above information transfer methods are preferred embodiments only, and that other methods may be used instead. For example, while the above methods can be regarded as "encrypt then sign" methods, it should be appreciated that equivalent "sign then encrypt" methods could be used and that the "sign then encrypt" methods would be equally effective in requiring positive biometric identification by the BCU 103 of authorized user 101 in order to complete the information transfers.

Further, it should be appreciated that the network device 102 is able to establish or ensure positive biometric identification of authorized user 101 of BCU 103 without any of authorized user 101's biometric information being released from BCU 103 in PID 100.

Transfer of Information Between Two PID's

A situation is now described in which a specific authorized user 101 of a PID 100 sends data D3 to a specific authorized user 501 of PID 500. The PID 500 incorporates a BCU 503 that is similar to the BCU 103. Both PID 100 and PID 500 are part of the network 300 and therefore have connection to the public key repository 301. This situation is illustrated schematically in FIG. 5(*a*). Authorized user 101 needs to transmit information to authorized user 501, but needs to be sure that only authorized user 501 can read the transmitted information, while authorized user 501 needs to be able to confirm that the information was transmitted by authorized user 101. Authorized user 101 requires that his/her biometric information is not released from BCU 103, while authorized user 503 requires that his/her biometric information is not released from BCU 503.

For the transfer of data D3 it is assumed that cryptographic key pairs are generated and used as follows.

PID 100:
  Key pair K11*pv*/K11*pb* generated within the BCU 103 and corresponding to the authorized user 101;
    K11*pv*—private decryption key retained secretly within the BCU 103;
    K11*pb*—public encryption key—released publicly, available via key source 301.
  Key pair K12*pv*/K12*pb* generated within the BCU 103 and corresponding to the authorized user 101;
    K12*pv*—private encryption key retained secretly within the BCU 103;
    K12*pb*—public decryption key—released publicly, available via key source 301.

PID 500:
  Key pair K51*pv*/K51*pb* generated within the BCU 503 and corresponding to the authorized user 501;
    K51*pv*—private decryption key retained secretly within the BCU 503;
    K51*pb*—public encryption key—released publicly, available via key source 301.

Key pair K52*pv*/K52*pb* generated within the BCU 503 and corresponding to the authorized user 501;

K52*pv*—private encryption key retained secretly within the BCU 503;

K52*pb*—public decryption key—released publicly, available via key source 301.

All public keys are assumed to be available via the public key repository 301. As elsewhere in this document, the suffix (ver) applied to any public key indicates that the key was obtained from the public key repository 301.

An objective of the present embodiment is to ensure that data D3 transferred from authorized user 101 using PID 100 to authorized user 501 using PID 500 is secure and that completion of the information transfer involves both (i) authorized user 101 being positively biometrically identified by the BCU 103 in PID 100, and (ii) authorized user 501 being positively biometrically identified by the BCU 503 in PID 500. This requires that both (i) a (secret) private key K1*pv* generated within the BCU 103 and corresponding to the authorized user 101, and (ii) a (secret) private key K5*pv* generated within the BCU 503 and corresponding to the authorized user 501 are used in the information transfer, thereby requiring positive biometric identification of both authorized user 101 and authorized user 501.

A preferred method for transferring the information D3 from authorized user 101 of PID 100 to authorized user 501 of PID 500 is now described. The processes involved in the information transfer are illustrated schematically in FIG. 5(*b*). It should be noted that only the important aspects of the biometrically associated information exchanges relating to the information transfer are described below and illustrated schematically in FIG. 5(*b*), and that not all of the information exchanges or information processing functions are necessarily described or illustrated. In particular, in some embodiments each of the information exchanges described below may carry overhead data that identifies the source and intended recipient of the information exchange.

It should be appreciated that the preferred method described below in relation to FIG. 5(*b*) is a non-limiting example—other methods may be used instead, based on the principles described herein.

It should also be appreciated that in the following description of the preferred method of FIG. 5(*b*) the term "authorized user 101" has a meaning different from the meaning of the term "user 101". The term "user 101" refers to a generic user of BCU 103, while the term "authorized user 101" refers to a specific authorized user who has previously been enrolled in the BCU 103. A function of the BCU 103 in the preferred method of FIG. 5(*b*) is to determine biometrically whether generic "user 101" is in fact specific "authorized user 101", and if so to enable use by the cryptographic processing functions 107 in BCU 103 of private keys, generated and stored in the BCU 103 and corresponding to authorized user 101, for specific cryptographic operations, following which operations said private keys will return to their default disabled state. If user 101 is not biometrically determined to be an authorized user of the BCU 103, then the private keys stored in BCU 103 corresponding to authorized users of the BCU 103 will not be enabled for use by the BCU 103. Similarly, it should be appreciated that in the following description of the preferred method of FIG. 5(*b*) the term "authorized user 501" has a meaning different from the meaning of the term "user 501". The term "user 501" refers to a generic user of BCU 503, while the term "authorized user 501" refers to a specific authorized user who has previously been enrolled in the BCU 503. A function of the BCU 503 in the preferred method of FIG. 5(*b*) is to determine biometrically whether generic "user 501" is in fact specific "authorized user 501", and if so to enable use by the cryptographic processing functions in BCU 503 of private keys, generated and stored in the BCU 503 and corresponding to authorized user 501, for specific cryptographic operations, following which operations said private keys will return to their default disabled state. If user 501 is not biometrically determined to be an authorized user of the BCU 503, then the private keys stored in BCU 503 corresponding to authorized users of the BCU 503 will not be enabled for use by the BCU 503.

Steps in the transfer of information D3 from authorized user 101 of BCU 103 (in PID 100) to authorized user 501 of BCU 503 (in PID 500):

1. Authorized user 101 must obtain public keys for authorized user 501 in order to complete the information transfer while adhering to the biometric identification conditions described above. The public keys for authorized user 501 can be obtained from the public key repository 301 (not shown in FIG. 5(*b*)), as long as authorized user 101 has some way of identifying authorized user 501 to the public key repository 301. In one preferred embodiment the public key repository 301 may act as a "user directory", allowing anyone on the network 300 to look up authorized users on the network 300 in order to obtain their public keys, in a manner similar to looking up numbers in a telephone listing. In this sense the public key values corresponding to an authorized user of a BCU (or PID) are analogous to a telephone number or e-mail address for said authorized user, with the added benefit in this case that said public keys allow biometric identification of said authorized user. Some authorized users may prefer to restrict the availability of their public keys to a limited circle of users on the network 300. It is assumed that authorized user 101 is able to obtain public keys corresponding to authorized user 501.

2. The information processing and information storage functions 108 within the PID 100 generate data D3 that is to be transferred from authorized user 101 of PID 100 to authorized user 501 of PID 500, and said data D3 is transferred to the BCU 103.

3. To undertake biometrically associated cryptographic processing of the data D3, BCU 103 must obtain biometric authorization from authorized user 101 for the specific cryptographic operations set out below (which cryptographic operations use private keys associated with authorized user 101). To do this BCU 103 gathers biometric information 105 from the user 101 as part of said biometric authorization process and, based on said biometric information 105, determines whether the user 101 is authorized user 101 of the BCU 103. If the user 101 is determined to be authorized user 101 of the BCU 103, then steps 4 and following (below) are undertaken. If the BCU 103 is unable to determine that the user 101 is an authorized user of the BCU 103, then the BCU 103 takes no further action and the process is stopped.

4. If the user 101 is determined to be authorized user 101 of the BCU 103, then the private key K12*pv* (see above), corresponding to authorized user 101, is enabled for use by the BCU 103 for the specific cryptographic operation of generating a digital signature, as described below. Following this specific cryptographic operation the private key K12*pv* will return to its default disabled state.

5. The data D3 is encrypted with the public encryption key K51*pb*(ver), which is obtained from the public key repository 301, generating encrypted data [D3]K51*pb*(ver)=D3$^E$. The BCU 103 then uses the private key K12$pv$ to generate a digital signature, D3$^{E|DS}$K12$pv$, corresponding to the encrypted data D3$^E$, following which the private key K12$pv$ returns to its default disabled state. (Generation of a digital signature is a well-known process that will not be described in detail here.) The encrypted data D3$^E$ and digital signature D3$^{E|DS}$K12$pv$ are then transmitted to the PID 500.

6. The PID 500 receives the encrypted data D3$^E$ and digital signature D3$^{E|DS}$K12$pv$, but cannot process the received information until the appropriate private key in BCU 503 is enabled by authorized user 501.

7. Using the verified public key, K12$pb$(ver), the BCU 503 authenticates the digital signature D3$^{E|DS}$K12$pv$ corresponding to the encrypted data D3$^E$. Authentication of the digital signature D3$^{E|DS}$K12$pv$ confirms that the digital signature was generated by BCU 103 using private key K12$pv$, and therefore amounts to positively biometrically identifying authorized user 101 of BCU 103 as the sender of the encrypted data D3$^E$. Authentication of the digital signature D3$^{E|DS}$K12$pv$ also verifies that the encrypted data D3$^E$ has not been modified since it was generated by the BCU 103.

8. The BCU 503 must next obtain biometric authorization from authorized user 501 for the specific cryptographic operation of decrypting the encrypted data D3$^E$. This requires positive biometric identification of authorized user 501. To do this BCU 503 gathers biometric information from the user 501 and, based on said biometric information, determines whether the user 501 is authorized user 501 of the BCU 503. If the user 501 is determined to be authorized user 501 of the BCU 503, then steps 9 and following (below) are undertaken. If the BCU 503 is unable to determine that the user 501 is an authorized user of the BCU 503, then the BCU 503 takes no further action and the received encrypted data D3$^E$ cannot be decrypted.

9. If the user 501 is determined to be authorized user 501 of the BCU 503, then the private key K51$pv$ (see above), corresponding to authorized user 501, is enabled for use by the BCU 503 for the specific cryptographic operation of decrypting the encrypted data D3$^E$, following which the private key K1$pv$ will return to its default disabled state.

10. The encrypted data D3$^E$ is then decrypted by the BCU 503 using the private decryption key K51$pv$, thereby retrieving the data D3, following which the private key K51$pv$ returns to its default disabled state.

In the scenario described above a (secret) private cryptographic key, K12$pv$, corresponding to authorized user 101 of the BCU 103 is required to complete the information transfer, thereby requiring positive biometric identification by the BCU 103 of authorized user 101. Similarly, a (secret) private cryptographic key, K51$pv$, corresponding to authorized user 501 of the BCU 503 is required to complete the information transfer, thereby requiring positive biometric identification by the BCU 503 of authorized user 501. Also, the data D3 is encrypted while in transit from the PID 100 to the PID 500, thereby ensuring that the data D3 is confidential while in transit—i.e. it cannot be interpreted if intercepted by a third party, and can only be read by authorized user 501 of BCU 503.

It should be appreciated that the information transfer method described above in relation to FIG. 5 is a preferred embodiment only, and that other methods may be used instead. For example, while the above method can be regarded as an "encrypt then sign" method, it should be appreciated that an equivalent "sign then encrypt" method could be used and that the "sign then encrypt" method would be equally effective in requiring secure biometric identification by the BCU 103 of authorized user 101 and by the BCU 503 of authorized user 501 in order to complete the transfer of the data D3.

Obviously, authorized user 501 of PID 500 is able to use a reciprocal process to transfer information to authorized user 101 of PID 100, with the information so transferred being biometrically tagged and encrypted while in transit, as described above.

Management and Distribution of Public Key Values

The scenario described in relation to the embodiment of FIG. 5 will now be considered in more detail, to examine the requirements for distributing and managing public keys Kpb.

Preferably a timestamp T1 may be attached to, or associated with, the public encryption key K51$pb$(ver) by the public key repository 301 when the key K51$pb$(ver) is downloaded from the public key repository 301 to the BCU 103, said timestamp T1 indicating the time at which the public key K51$pb$(ver) is identified by the public key repository 301 for downloading to the BCU 103. The BCU 103 will then use the value of the private encryption key, K12$pv$, that was valid at time T1 for preparation of the digital signature D3$^{E|DS}$K12$pv$. Preferably the BCU 103 will then combine the timestamp T1 with the encrypted data D3$^E$. The timestamp T1 will in one preferred embodiment be available in an unencrypted form so that it can be read by the BCU 503 without the need for any cryptographic processing. The timestamp T1 is preferably secured by being incorporated into the data from which the digital signature D3$^{E|DS}$K12$pv$ is derived, which digital signature is generated using the private key K12$pv$.

Hence for the situation described in relation to FIG. 5, in one embodiment the data transferred by authorized user 101 (using PID 100) to authorized user 501 (using PID 500) may be represented as D3$^{E/T1}$+D3$^{E/T1|DS}$K12$pv^{T1}$; where:

D3$^{E/T1}$=[D3]K51$pb$(ver)$^{T1}$+T1

K51$pb$(ver)$^{T1}$ is the active value of the key K51$pb$(ver) at time T1, as obtained from the public key repository 301

K12$pv^{T1}$ is the active value of the key K12$pv$ at time T1, as obtained from the BCU 103

In some embodiments a second timestamp, T1$a$, may also be combined with the encrypted data D3$^E$, indicating the time at which the encrypted data D3$^E$ and digital signature D3$^{E|DS}$K12$pv$ were prepared for transmission to authorized user 501 of BCU 503. This will allow authorized user 501 to determine when the encrypted data D3$^E$ and digital signature D3$^{E|DS}$K12$pv$ were prepared, and whether the encrypted data D3$^E$ and digital signature D3$^{E|DS}$K12$pv$ were prepared using encryption keys that were old—i.e. encryption keys that were updated between time T1 and time T1$a$.

The encrypted data D3$^E$ and digital signature D3$^{E|DS}$K12$pv$ are received by the PID 500 and read by authorized user 501 of PID 500 at a later time T2. The time difference between time T1 and time T2 may occur for any of a number of reasons. For example, the PID 500 may be turned off for a time, or the user 501 may not check the PID 500 for some time, as occurs with e-mail and other messaging systems. There may in some cases be a considerable time difference between T1 and T2, and the asymmetric key pairs Kpv/Kpb in BCU 103 corresponding to authorized user 101 and/or in BCU 503 corresponding to authorized user 501 may have been updated between time T1 and time T2, while on the other hand the encrypted data D3$^E$ and digital signature D3$^{E|DS}$K12$pv$ are biometrically tagged for both the sender 101 and recipient 501 using cryptographic keys that were active at time T1. Authorized user 501 of PID 500 will only be able to authenticate the digital signature D3$^{E|DS}$K12$pv$ and read the encrypted data $D3^E$ by using key values that were active at time T1. This can be achieved as follows.

Firstly, each PID on the network 300 will preferably retain in its BCU a history of its own key pairs, along with the active time window for each key pair (see above for a definition of active time window).

Secondly, the public key repository 301 will preferably retain a history of all public keys used on the network 300, along with the corresponding active time window and associated authorized user information (described above) for each public key.

Hence the PID 500 and authorized user 501, on receiving encrypted data $D3^{E/T1}$ (incorporating timestamp T1) and digital signature $D3^{E/T1}|^{DS}K12pv^{T1}$, will be able to determine from records within the BCU 503 the public and private keys corresponding to user 501 that were active at time T1. Similarly, the BCU 503 will be able to obtain from the public key repository 301 the public keys for authorized user 101 using BCU 103 that were active at time T1. Hence the authorized user 501, using PID 500, will be able to use key values that were active at time T1 to authenticate the digital signature $D3^{E/T1}|^{DS}K12pv^{T1}$ and read the encrypted data $D3^{E/T1}$ received from PID 100.

Hence it can be concluded that for those systems in which the key pairs Kpv/Kpb are updated from time to time, the following features are preferred:
- a secure timestamp T1 should be incorporated into each message that is biometrically tagged for transmission to another device;
- each device (BCU, PID or other type of device) on the network should retain a history of its own asymmetric key pairs, along with the active time window for each key pair;
- the public key repository 301 should retain a history of public keys for all devices that are part of the network 300, along with the active time window for each such public key.

The inclusion of these features will enable the authentication and reading of biometrically tagged information even when such information is authenticated and read at a time significantly later than the time at which it was generated.

Use of the Public Key Repository to Identify Authorized Users on a Network

The public key repository 301 may be used as a directory, allowing an authorized user on the network 300 to search the public key repository 301 for another specific authorized user on the network 300 and obtain public key values for said other specific authorized user, thereby enabling biometrically authenticated communications with said other specific authorized user.

As described above, for each authorized user on the network 300 the public key repository 301 will preferably store:
- a unique identification (ID) number;
- personal information—such as (for example) name, date-of birth, gender, photograph;
- current and historical public key values, along with the active time window for each public key.

The unique ID for each authorized user, which is assigned at the time of enrollment (as described above), will preferably not change and is therefore analogous to a personal telephone number or e-mail address. The unique ID number is simply a means to unambiguously specify an authorized user, but does not provide a means of secure identification.

The personal information will be recorded at the time of enrollment and in some systems will remain fixed. Some systems may allow updating of certain types of personal information, provided the corresponding authorized user is biometrically identified during the updating process, but the basic personal information will preferably remain fixed.

As described herein, the public key values corresponding to an authorized user may be updated from time to time and are therefore not constant. The updating of key pairs corresponding to an authorized user is preferably transparent to said authorized user (other than for said authorized user providing biometric authorization for said uploading), and uploading of new public keys is preferably carried out as described herein.

An authorized user 101 using PID 100 wanting to contact another authorized user 501 using PID 500, with both users being part of the network 300, may do so via the following procedure.

The authorized user 101 may use PID 100 to contact the public key repository 301 and search the public key repository 301 for authorized user 501, using user 501's unique ID and/or personal information as search parameters.

Once the authorized user 501 has been found in the database of the public key repository 301, the public key repository 301 will provide to BCU 103 in PID 100 the current public key values for authorized user 501 (preferably with timestamp T1, as described above).

After obtaining biometric authorization from authorized user 101 (which includes positively biometrically identifying authorized user 101), the BCU 103 in PID 100 is able to use the required private keys corresponding to authorized user 101 along with the current public key values for user 501 to undertake biometrically authenticated communication with user 501, as described above in relation to FIG. 5.

In processing a biometrically tagged message received from authorized user 101 using PID 100, authorized user 501 using PID 500 will go through similar procedures to recover authorized user 101's public key values and to enable his or her own key pairs (within BCU 503), but in this case the key values will be those that were active at the time corresponding to timestamp T1 in said received message, as described above.

The public key repository 301 therefore acts as a directory of authorized users on the network 300, allowing each authorized user on the network 300 to search the public key repository 301 for any other authorized user—using said other user's unique ID number and/or personal information as search parameters—and obtain said other authorized user's current or historical public key values, thereby enabling biometrically authenticated communication with said other authorized user.

FIG. 6 is a schematic illustration of an example of user information that may be retained in the BCU 103 of PID 100 (FIG. 6(*a*)) and in the public key repository 301 (FIG. 6(*b*)).

FIG. 6(*a*) illustrates schematically information that may be stored in the BCU 103 of the PID 100 corresponding to authorized user 101. In this example said information includes the following personal information: unique user identification number, user name, date of birth and gender. As illustrated schematically in FIG. 6(*a*), also stored in the BCU 103 are the current asymmetric cryptographic key pairs corresponding to authorized user 101 and the historical key pair values, along with active time window information for each key pair. As described herein, the private keys of said cryptographic key pairs for authorized user 101 are enabled for a specific cryptographic operation by the cryptographic processing functions 107 in BCU 103 only if authorized user 101 provides biometric authorization (which includes authorized user 101 being positively biometrically identified by the BCU 103). It should be appreciated that the BCU 103 may store similar information for other authorized users of the PID 100.

FIG. 6(*b*) illustrates schematically the information that may be stored in the public key repository 301 corresponding to each authorized user on the network 300. Each authorized user on the network 300 will have an information file, or record file, in the public key repository 301. The information file 601, which is illustrated schematically in detail on the left hand side of FIG. 6(*b*), is an example of an information file that in this case corresponds to authorized user 101. Similar information files will be maintained in the public key repository 301 for each authorized user on the network 300. In this example the information file 601 for authorized user 101 includes the following personal information: unique user identification number, user name, date of birth and gender. Also stored in the information file 601 are the current public key values corresponding to authorized user 101 and the historical public key values, along with active time window information for each public key.

The information file 601 is analogous to the digital certificates currently used in internet transactions, and in some embodiments each of the information files in the public key repository 301 may be digitally signed using a private key retained by the public key repository 301 and released as a digital certificate that can be verified using the corresponding public key that is available from the public key repository 301.

To provide a more specific example, if the key pairs generated by the BCU in a PID—for example, the BCU 103 in PID 100 or the BCU 503 in PID 500—have a specified expiration data or revocation date at the time they are generated, then it is feasible and may even be preferable for the information files (such as the information file 601) corresponding to authorized users on the network 300 to be prepared as digital certificates and allowed to circulate throughout the network 300. In one embodiment such digital certificates may be self-signed by the respective authorized user's PID, while in another embodiment such digital certificates may be prepared and signed by the public key repository 301, which in this embodiment is essentially acting as a certificate authority. In either case for absolute certainty a recipient of such a digital certificate would need to refer to the public key repository 301 to verify either the issuing authorized user's public key(s) or the public key(s) for the public key repository 301. If, on the other hand, the key pairs generated by the BCU in a PID do not have a specified expiration data or revocation date at the time they are generated (i.e. they can be updated at any time by the issuing BCU), then it is less advantageous for the information files (such as the information file 601) corresponding to authorized users on the network 300 to be prepared as digital certificates and allowed to circulate throughout the network 300, the reason being that a recipient of such a digital certificate would not know from the certificate whether it is still valid and would therefore need to refer to the public key repository 301 in any case to verify the latest public key information for the corresponding authorized user on the network 300.

In addition, information files may be maintained in the public key repository 301 for other devices (i.e. devices other than BCU's or PID's) on the network 300 that generate and use cryptographic key pairs, such as the device 102 described in the embodiment of FIG. 4. The corresponding information file for each of such other devices will obviously not include personal information, but will include identifying information for the device, current and historical public key values corresponding to the device, along with corresponding active time window information for each public key value.

Figure 7:
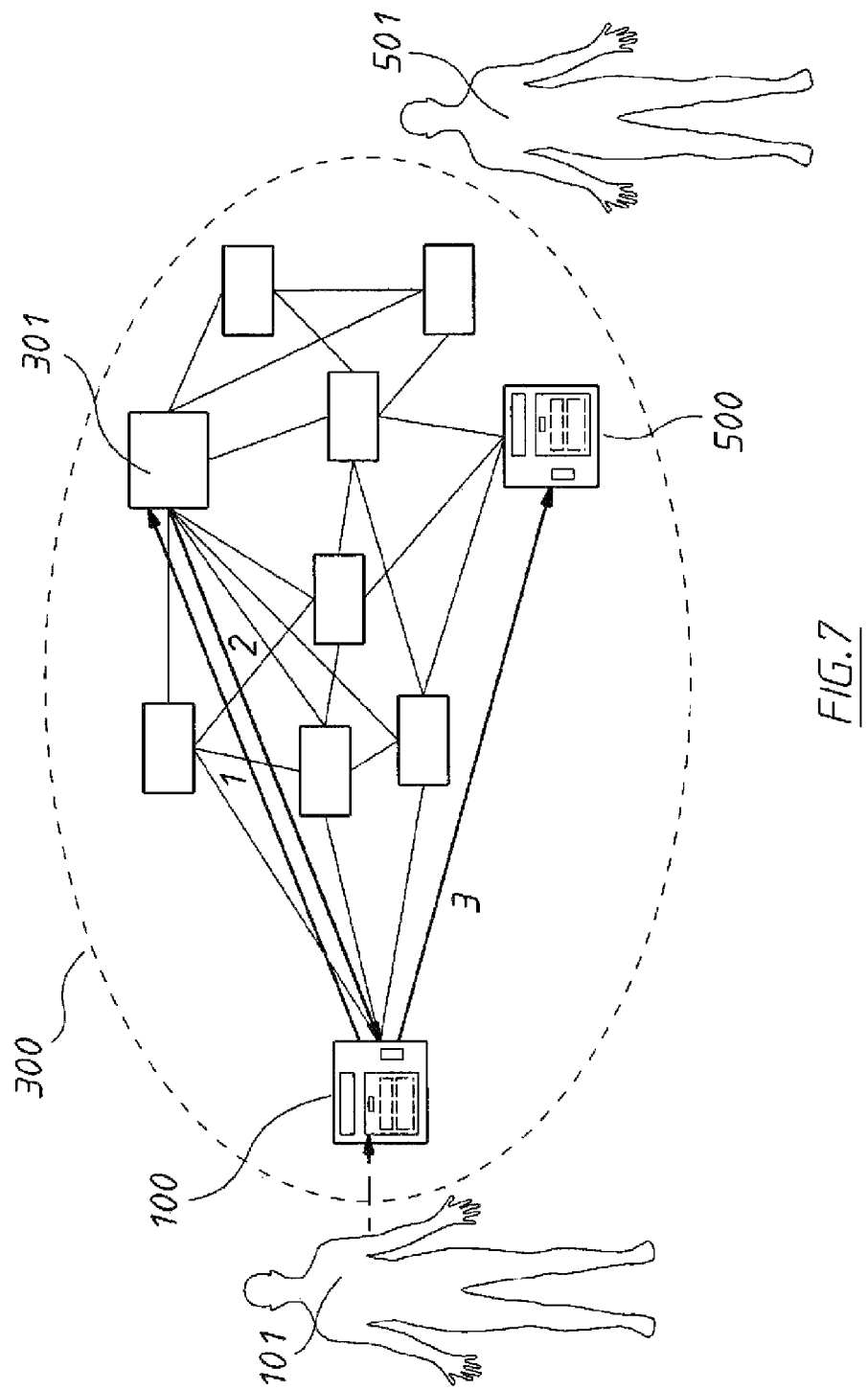
FIG. 7 is a schematic illustration of a preferred method by which an authorized user of a personal information device that is part of an information network can obtain public key values for a second authorized user of a second personal information device that is also part of the same information network and thereby prepare biometrically identified information to be sent to said second authorized user.

FIG. 7, which is based on the preferred embodiment of FIG. 5, is a schematic illustration of the processes involved in authorized user 101 obtaining public key values for authorized user 501 in order that authorized user 101 can send biometrically tagged information to authorized user 501, as described in relation to FIG. 5. It is assumed that authorized user 101 does not initially have public key values for authorized user 501, in which case authorized user 101 will (by means of the BCU 103 in PID 100) search the public key repository 301 to obtain public key values for authorized user 501. In one non-limiting example this may be done as follows.

Authorized user 101 sends (via the BCU 103 in PID 100) to the public key repository 301 a request for public key values for authorized user 501, identifying authorized user 501 to the public key repository 301 by providing the unique identification number and/or personal information for authorized user 501—this is indicated by arrow "1" in FIG. 7.

The public key repository 301 searches its database using information provided by authorized user 101, finds the information file for authorized user 501 (see the example information file 601 for authorized user 101 in FIG. 6), and securely transfers to BCU 103 personal information and the current public key values for authorized user 501, along with timestamp T1—this is indicated by arrow "2" in FIG. 7.

Using the public key values for authorized user 501, authorized user 101 (using BCU 103 in PID 100) then prepares biometrically tagged information and sends it to authorized user 501 via PID 500, as described in relation to FIG. 5—this is indicated by arrow "3" in FIG. 7.

FIG. 8 is a schematic illustration of a preferred embodiment of the selection and retrieval by the BCU 503 (in PID 500) of cryptographic keys for use in authenticating and decrypting the information exchange described above and in relation to the preferred embodiment of FIG. 5, in which the PID 500 receives from authorized user 101 (via PID 100) message information $D3^{E/T1}+D3^{E/T1}|^{DS}K12pv^{T1}$ that is biometrically tagged for both the sender (authorized user 101 of PID 100) and the recipient (authorized user 501 of PID 500) using key values that were active at time T1 (as described above and in the embodiment of FIG. 5). As discussed above, the message information may preferably incorporate a timestamp T1 and be processed by authorized user 501, using PID 500, at a later time T2. Given that at least some of the cryptographic keys used in the biometric tagging process may have changed between time T1 and time T2, to process the message information the BCU 503 in PID 500 will need to retrieve and use cryptographic keys that were valid at time T1.

FIG. 8(*a*) is a schematic illustration of the retrieval from the public key repository 301 of public keys corresponding to authorized user 101 at time T1. FIG. 8(*a*) illustrates the public key repository 301, which retains an information file for each authorized user and each cryptographically-enabled device on the network 300. Information file 801 corresponds to authorized user 101 of BCU 103 (in PID 100). To retrieve the public keys for user 101 corresponding to time T1, PID 500 accesses the public key repository 301 and looks up information file 801 (for authorized user 101), retrieving the public key values 802 that were valid at time T1. In the illustrative example of FIG. 8, time T1 is 1:17 pm on Mar. 23, 2009, while the retrieved public key values 802 were valid from 5:28 pm on Mar. 21, 2009 to 11:12 am on Mar. 29, 2009. The public key values 802 are then used by BCU 503 in PID 500 to process the biometrically tagged message information transferred from authorized user 101 to authorized user 501 (as described above and in relation to the embodiment of FIG. 5).

FIG. 8(b) is a schematic illustration of the retrieval by BCU 503 in PID 500 of its internal private keys corresponding to authorized user 501 that were active at time T1. It should be noted that these private keys, and any other private keys corresponding to authorized user 501, are enabled for use by the BCU 503 for a specific cryptographic operation only if authorized user 501 provides biometric authorization for such use (which requires authorized user 501 to be positively biometrically identified by BCU 503, as described above in relation to BCU 103). BCU 503 looks up information for authorized user 501, retrieving the key pairs 803 that were valid at time T1. In the illustrative example of FIG. 8, time T1 is 1:17 pm on Mar. 23, 2009, while the key pairs 803 were valid from 4:16 pm on Mar. 18, 2009 to 2:36 pm on Apr. 2, 2009. The required private keys corresponding to key pairs 803 are retrieved and used (assuming biometric authorization is provided by authorized user 501) to process the biometrically tagged information transferred from authorized user 101 to authorized user 501 (as described above and in relation to the embodiment of FIG. 5).

A Simplified System without Key Updating

In some situations key updating may be regarded as unnecessary, in which case a system such as is described herein may be implemented without it. Furthermore, a network 300 may include a mix of PIDs with key updating and PIDs without key updating.

An advantage of not implementing key updating is that key management is simpler, while a disadvantage is somewhat lower security due to the fact that the keys are in use for longer and therefore there is more time for someone to try to "crack" them.

A system that does not implement key updating can be a simple variation on the embodiments described herein.

A first preferred embodiment of a PID (and BCU) that does not implement key updating is now described. The above section entitled "Enrollment of a BCU/PID and Authorized User" describes a preferred embodiment in which the PID 100 (incorporating BCU 103) is provided in an initial state prior to enrollment of an authorized user. In its initial state the BCU 103 within the PID 100 retains a pair of "set-up" cryptographic keys $Kpb^{setup}/Kpv^{setup}$, these being keys that are generated within the BCU 103 but that do not correspond to a particular user at the time they are generated. These keys will preferably be unique. Hence after the enrollment of authorized user 101 these set-up keys, $Kpv^{setup}/Kpb^{setup}$, may be biometrically associated with the authorized user 101 and used thereafter as described herein. If more than one pair of keys is needed for authorized user 101 then the BCU 103 may be prepared in its initial state with the required number of key pairs. For example, if two pairs of keys are required, the BCU 103 within the PID 100 may in its initial state retain two pairs of "set-up" cryptographic keys $K1pv^{setup}/K1pb^{setup}$ and $K2pv^{setup}/K2pb^{setup}$, these being keys that are generated within the BCU 103 and that after the enrollment process may be biometrically associated with authorized user 101 (as described herein). The set-up keys $Kpv^{setup}/Kpb^{setup}$, after being biometrically associated with authorized user 101 in the BCU 103, are in this embodiment used thereafter for biometric identification of authorized user 101 as described herein, without further key updating.

A second preferred embodiment of a PID that does not implement key updating is now described. In this preferred embodiment the set-up keys, $Kpv^{setup}/Kpb^{setup}$, are updated once during the enrollment process but no further updating is done beyond this. In other words, during enrollment one or more initial key pairs, are generated by the cryptographic processing functions 107 in BCU 103 and associated with authorized user 101, as described herein, but after this no further key updating is carried out. The advantages of carrying out one key updating operation at the time of enrollment are (i) it provides the corresponding authorized user with new keys that at the time of enrollment are certain not to have been cracked, and (ii) it allows the required number of key pairs to be generated for the authorized user at the time of enrollment, even though there may have been only a single pair of set-up keys, $Kpv^{setup}/Kpb^{setup}$, generated initially in the BCU 103— for example, authorized user 101 may require three pairs of keys to operate with, while the BCU 103 may have been prepared in its initial state with only one pair of set-up keys. The above section entitled "Enrollment of a BCU/PID and Authorized User" describes an embodiment in which the PID 100 is provided in an initial state prior to enrollment of an authorized user. In its initial state the BCU 103 within PID 100 retains a pair of "set-up" cryptographic keys $Kpv^{setup}/Kpb^{setup}$, these being keys that are generated within the BCU 103 but that do not correspond to a particular user at the time they are generated. As described above, after enrollment the setup keys, $Kpb^{setup}/Kpv^{setup}$, may be replaced by one or more initial key pairs $Kpv^{initial}/Kpb^{initial}$ corresponding to the authorized user 101, the initial key pairs $Kpv^{initial}/Kpb^{initial}$ being generated within the BCU 103. The BCU 103 associates the initial key pairs, $Kpb^{initial}/Kpv^{initial}$, with biometric identification of authorized user 101, as described herein. The PID 100 securely transmits the initial public key values, $Kpb^{initial}$, to the network enrollment device 302 (see FIG. 3(a)), from which they are securely transmitted, along with the unique ID number and personal information for authorized user 101—for example the user's name, date of birth, gender, photograph, etc.—to the public key repository 301. The initial key pairs, $Kpv^{initial}/Kpb^{initial}$, are associated in the BCU 103 with biometric identification authorized user 101 and are used thereafter as described herein, without further key updating.

One-Time Cryptographic Keys

The use of one-time cryptographic keys in the context of the present invention will now be described. A one-time key is, as the name suggests, a key that is used only once. The use of one-time keys provides enhanced security, since it limits the exposure of each key to the single instance in which the key is used and therefore limits opportunities for someone to "crack" the key.

The embodiments of the invention described herein include the use of asymmetric key pairs, Kpv/Kpb. Each key pair, Kpv/Kpb, that is biometrically associated with an authorized user of a BCU is generated by said BCU. A one-time key pair, Kpv/Kpb, generated by a BCU is a key pair in which the private key, Kpv, is used only once and then retired, after which said one-time key pair may be replaced (updated) by another one-time key pair generated by said BCU.

An embodiment of the present invention that uses one-time key pairs is similar in principle to the embodiments described above. However, in practice there are differences that must be taken into account. An embodiment that uses one-time key pairs is described below.

Figure 5A:
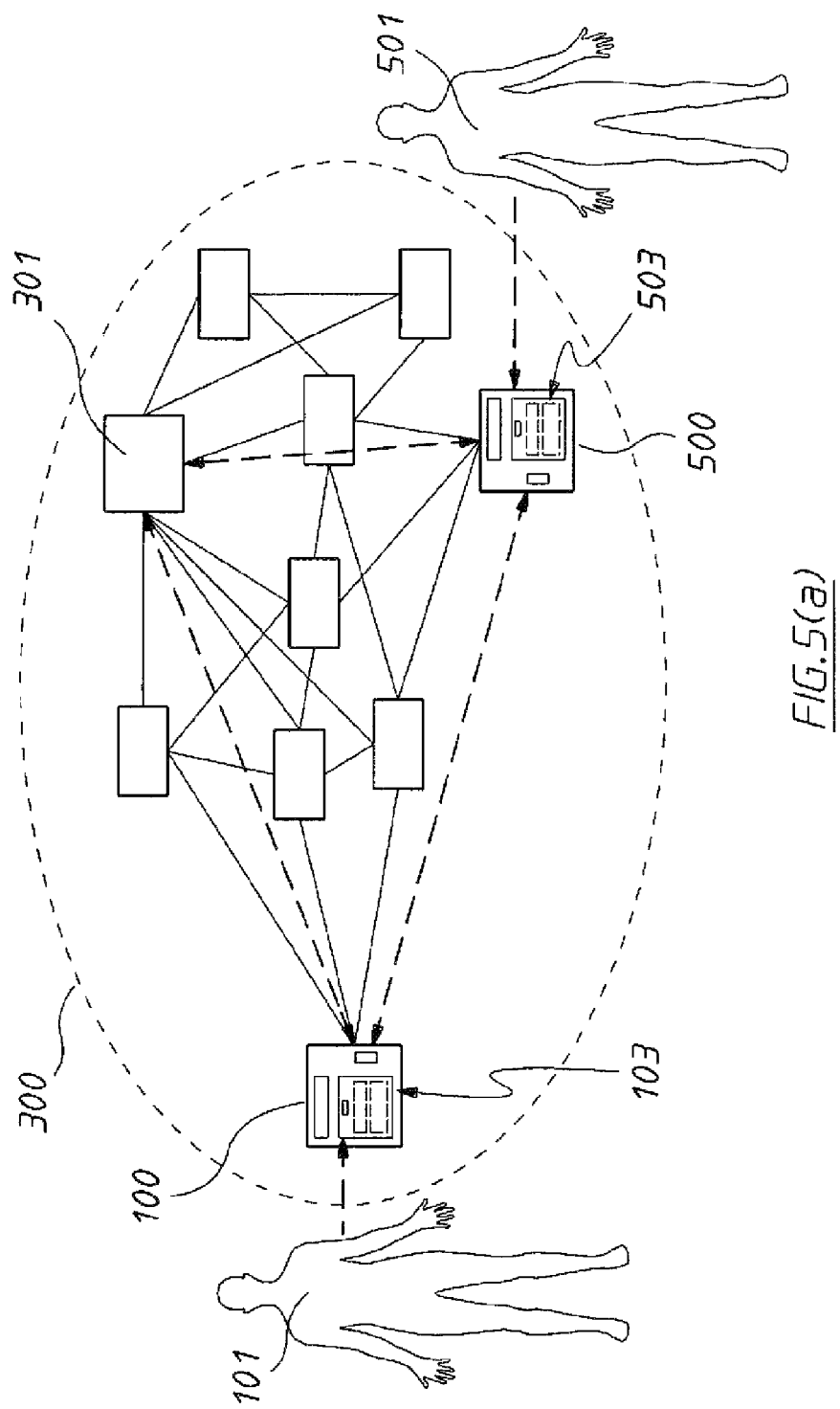
FIG. 5—comprising FIGS. 5(a) and 5(b)—is a schematic illustration of a preferred method by which biometrically authenticated information is transferred from a first authorized user using a first personal information device to a second authorized user using a second personal information device.

Following is a description of a situation, similar to that described in relation to FIG. 5(a), in which an authorized user 101 of PID 100 needs to send data—in this case data D4—to a specific authorized user 501 of PID 500. This is illustrated schematically in FIG. 5(a). As in the embodiment of FIG. 5, for the transfer of data D4 it is assumed that cryptographic key pairs are generated and used as follows.

PID 100:
  Key pair K11$pv$/K11$pb$ generated within the BCU 103 and corresponding to the authorized user 101;
    K11$pv$—private decryption key retained secretly within the BCU 103;
    K11$pb$—public encryption key—released publicly, available via key source 301.
  Key pair K12$pv$/K12$pb$ generated within the BCU 103 and corresponding to the authorized user 101;
    K12$pv$—private encryption key retained secretly within the BCU 103;
    K12$pb$—public decryption key—released publicly, available via key source 301.
PID 500:
  Key pair K51$pv$/K51$pb$ generated within the BCU 503 and corresponding to the authorized user 501;
    K51$pv$—private decryption key retained secretly within the BCU 503;
    K51$pb$—public encryption key—released publicly, available via key source 301.
  Key pair K52$pv$/K52$pb$ generated within the BCU 503 and corresponding to the authorized user 501;
    K52$pv$—private encryption key retained secretly within the BCU 503;
    K52$pb$—public decryption key—released publicly, available via key source 301.

Unlike the embodiment of FIG. 5, in the present embodiment any biometrically associated key pair—i.e. any cryptographic key pair, Kpv/Kpb, that is associated with biometric identification of an authorized user of a BCU—is a one-time key pair.

In a manner similar to the embodiment of FIG. 5, an objective of the present embodiment is to ensure that data D4 transferred from authorized user 101 using PID 100 to authorized user 501 using PID 500 is secure, and that completion of the information transfer requires that both (i) authorized user 101 is positively biometrically identified by the BCU 103 in PID 100 and (ii) authorized user 501 is positively biometrically identified by the BCU 503 in PID 500. This requires that both (i) a (secret) private key K12$pv$ generated within the BCU 103 and corresponding to the authorized user 101, and (ii) a (secret) private key K51$pv$ generated within the BCU 503 and corresponding to the authorized user 501 are used in the information transfer, thereby securely and positively biometrically identifying both the authorized user 101 and the authorized user 501. A difference between the present embodiment and the embodiment of FIG. 5 is that in the present embodiment each biometrically associated private key will be used only once.

A preferred method for transferring the information D4 from the authorized user 101 of PID 100 to the authorized user 501 of PID 500 is now described. The processes involved in the information transfer are illustrated schematically in FIGS. 9(*a*) and 9(*b*). It should be noted that only the important aspects of the biometrically associated information exchanges relating to the information transfer are described below and illustrated schematically in FIGS. 9(*a*) and 9(*b*), and that not all of the information exchanges or information processing functions are necessarily described or illustrated—for example, additional security functions (which may involve cryptographic techniques) and administrative overhead may be associated with the information exchanges.

It should be appreciated that the preferred method described below in relation to FIGS. 9(*a*) and 9(*b*) is a non-limiting example—other methods may be used instead, based on the principles described herein.

Before describing the processes associated with the transfer of information D4 an important aspect of the uploading of biometrically associated information to the public key repository 301 will now be discussed.

In the embodiment described below and illustrated in FIGS. 9(*a*) and 9(*b*) there is a need for the BCU 103 and the BCU 503 to undertake biometrically authorized information uploads to the public key repository 301—specifically, to upload biometrically authenticated information such as public key values to the public key repository 301. A situation in which authorized user 101 using BCU 103 needs to upload biometrically authenticated information to the public key repository 301 is now discussed, but it should be appreciated that the same considerations apply to any authorized user of a BCU-uploading biometrically authenticated information to the public key repository 301. For authorized user 101 of BCU 103 to reliably and securely upload biometrically associated information (such as a new public key) to the public key repository 301, the public key repository 301 must be able to biometrically authenticate said information—i.e. confirm that said upload was biometrically authorized by authorized user 101 and therefore that the uploaded information did actually come from authorized user 101 using BCU 103. In the present embodiment an additional condition is that all biometrically associated key pairs must be one-time key pairs. These requirements can be met as follows.

Suppose the biometrically associated information to be uploaded to the public key repository 301 is $I^{UPLOAD}$. $I^{UPLOAD}$ may, for example, be a new public key corresponding to authorized user 101. A one-time key pair, Kpv/Kpb$^{UPLOAD}$, generated by BCU 103 and corresponding to authorized user 101, will be used to upload the information $I^{UPLOAD}$. The BCU 103 will generate internally a sequence of one-time key pairs, Kpv/Kpb$^{UPLOAD(M)}$ (where M=1, 2, 3, ...), dedicated to uploading information corresponding to, or in some way related to, authorized user 101 from BCU 103 to the public key repository 301, with the one-time key pair Kpv/Kpb$^{UPLOAD(M)}$ corresponding to the M$^{th}$ uploading event. At the time of the (N−1)$^{th}$ uploading event, the BCU 103 generates a one-time key pair, Kpv/Kpb$^{UPLOAD(N)}$ to be used for the N$^{th}$ uploading, where Kpv$^{UPLOAD(N)}$ is a private encryption key and Kpb$^{UPLOAD(N)}$ is the corresponding public decryption key. The BCU 103 includes the public decryption key Kpb$^{UPLOAD(N)}$ as part of the information, $I^{UPLOAD(N-1)}$ uploaded to the public key repository 301 during the (N−1)$^{th}$ uploading. The private encryption key Kpv$^{UPLOAD(N)}$ is retained secretly in the BCU 103 for use during the (N)th upload operation. The (N)th upload operation is then undertaken as follows.

1. The new information, $I^{NEW(N)}$, to be uploaded to the public key repository 301 during the N$^{th}$ uploading operation is prepared in the BCU 103—in some instances it may be (or may include) a new public key, Kpb, generated by the BCU 103 and corresponding to authorized user 101.
2. The BCU 103 generates the (N+1)$^{th}$ one-time upload key pair, Kpv/Kpb$^{UPLOAD(N+1)}$, and adds the public decryption key Kpb$^{UPLOAD(N+1)}$ to $I^{NEW(N)}$ along with instructions to retire Kpb$^{UPLOAD(N)}$ after the current use and replace it with Kpb$^{UPLOAD(N+1)}$—thereby generating the N$^{th}$ upload information $I^{UPLOAD(N)}$.
3. Authorized user 101 provides biometric authorization for the specific cryptographic operation of generating a digital signature using the key Kpv$^{UPLOAD(N)}$, after which cryptographic operation said key Kpv$^{UPLOAD(N)}$ is retired and not used again (since it is a one-time key). Biometric authorization by authorized user 101 requires authorized user 101 to be positively biometrically identified by the BCU 103.

4. The BCU 103 digitally signs the $N^{th}$ upload $I^{UPLOAD(N)}$, information, $I^{UPLOAD(N)}$, using the private key $Kpv^{UPLOAD(N)}$ to generate the digital signature $I^{UPLOAD(N)}|^{DS}Kpv^{UPLOAD(N)}$, and uploads both $I^{UPLOAD(N)}$ and the digital signature $I^{UPLOAD(N)}|^{DS}Kpv^{UPLOAD(N)}$ to the public key repository 301. The private key $Kpv^{UPLOAD(N)}$ has now been used once and is retired—the next upload operation will use private key $Kpv^{UPLOAD(N+1)}$.

5. The public key repository 301 uses the public key $Kpb^{UPLOAD(N)}$, which was uploaded during the $(N-1)^{th}$ upload operation (see above), to authenticate the digital signature $I^{UPLOAD(N)}|^{DS}Kpv^{UPLOAD(N)}$, thereby authenticating that (i) the $N^{th}$ upload was carried out by the same person (authorized user 101) as carried out the $(N-1)^{th}$ upload (since the private key $Kpv^{UPLOAD(N)}$ used to sign the $N^{th}$ upload corresponds to the public key $Kpb^{UPLOAD(N)}$ that was part of the $(N-1)^{th}$ upload), and (ii) the $N^{th}$ upload information $I^{UPLOAD(N)}$ has not been modified in transmission from the BCU 103 to the public key repository 301. Hence the public key repository 301 is able to securely establish continuity of identity of authorized user 101 from the $(N-1)^{th}$ upload to the $N^{th}$ upload—and similarly for any authorized user of any BCU on the network 300. Since the first upload public key, $Kpb^{UPLOAD(1)}$, for authorized user 101 of BCU 103 was provided to the public key repository at the time of enrollment of authorized user 101, it follows that the abovedescribed process enables the public key repository 301 to biometrically authenticate that all subsequent uploads are also from authorized user 101. In some preferred embodiments the uploaded information may also be encrypted using a public encryption key corresponding to the public key repository 301, to be decrypted by the public key repository 301 using the corresponding private decryption key that is held secretly by the public key repository 301.

Figure 9A:
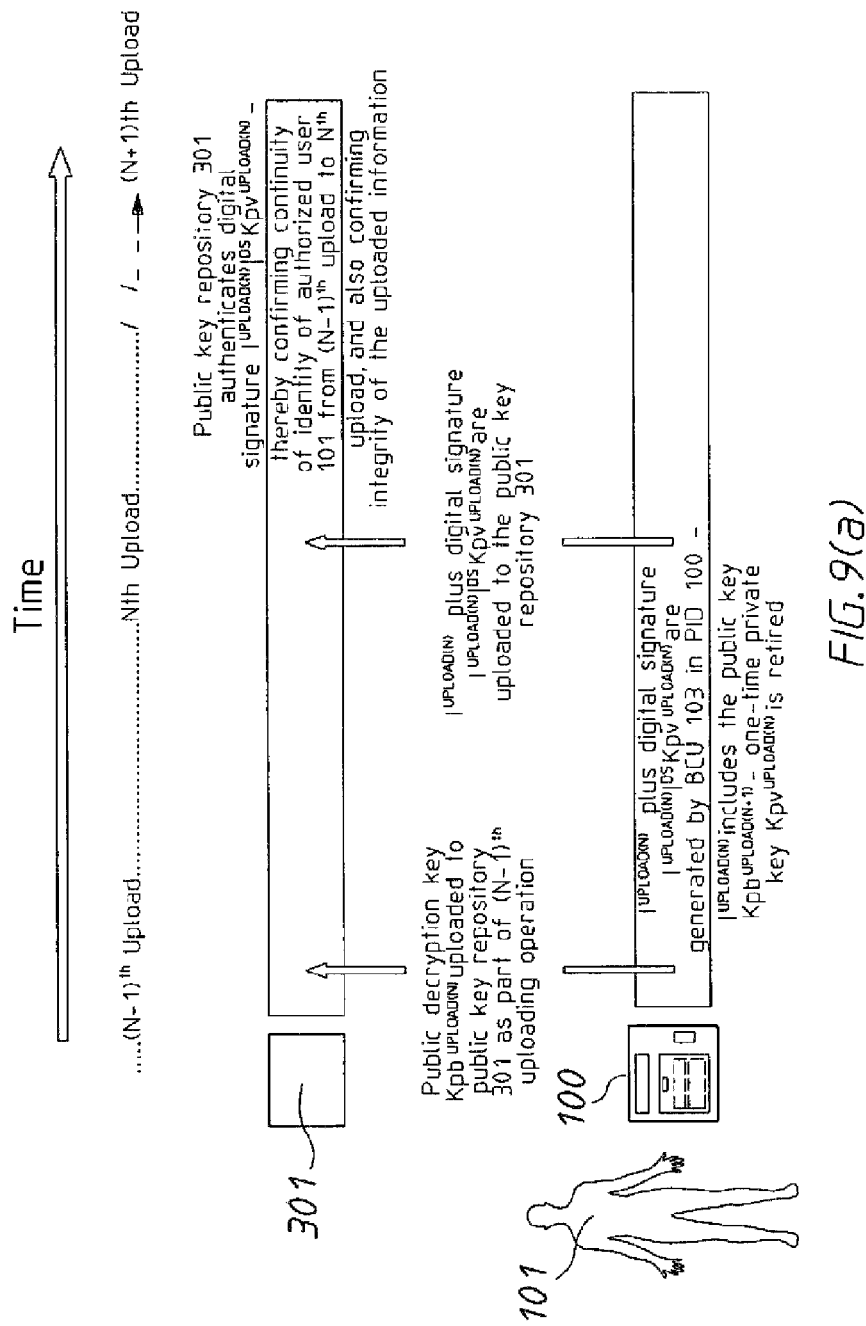
FIG. 9—comprising FIGS. 9(a) and 9(b)—is a schematic illustration of a preferred method for a first authorized user of a first personal information device to exchange biometrically associated, encrypted information with a second authorized user of a second personal information device such that all biometrically associated private cryptographic keys generated in said first or said second biometric/cryptographic processing means are one-time keys (i.e. keys that are used only once).

In the description below the term "biometrically secure upload" will be used as shorthand for the above process, when used by the authorized user 101 of BCU 103 or authorized user 501 of BCU 503. FIG. 9(a) illustrates schematically the biometrically secure uploading process described above.

The following describes steps in the transfer of information D4 from authorized user 101 of PID 100 to authorized user 501 of PID 500, which transfer meets the following requirements:

i. the information transfer is biometrically tagged for both authorized user 101 (sender) and authorized user 501 (recipient);
 ii. the information D4 is encrypted in transit;
 iii. all biometrically associated key pairs are one-time key pairs.

Figure 9B:
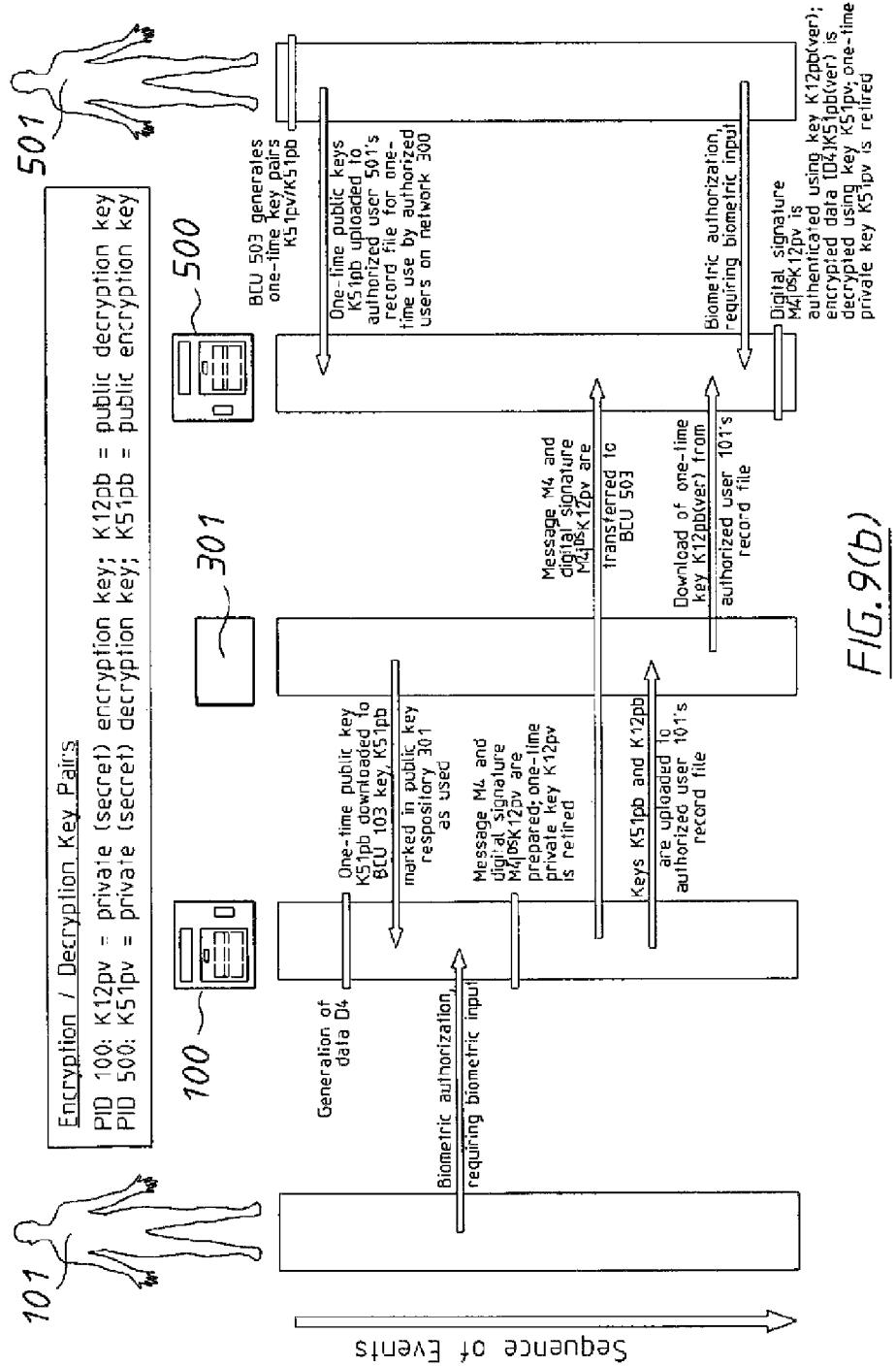

The process described below is illustrated schematically in FIG. 9(b).

1. Preparation of one-time public encryption keys and prepositioning of said keys in public key repository 301:
    a. The BCU 503 generates one or more one-time key pairs, K51pv/K51pb, and uploads to the public key repository 301 the one-time public encryption keys, K51pb, via a biometrically secure uploading process.
    b. The one-time public encryption keys, K51pb, are stored in the public key repository 301, in the record file for authorized user 501, in preparation for one-time downloading to other authorized users on the network 300.

2. Preparation of data D4 by authorized user 101 and transmission to authorized user 501:

a. Authorized user 101 uses PID 100 to generate data D4 that is to be sent to authorized user 501 using PID 500.
    b. Authorized user 101 connects to the public key repository 301 and requests a one-time public encryption key for authorized user 501. The public key repository 301 selects an unused public encryption key, K51pb, and downloads it to the BCU 103 of authorized user 101. This public encryption key, K51pb, will be used as a unique identifier throughout the remainder of the process below. The public key repository 301 marks the downloaded key, K51pb, as used and associates with its used status the identity of authorized user 101 to whom the key K51pb was downloaded.
    c. The BCU 103 in PID 100 requests biometric authorization from authorized user 101 for the specific cryptographic operation of using the private encryption key, K12pv, to generate a digital signature, following which said key K12pv will be retired and not used again (as it is a one-time key). Biometric authorization by authorized user 101 requires positive biometric identification of authorized user 101 by BCU 103. BCU 103 gathers biometric information 105 from the user 101 of PID 100 and, based on said biometric information 105, determines whether the user 101 is authorized user 101 of the BCU 103. If the user 101 is determined to be authorized user 101 of the BCU 103 then the steps set out below are undertaken. If the BCU 103 is unable to determine that the user 101 is authorized user 101 of the BCU 103, then the BCU 103 takes no further action and the process is stopped.
    d. If the user 101 is determined to be authorized user 101 of the BCU 103, then the BCU 103 enables an unused internally generated one-time key pair K12pv/K12pb, corresponding to authorized user 101 of PID 100, for the specific cryptographic operation of using the private encryption key, K12pv, to generate a digital signature in preparing the data D4 for transfer to authorized user 501, following which said key K12pv will be retired and not used again (as it is a one-time key).
    e. The data D4 is encrypted with the key K51pb(ver), which has been obtained from the public key repository 301 as described above, generating encrypted data [D4]K51pb(ver). The public encryption key K51pb(ver) is combined with the encrypted data [D4]K51pb(ver). Together this information makes up the message, M4, that is to be transmitted to PID 500—i.e. M4=[D4]K51pb(ver)+K51pb(ver).
    f. The BCU 103 uses the one-time private encryption key K12pv to generate a digital signature, $M4|^{DS}K12pv$, corresponding to the message M4. (Generation of a digital signature DS is a well known process that will not be described in detail here.) The message data M4 and digital signature $M4|^{DS}K12pv$ are then transmitted to the PID 500.
    g. The public encryption key K51pb(ver), along with the associated one-time public decryption key, K12pb, are uploaded—via a biometrically secure uploading process—to authorized user 101's record file in the public key repository 301, where the two keys are shown as being associated (with each other).
    h. The private key K12pv is marked as used by the BCU 103 and is retired—i.e. not used again.

3. Receipt and processing of the message M4 by authorized user 501:
    a. The message M4 and digital signature $M4|^{DS}K12pv$ are received by the PID 500 at some later time.

b. The BCU 503 connects to the public key repository 301 and uses the public encryption key, K51pb(ver), incorporated into the message M4 to identify and obtain the associated one-time public decryption key, K12pb(ver), from authorized user 101's record file in the public key repository 301.

c. Using the verified public key, K12pb(ver), the BCU 503 authenticates the digital signature M4|$^{DS}$K12pv corresponding to the message M4. Authentication of the digital signature M4|$^{DS}$K12pv confirms that the digital signature was generated by BCU 103 using private key K12pv, and therefore amounts to positively biometrically identifying authorized user 101 of BCU 103 as the sender of the message M4. Authentication of the digital signature M4|$^{DS}$K12pv also verifies that the message M4 has not been modified since it was generated by the BCU 103.

d. By extracting K51pb(ver) from the message M4, the BCU 503 is also able to identify the corresponding one-time private key K51pv, that is secretly stored in the BCU 503 and that is required to decrypt the encrypted data [D4]K51pb(ver) that forms part of the message M4. While connected to the public key repository 301, the BCU 503 may also look up the record file of user 501 and confirm that the public encryption key K51pb was in fact downloaded to authorized user 101 for one-time use.

e. The BCU 503 in PID 500 requests biometric authorization from authorized user 501 for the specific cryptographic operation of using the private decryption key, K51pv, to decrypt the encrypted data [D4]K51pb(ver), following which said key K51pv will be retired and not used again (as it is a one-time key). Biometric authorization by authorized user 501 requires positive biometric identification of authorized user 501 by BCU 503. BCU 503 gathers biometric information from the user 501 of PID 500 and, based on said biometric information, determines whether the user 501 is authorized user 501 of the BCU 503. If the user 501 is determined to be authorized user 501 of the BCU 503 then the steps set out below are undertaken. If the BCU 503 is unable to determine that the user 501 is authorized user 501 of the BCU 503, then the BCU 503 takes no further action and the process is stopped.

f. If the user 501 is determined to be authorized user 501 of the BCU 503, then the BCU 503 enables the private key K51pv, corresponding to authorized user 501 of BCU 503, for the specific cryptographic operation of decrypting the encrypted data [D4]K51pb(ver), following which said private key K51pv will be retired and not used again (as it is a one-time key).

g. The encrypted data [D4]K51pb(ver) is then extracted from the message M4 and decrypted by the BCU 503 using the private decryption key K51pv, thereby retrieving the data D4. As described above, use of the private decryption key K51pv requires positive biometric identification of authorized user 501 of BCU 503. The private key K51pv is marked as used by the BCU 503 and is retired—i.e. not used again.

In the embodiment of FIG. 9(*b*) a (secret) private cryptographic key, K12pv, corresponding to authorized user 101 of BCU 103 is required to complete the information transfer, thereby requiring positive biometric identification by the BCU 103 of authorized user 101. Similarly, a (secret) private cryptographic key, K51pv, corresponding to authorized user 501 of BCU 503 is required to complete the information transfer, thereby requiring positive biometric identification by the BCU 503 of authorized user 501. Also, the data D4 is encrypted while in transit from the PID 100 to the PID 500, thereby ensuring that the data D4 is confidential while in transit—i.e. it cannot be interpreted if intercepted by a third party, and can only be read by authorized user 501 of BCU 503. Furthermore, all biometrically associated private keys—in this case K12pv and K51pv—are used only once and then retired. Additionally, no biometric information is ever released from either BCU 103 or BCU 503.

It should be appreciated that the information transfer method described above in relation to FIG. 9(*b*) is a preferred embodiment only, and that other methods may be used instead. For example, while the method of FIG. 9(*b*) can be regarded as an "encrypt then sign" method, it should be appreciated that an equivalent "sign then encrypt" method could be used and that the "sign then encrypt" method would be equally effective in requiring secure biometric identification by the BCU 103 of authorized user 101 and by the BCU 503 of authorized user 501 in order to complete the transfer of the data D4.

It should also be noted that, in contrast to the embodiments described in relation to FIGS. 7 and 8, in the abovedescribed embodiment (relating to FIGS. 9(*a*) and 9(*b*)) there is no need for the use of a timestamp T1 in the preparation of biometrically tagged data, or for the BCU 503 to find and use keys corresponding to the time T1 at which the public encryption key K51pb(ver) was obtained. The reason for the difference is that in the abovedescribed embodiment of FIGS. 9(*a*) and 9(*b*), in which one-time biometrically associated key pairs are used, each transaction is uniquely identified and this unique identification is used at each step throughout a transaction to maintain continuity and integrity of the entire transaction. For example, in the embodiment of FIG. 9(*b*) the transaction is uniquely identified by the public encryption key K51pb, which is incorporated or used at each step of the transaction to link the steps together and ensure the integrity and continuity of the overall transaction (this being the transfer of data D4 from authorized user 101 to authorized user 501).

Use of a Data Storage Medium to Transfer Biometrically Authenticated Information In the abovedescribed embodiments biometrically authenticated information is transferred from a PID 100 to another device 102 or to another PID 500 by means of a communications network 300, and public keys are accessed via the public key repository 301 on the network 300. It should be appreciated that transfer of said biometrically authenticated information may be by means other than transmission over the network 300. For example, said biometrically authenticated information may be transferred from PID 100 to either the device 102 or PID 500 (whichever is appropriate) by means of the physical transportation of a memory storage device in (or on) which said biometrically authenticated information is stored. All other aspects of the system operation, such as use of a public key repository 301 and access to public keys on the public key repository 301 via the network 300, would still be as described herein—the only difference is that the biometrically authenticated information in such an embodiment would be transferred by a means other than transmission over the network 300. In a specific embodiment the biometrically authenticated information may be transferred from the BCU 103 in PID 100 to a USB memory stick which is then physically transported from PID 100 to either device 102 or PID 500 (as appropriate), with all other aspects of the system operation being as described herein.

INDUSTRIAL APPLICABILITY

The arrangements and methods presently disclosed are applicable to the data communication industry and particularly for secure communications between persons and organizations including, but not limited to, email, electronic banking and e-POS transactions, Internet access, to name but a few.

The invention claimed is:

1. An information network comprising:
a number of personal information devices each incorporating biometric/cryptographic processing means (BCPM) on said network and able to exchange information with each other and with other devices on said network by means of a communication system, wherein
each said BCPM includes:
  means to read or receive biometric information from a user of said BCPM;
  means to determine whether said biometric information derived from the user corresponds to an authorized user of said BCPM and thereby determine whether the user is an authorized user of said BCPM;
  means to undertake cryptographic information processing, including a means to encrypt and decrypt information according to one or more of a number of specified cryptographic protocols;
  means to generate and store unique asymmetric private/public cryptographic key pairs corresponding to each authorized user of said BCPM, such that each said key pair is unique and dedicated to, or associated with, a specific authorized user, with said private keys being retained secretly in said BCPM and said public keys being released publicly, said means to generate and store unique asymmetric private/public cryptographic key pairs operating independently of any biometric information or biometric identification methods, said private cryptographic keys being disabled from use in a default state;
  means to update each said unique asymmetric private/public cryptographic key pair corresponding to each authorized user of said BCPM, thereby replacing a current unique asymmetric private/public cryptographic key pair corresponding to an authorized user with a new unique asymmetric private/public cryptographic key pair corresponding to said authorized user of said BCPM, and each unique asymmetric private/public cryptographic key pair corresponding to an authorized user thereby having an active time window;
  means to enable use by said BCPM of one or more of said private cryptographic keys corresponding to an authorized user in a specific cryptographic operation if and only if the authorized user has provided biometric authorization for said specific cryptographic operation, where providing biometric authorization involves the authorized user being positively biometrically identified by said BCPM in combination with the authorized user giving explicit permission for said specific cryptographic operation to be undertaken by said BCPM using private keys corresponding to the authorized user, with said private keys corresponding to the authorized user otherwise remaining in a disabled state;
  said BCPM thereby being configured such that use of one or more of said private cryptographic keys corresponding to a specific authorized user is possible only if the authorized user has been positively biometrically identified by said BCPM in the corresponding biometric authorization process, and thereby being configured such that a determination by an external person or device that said BCPM is using any of said private cryptographic keys corresponding to a specific authorized user in a cryptographic operation is equivalent to a determination that the authorized user has been biometrically identified as the originator of said cryptographic operation;
said BCPM is associated with a means to process and store information;
said BCPM is associated with a means for a user to input information by which at least the explicit permission can be given;
said BCPM is associated with a communications means;
said means to process and store information and said BCPM are connected such that information can be transferred between them;
said BCPM and said communications means are connected such that information can be transferred between them;
said communications means provides a means to transmit information to external devices and a means to receive information from external devices;
said BCPM is configured to accept information from either of said means to process and store information and said communications means, to be able to process said information in a specific cryptographic operation using private cryptographic keys corresponding to a specific authorized user of said BCPM only if the authorized user has provided said biometric authorization for said specific cryptographic operation, which biometric authorization involves positive biometric identification of said specific authorized user, and to output said cryptographically processed information to either of said means to process and store information and said communications means;
said BCPM, said means to process and store information, and said communications means together constitute a personal information device;
said personal information device is thereby configured such that a first authorized user of a first personal information device incorporating a first BCPM can use said first personal information device to generate and transmit over said network first message information that is intended for a second authorized user of a second personal information device incorporating a second BCPM, such that said first message information is prepared in said first BCPM using a private key stored in said first BCPM and corresponding to the first authorized user and thereby requiring positive biometric identification of the first authorized user by said first BCPM and using a public key of a public/private key pair generated by said second BCPM and corresponding to the second authorized user;
said personal information device is further configured such that said second BCPM in said second personal information device is able to accept said first message information, process said first message information using a public key corresponding to said first authorized user to determine that said first message information was prepared using a private key corresponding to the first authorized user thereby requiring positive biometric identification of the first authorized user by said first BCPM, and process said first message information using a private key corresponding to the second authorized user thereby requiring positive biometric identification of the second authorized user by said second BCPM;

said personal information device is thereby configured such that a first authorized user of a first personal information device can use said first personal information device to generate and transmit over said network second message information that is intended for a second cryptographically enabled device, such that said second message information is prepared in said first BCPM using a private key corresponding to the first authorized user thereby requiring positive biometric identification of said first authorized user by said first BCPM and using a public key corresponding to said second cryptographically enabled device;

said second cryptographically enabled device is configured such that it is able to accept said second message information, process said second message information using a public key corresponding to the first authorized user to determine that said second message information was prepared using a private key corresponding to the first authorized user thereby requiring positive biometric identification of the first authorized user by said first BCPM, and process said second message information using a private key corresponding to said second cryptographically enabled device;

said personal information device is thereby configured such that a first cryptographically enabled device can generate and transmit over said network third message information that is intended for a second authorized user of a second personal information device, such that said third message information is prepared in said first cryptographically enabled device using a private key corresponding to said first cryptographically enabled device and using a public key generated by said second BCPM and corresponding to the second authorized user;

said personal information device is further configured such that said second personal information device is able to accept said third message information, process said third message information using a public key corresponding to said first cryptographically enabled device and process said third message information using a private key generated by said second BCPM and corresponding to the second authorized user thereby requiring positive biometric identification of the second authorized user by said second BCPM;

wherein said BCPM incorporates into said first and second message information one or more timestamps indicative of the time or times at which specific steps are undertaken in the cryptographic processing of said first or second message information (respectively);

a public key distribution means to make available to any device on said network verified public key values for each said BCPM and each said personal information device on said network;

each biometrically associated public key that is generated by any of said BCPM corresponding to a specific authorized user of said BCPM and having associated with it identifying information pertaining to the said corresponding specific authorized user;

each public key that is generated by any of said BCPM having a public key history of past retired and future replacement public keys, and corresponding active time windows, beginning with the first public key for a specific authorized user corresponding to said public key and ending with the last or currently-active public key for the specific authorized user corresponding to said public key;

each public key that is generated by a cryptographically enabled device that is not a personal information device having a public key history of past retired and future replacement public keys, and corresponding active time windows, beginning with the first public key for said cryptographically enabled device and ending with the last or currently-active public key for said cryptographically enabled device;

said public key distribution means retaining a public key history, including corresponding active time windows, for each public key used on said information network;

each said BCPM on said information network being configured such that for each authorized user of said BCPM, said BCPM retains an authorized user's key pair history being a history of private/public key pairs that said BCPM generates, along with the active time window for each said key pair;

each said cryptographically enabled device on said information network that is not a personal information device being configured to retain a history of private/public key pairs that it generates, along with the active time window for each said key pair;

each said second BCPM on said information network being configured to authenticate and process received first message information with the correct cryptographic keys, after positively biometrically identifying the second authorized user, by using said timestamp(s) in said first message information to identify the key pairs corresponding to said timestamp(s) within said second BCPM, and by retrieving from said public key distribution means the public key(s) corresponding to said timestamp(s) for said first authorized user of said first BCPM from which said first message information originated;

each said second cryptographically enabled device on said information network being configured to authenticate and process received second message information with the correct cryptographic keys by using said timestamp(s) in said second message information to identify its own key pairs corresponding to said timestamp(s) and by retrieving from said public key distribution means the public key(s) corresponding to said timestamp(s) for the first authorized user of said first BCPM from which said second message information originated;

each said second BCPM on said information network being configured to authenticate and process received third message information with the correct cryptographic keys, after positively biometrically identifying said second authorized user, by using timestamp(s) in said third message information to identify the key pairs corresponding to said timestamp(s) within said second BCPM and by retrieving from said public key distribution means the public key(s) corresponding to said timestamp(s) for said first cryptographically enabled device from which said third message information originated.

2. A network according to claim 1, wherein the biometrically associated cryptographic key pairs generated by a BCPM are one-time key pairs such that the private key of a said one-time key pair is used only once, after which it is retired, wherein:

public keys corresponding to one-time biometrically associated key pairs generated by said second BCPM are prepositioned in said public key distribution means, and downloaded on a use-once as-needed basis to said first BCPM for use by said first BCPM in preparing message information;

for each information transfer from said first BCPM to said second BCPM, one-time public keys associated with said information transfer that are generated by said first BCPM and said prepositioned one-time public keys associated with said information transfer that are generated by said second BCPM are associated with each other and made available via said public key distribution means, thereby enabling said second BCPM to use the correct keys in processing information received by said second BCPM from said first BCPM in said information transfer.

3. A network according to claim 1 wherein said active time window for a public key and for the corresponding private/public key pair is the time period commencing when said public key is first uploaded to said public key distribution means (the start time) and ending at the start time for the replacement public key, which is the time when said replacement public key is first uploaded to said public key distribution means.

4. A network according to claim 1 wherein said active time window for a public key and for the corresponding private/public key pair is the time period commencing at a predetermined time (the start time) after said public key is first uploaded to said public key distribution means and ending at the start time for the replacement public key, which is a predetermined time after said replacement public key is first uploaded to said public key distribution means.

5. A network according to claim 1 wherein said public key distribution means uses digital-certificates in combination with one or more certificate authorities on said information network.

6. A network according to claim 1 wherein said public key distribution means comprises one or more public key repositories on said information network:

said public key repositories providing a means to store and make available to a device on said network verified public key values and associated record file information for all BCPM on said network, and verified public key values for all other cryptographically enabled devices on said network, with said public key repositories being able to exchange information with BCPM and other devices on said network;

said BCPM and other cryptographically enabled devices on said network being configured to upload new verified public key values to said public key repositories in order to retire and replace corresponding current verified public key values retained in said public key repositories, with each public key, and corresponding private/public key pair, having an active time window being the time period between (i) the start time for use of said public key and (ii) the start time for use of the superseding public key (or, if said public key has not been superseded, the present time).

7. A network according to claim 1 wherein said public key distribution means is configured such that a user or device on said information network is able to search said public key distribution means for a specific authorized user on said information network by using said identifying information and/or said unique identification code as search parameters, and thereby retrieve current or historical public key values corresponding to the specific authorized user, thereby enabling the preparation and transmission of biometrically identified message information, and further enabling the retrieval, authentication, decryption and reading of received biometrically identified message information.

8. A method for enrolling a user for use of a biometric/cryptographic processing means (BCPM) such that the user is thereby able to use an information network, said method comprising:

providing an information network according to claim 1;

preparing said BCPM in an initial configuration, wherein said BCPM generates and retains a set-up asymmetric cryptographic key pair, comprising a private setup key and corresponding public setup key, said setup keys not corresponding to a particular user, said private setup key being retained secretly within said BCPM, and said corresponding public setup key being provided securely to a network enrollment device that is part of said information network;

said BCPM and said network enrollment device communicating with the aid of said setup key pair in order that said network enrollment device can securely establish both the identity and authenticity of said BCPM and the authenticity of information sent from said BCPM to said network enrollment device;

the user providing identifying information, along with required evidence in support of said identifying information (said evidence preferably being other than or in addition to biometric evidence);

said BCPM taking biometric readings from the user and establishing within said BCPM one or more biometric templates or other biometrically based data corresponding to the user so as to enable subsequent biometric identification of the user by said BCPM;

said BCPM not releasing any of the user's biometric information;

said BCPM then, without reference to any of the user's biometric information, generating one or more initial asymmetric cryptographic key pairs, each said initial key pair comprising an initial private key and an initial public key, said initial key pairs being associated in said BCPM with biometric identification of the user;

said initial private keys being retained secretly in said BCPM;

said BCPM then securely transmitting, via said communications means, said initial public key values and said identifying information for the user to said network enrollment device, said transmission being authenticated by means of said private setup key;

said network enrollment device adding a unique identification code for the user to said initial public key values and said identifying information for the user, and then securely transmitting or making available to said public key distribution means said unique identification code and said initial public key values and said identifying information;

said public key distribution means thereby establishing a record file for the user, who is at this point an authorized user, said record file initially including said identifying information for the user, said unique identification code for the user and said initial public key values.

9. A method according to claim 8 wherein said network enrollment device comprises said public key distribution means.

10. A method according to claim 8 wherein said identifying information for an authorized user of a BCPM includes personal information comprising at least one of name, date of birth, and gender of the authorized user.

* * * * *